US012775083B2

(12) United States Patent
Shabtay et al.

(10) Patent No.: US 12,775,083 B2
(45) Date of Patent: Oct. 27, 2026

(54) RADAR APPARATUS, SYSTEM, AND METHOD

(71) Applicant: INTEL CORPORATION, Santa Clara, CA (US)

(72) Inventors: Ophir Shabtay, Tsofit (IL); Kobi Ben Atar, Mazkeret Batya (IL); Sharon Heruti, Tel-Aviv (IL); Danniel Nahmanny, Givat Shapira (IL); Maor Saig, Shaarey-Tikva (IL)

(73) Assignee: INTEL CORPORATION, Santa Clara, CA (US)

( * ) Notice: Subject to any disclaimer, the term of this patent is extended or adjusted under 35 U.S.C. 154(b) by 125 days.

(21) Appl. No.: 18/842,836

(22) PCT Filed: Mar. 31, 2022

(86) PCT No.: PCT/US2022/022913
§ 371 (c)(1),
(2) Date: Aug. 30, 2024

(87) PCT Pub. No.: WO2023/191799
PCT Pub. Date: Oct. 5, 2023

(65) Prior Publication Data
US 2025/0172682 A1 May 29, 2025

(51) Int. Cl.
*G01S 13/34* (2006.01)
*G01S 13/87* (2006.01)
*G01S 13/931* (2020.01)

(52) U.S. Cl.
CPC ............ *G01S 13/343* (2013.01); *G01S 13/87* (2013.01); *G01S 13/931* (2013.01); (Continued)

(58) Field of Classification Search
None
See application file for complete search history.

(56) References Cited

U.S. PATENT DOCUMENTS 7,038,618 B2 5/2006 Budic
7,310,327 B2 * 12/2007 Fehr ........................ H04W 4/04 370/324
(Continued)

FOREIGN PATENT DOCUMENTS

CN 102955155 3/2013
JP 2005-233723 9/2005

OTHER PUBLICATIONS

Satellite Architecture Basics, https://www.aptiv.com/insights/article/satellitearchitecture-basics, Nov. 13, 2020, 4 pages.
(Continued)

*Primary Examiner* — Bernarr E Gregory
(74) *Attorney, Agent, or Firm* — Shichrur & Co.

(57) ABSTRACT

For example, an apparatus may include a communication interface configured to communicate with a plurality of Radio Heads (RHs); and a processor configured to coordinate radar communications by the plurality of RHs and to generate radar information based on the radar communications by the plurality of RHs. The processor may be configured to transmit synchronization information to the plurality of RHs via the communication interface, the synchronization information configured to synchronize the radar communications by the plurality of RHs; and to communicate at least one of radar Transmit (Tx) information or radar Receive (Rx) information with the plurality of RHs via the communication interface.

20 Claims, 22 Drawing Sheets

(52) U.S. Cl.
CPC ................. *G01S 2013/9318* (2020.01); *G01S 2013/93185* (2020.01); *G01S 2013/9319* (2020.01)

(56) References Cited

U.S. PATENT DOCUMENTS

| | | | | |
|---|---|---|---|---|
| 8,050,881 | B1 * | 11/2011 | Yeung .................. | A61B 5/1126 370/510 |
| 8,570,211 | B1 | 10/2013 | Piesinger | |
| 8,665,668 | B2 | 3/2014 | Potanin et al. | |
| 8,922,421 | B2 | 12/2014 | Pomietlasz | |
| 9,030,342 | B2 | 5/2015 | Lam et al. | |
| 9,596,040 | B2 * | 3/2017 | Laaja ..................... | H04B 17/12 |
| 10,560,125 | B2 | 2/2020 | Talwar et al. | |
| 10,663,572 | B2 | 5/2020 | Mehdizad Taleie et al. | |
| 11,167,771 | B2 | 11/2021 | Caron et al. | |
| 11,360,210 | B2 | 6/2022 | Amadjikpe | |
| 11,791,847 | B2 | 10/2023 | Xu et al. | |
| 11,861,957 | B2 * | 1/2024 | Bennington ............ | G06F 16/27 |
| 2004/0177285 | A1 * | 9/2004 | Klotz .................... | G01S 13/931 713/400 |
| 2005/0237236 | A1 | 10/2005 | Budic | |
| 2008/0072231 | A1 | 3/2008 | Yoshida | |
| 2009/0085796 | A1 | 4/2009 | Kuroda et al. | |
| 2011/0172849 | A1 * | 7/2011 | Rotaru .................. | H04L 12/417 701/1 |
| 2012/0069712 | A1 | 3/2012 | Potanin et al. | |
| 2012/0140861 | A1 * | 6/2012 | Menon ...................... | B60T 7/18 375/356 |
| 2012/0188125 | A1 | 7/2012 | Pomietlasz | |
| 2015/0022386 | A1 | 1/2015 | Lam et al. | |
| 2016/0192374 | A1 | 6/2016 | Negus et al. | |
| 2016/0352388 | A1 | 12/2016 | Lane | |
| 2018/0088221 | A1 | 3/2018 | Yomo et al. | |
| 2018/0210079 | A1 | 7/2018 | Hammerschmidt et al. | |
| 2018/0259632 | A1 | 9/2018 | Kishigami | |
| 2018/0284285 | A1 * | 10/2018 | Curatu .................. | G01S 13/931 |
| 2019/0210615 | A1 | 7/2019 | Caron et al. | |
| 2019/0238163 | A1 | 8/2019 | Talwar et al. | |
| 2019/0239085 | A1 | 8/2019 | O'Shea | |
| 2019/0293755 | A1 | 9/2019 | Cohen et al. | |
| 2019/0324136 | A1 | 10/2019 | Amadjikpe | |
| 2019/0383924 | A1 | 12/2019 | Mehdizad Taleie et al. | |
| 2019/0386665 | A1 | 12/2019 | Shalita et al. | |
| 2020/0064460 | A1 | 2/2020 | Eriksson | |
| 2020/0150220 | A1 | 5/2020 | Maor et al. | |
| 2020/0150256 | A1 | 5/2020 | Dent et al. | |
| 2020/0313620 | A1 | 10/2020 | Shalita et al. | |
| 2020/0326423 | A1 | 10/2020 | Maor et al. | |
| 2020/0333435 | A1 * | 10/2020 | Mayer ................... | G01S 13/931 |
| 2020/0363499 | A1 * | 11/2020 | Mayer ...................... | G01S 13/87 |
| 2021/0018616 | A1 * | 1/2021 | Mayer ................... | G01S 13/931 |
| 2021/0126669 | A1 | 4/2021 | Roberts et al. | |
| 2021/0336638 | A1 | 10/2021 | Xu et al. | |
| 2022/0146661 | A1 | 5/2022 | Zhu et al. | |
| 2022/0146665 | A1 | 5/2022 | Vollbracht et al. | |
| 2023/0194704 | A1 | 6/2023 | Karrman et al. | |
| 2023/0266452 | A1 | 8/2023 | Sicron et al. | |
| 2025/0370121 | A1 | 12/2025 | Ben Atar et al. | |
| 2026/0104482 | A1 | 4/2026 | Shabtay et al. | |

OTHER PUBLICATIONS

Aeberhard et al., "High-Level Sensor Data Fusion Architecture for Vehicle Surround Environment Perception", BMW group, https://www.researchgate.net/publication/267725657_HighLevel_Sensor_Data_Fusion_Architecture_for_Vehicle_Surround_Environment_Perception, Nov. 3, 2015, 7 pages.

Zendar Technology page: https://www.zendar.io/technology, Apr. 28, 2022, 8 pages.

Beyond MIMO: 5G Radar = Digital Modulation Radar, Ralf Reuter, EuRAD 2019, 15 pages.

Iqbal et al., "Realistic SAR Implementation for Automotive Applications", Proceedings of the 17th European Radar Conference, EuRAD 2020 WS-18, pp. 306-309.

International Search Report and the Written Opinion for International Application No. PCT/US2022/035465, mailed on Mar. 28, 2023, 14 pages.

International Search Report and the Written Opinion for International Application No. PCT/US2022/022913, mailed on Dec. 26, 2022, 8 pages.

Search Report for European Patent Application No. 22935975.7, mailed on Dec. 12, 2025, 10 pages.

International Search Report and the Written Opinion for International Application No. PCT/US2022/035450, mailed on Mar. 23, 2023, 11 pages.

Office Action for U.S. Appl. No. 17/852,619, mailed on Apr. 7, 2026, 76 pages.

Michael Parker, Chapter 20—Automotive Radar, Editor(s): Michael Parker, Digital Signal Processing 101 (Second Edition), Newnes, pp. 253-276 (Year: 2017).

Bensky (Bensky, Alan. Wireless Positioning Technologies and Applications (2nd Edition) a Chapter 7. Angle of Arrival. Artech House. p. 213-250 (Year: 2016).

Office Action for U.S. Appl. No. 18/870,433, mailed on Jul. 21, 2026, 53 pages.

* cited by examiner

RADAR APPARATUS, SYSTEM, AND METHOD

TECHNICAL FIELD

Aspects described herein generally relate to radar apparatus, system and method.

BACKGROUND

Various types of devices and systems, for example, autonomous and/or robotic devices, e.g., autonomous vehicles and robots, may be configured to perceive and navigate through their environment using sensor data of one or more sensor types.

Conventionally, autonomous perception relies heavily on light-based sensors, such as image sensors, e.g., cameras, and/or Light Detection and Ranging (LiDAR) sensors. Such light-based sensors may perform poorly under certain conditions, such as, conditions of poor visibility, or in certain inclement weather conditions, e.g., rain, snow, hail, or other forms of precipitation, thereby limiting their usefulness or reliability.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
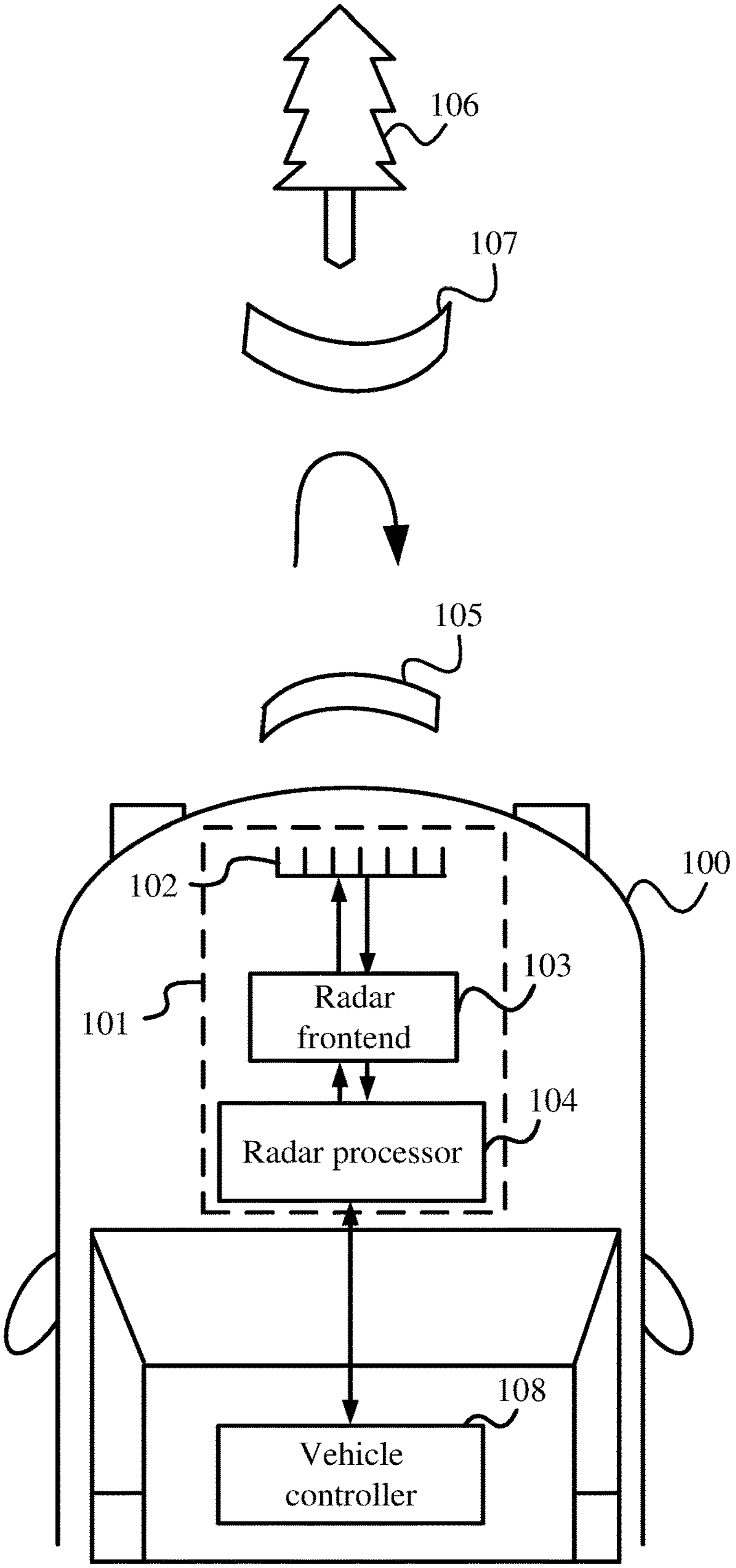
FIG. 1 is a schematic block diagram illustration of a vehicle implementing a radar, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

The words "exemplary" and "demonstrative" are used herein to mean "serving as an example, instance, demonstration, or illustration". Any aspect, aspect, or design described herein as "exemplary" or "demonstrative" is not necessarily to be construed as preferred or advantageous over other aspects, aspects, or designs.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The phrases "at least one" and "one or more" may be understood to include a numerical quantity greater than or equal to one, e.g., one, two, three, four, [ . . . ], etc. The phrase "at least one of" with regard to a group of elements may be used herein to mean at least one element from the group consisting of the elements. For example, the phrase "at least one of" with regard to a group of elements may be used herein to mean one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and/or may represent any information as understood in the art.

The terms "processor" or "controller" may be understood to include any kind of technological entity that allows handling of any suitable type of data and/or information. The data and/or information may be handled according to one or more specific functions executed by the processor or controller. Further, a processor or a controller may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), and the like, or any combination thereof. Any other kind of implementation of the respective functions, which will be described below in further detail, may also be understood as a processor, controller, or logic circuit. It is understood that any two (or more) processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" is understood as a computer-readable medium (e.g., a non-transitory computer-readable medium) in which data or information can be stored for retrieval. References to "memory" may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" may be used to refer to any type of executable instruction and/or logic, including firmware.

A "vehicle" may be understood to include any type of driven object. By way of example, a vehicle may be a driven object with a combustion engine, an electric engine, a reaction engine, an electrically driven object, a hybrid driven object, or a combination thereof. A vehicle may be, or may include, an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others.

A "ground vehicle" may be understood to include any type of vehicle, which is configured to traverse the ground, e.g., on a street, on a road, on a track, on one or more rails, off-road, or the like.

An "autonomous vehicle" may describe a vehicle capable of implementing at least one navigational change without driver input. A navigational change may describe or include a change in one or more of steering, braking, acceleration/deceleration, or any other operation relating to movement, of the vehicle. A vehicle may be described as autonomous even in case the vehicle is not fully autonomous, for example, fully operational with driver or without driver input. Autonomous vehicles may include those vehicles that can operate under driver control during certain time periods, and without driver control during other time periods. Additionally or alternatively, autonomous vehicles may include vehicles that control only some aspects of vehicle navigation, such as steering, e.g., to maintain a vehicle course between vehicle lane constraints, or some steering operations under certain circumstances, e.g., not under all circumstances, but may leave other aspects of vehicle navigation to the driver, e.g., braking or braking under certain circumstances. Additionally or alternatively, autonomous vehicles may include vehicles that share the control of one or more aspects of vehicle navigation under certain circumstances, e.g., hands-on, such as responsive to a driver input; and/or vehicles that control one or more aspects of vehicle navigation under certain circumstances, e.g., hands-off, such as independent of driver input. Additionally or alternatively, autonomous vehicles may include vehicles that control one or more aspects of vehicle navigation under certain circumstances, such as under certain environmental conditions, e.g., spatial areas, roadway conditions, or the like. In some aspects, autonomous vehicles may handle some or all aspects of braking, speed control, velocity control, steering, and/or any other additional operations, of the vehicle. An autonomous vehicle may include those vehicles that can operate without a driver. The level of autonomy of a vehicle may be described or determined by the Society of Automotive Engineers (SAE) level of the vehicle, e.g., as defined by the SAE, for example in SAE J3016 2018: Taxonomy and definitions for terms related to driving automation systems for on road motor vehicles, or by other relevant professional organizations. The SAE level may have a value ranging from a minimum level, e.g., level 0 (illustratively, substantially no driving automation), to a maximum level, e.g., level 5 (illustratively, full driving automation).

An "assisted vehicle" may describe a vehicle capable of informing a driver or occupant of the vehicle of sensed data or information derived therefrom.

The phrase "vehicle operation data" may be understood to describe any type of feature related to the operation of a vehicle. By way of example, "vehicle operation data" may describe the status of the vehicle, such as, the type of tires of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, or the like. More generally, "vehicle operation data" may describe or include varying features or varying vehicle operation data (illustratively, time varying features or data).

Some aspects may be used in conjunction with various devices and systems, for example, a radar sensor, a radar device, a radar system, a vehicle, a vehicular system, an autonomous vehicular system, a vehicular communication system, a vehicular device, an airborne platform, a waterborne platform, road infrastructure, sports-capture infrastructure, city monitoring infrastructure, static infrastructure platforms, indoor platforms, moving platforms, robot platforms, industrial platforms, a sensor device, a User Equipment (UE), a Mobile Device (MD), a wireless station (STA), a sensor device, a non-vehicular device, a mobile or portable device, and the like.

Some aspects may be used in conjunction with Radio Frequency (RF) systems, radar systems, vehicular radar systems, autonomous systems, robotic systems, detection systems, or the like.

Some demonstrative aspects may be used in conjunction with an RF frequency in a frequency band having a starting frequency above 10 Gigahertz (GHz), for example, a frequency band having a starting frequency between 10 GHz and 120 GHz. For example, some demonstrative aspects may be used in conjunction with an RF frequency having a starting frequency above 30 GHz, for example, above 45 GHZ, e.g., above 60 GHz. For example, some demonstrative aspects may be used in conjunction with an automotive radar frequency band, e.g., a frequency band between 76 GHz and 81 GHz. However, other aspects may be implemented utilizing any other suitable frequency bands, for example, a frequency band above 140 GHz, a frequency band of 300 GHz, a sub Terahertz (THz) band, a THz band, an Infra-Red (IR) band, and/or any other frequency band.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "communicating" as used herein with respect to a signal includes transmitting the signal and/or receiving the signal. For example, an apparatus, which is capable of communicating a signal, may include a transmitter to transmit the signal, and/or a receiver to receive the signal. The verb communicating may be used to refer to the action of transmitting or the action of receiving. In one example, the phrase "communicating a signal" may refer to the action of transmitting the signal by a transmitter, and may not necessarily include the action of receiving the signal by a receiver. In another example, the phrase "communicating a signal" may refer to the action of receiving the signal by a receiver, and may not necessarily include the action of transmitting the signal by a transmitter.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a MIMO (Multiple-Input Multiple-Output) array antenna, a single element antenna, a set of switched beam antennas, and/or the like. In one example, an antenna may be implemented as a separate element or an integrated element, for example, as an on-module antenna, an on-chip antenna, or according to any other antenna architecture.

Some demonstrative aspects are described herein with respect to RF radar signals. However, other aspects may be implemented with respect to, or in conjunction with, any other radar signals, wireless signals, IR signals, acoustic signals, optical signals, wireless communication signals, communication scheme, network, standard, and/or protocol. For example, some demonstrative aspects may be implemented with respect to systems, e.g., Light Detection Ranging (LiDAR) systems, and/or sonar systems, utilizing light and/or acoustic signals.

Reference is now made to FIG. 1, which schematically illustrates a block diagram of a vehicle 100 implementing a radar, in accordance with some demonstrative aspects.

In some demonstrative aspects, vehicle 100 may include a car, a truck, a motorcycle, a bus, a train, an airborne vehicle, a waterborne vehicle, a cart, a golf cart, an electric cart, a road agent, or any other vehicle.

In some demonstrative aspects, vehicle 100 may include a radar device 101, e.g., as described below. For example, radar device 101 may include a radar detecting device, a radar sensing device, a radar sensor, or the like, e.g., as described below.

In some demonstrative aspects, radar device 101 may be implemented as part of a vehicular system, for example, a system to be implemented and/or mounted in vehicle 100.

In one example, radar device 101 may be implemented as part of an autonomous vehicle system, an automated driving system, an assisted vehicle system, a driver assistance and/or support system, and/or the like.

For example, radar device 101 may be installed in vehicle 100 for detection of nearby objects, e.g., for autonomous driving.

In some demonstrative aspects, radar device 101 may be configured to detect targets in a vicinity of vehicle 100, e.g., in a far vicinity and/or a near vicinity, for example, using RF and analog chains, capacitor structures, large spiral transformers and/or any other electronic or electrical elements, e.g., as described below.

In one example, radar device 101 may be mounted onto, placed, e.g., directly, onto, or attached to, vehicle 100.

In some demonstrative aspects, vehicle 100 may include a plurality of radar aspects, vehicle 100 may include a single radar device 101.

In some demonstrative aspects, vehicle 100 may include a plurality of radar devices 101, which may be configured to cover a field of view of 360 degrees around vehicle 100.

In other aspects, vehicle 100 may include any other suitable count, arrangement, and/or configuration of radar devices and/or units, which may be suitable to cover any other field of view, e.g., a field of view of less than 360 degrees.

In some demonstrative aspects, radar device 101 may be implemented as a component in a suite of sensors used for driver assistance and/or autonomous vehicles, for example, due to the ability of radar to operate in nearly all-weather conditions.

In some demonstrative aspects, radar device 101 may be configured to support autonomous vehicle usage, e.g., as described below.

In one example, radar device 101 may determine a class, a location, an orientation, a velocity, an intention, a perceptional understanding of the environment, and/or any other information corresponding to an object in the environment.

In another example, radar device 101 may be configured to determine one or more parameters and/or information for one or more operations and/or tasks, e.g., path planning, and/or any other tasks.

In some demonstrative aspects, radar device 101 may be configured to map a scene by measuring targets' echoes (reflectivity) and discriminating them, for example, mainly in range, velocity, azimuth and/or elevation, e.g., as described below.

In some demonstrative aspects, radar device 101 may be configured to detect, and/or sense, one or more objects, which are located in a vicinity, e.g., a far vicinity and/or a near vicinity, of the vehicle 100, and to provide one or more parameters, attributes, and/or information with respect to the objects.

In some demonstrative aspects, the objects may include other vehicles; pedestrians; traffic signs; traffic lights; roads, road elements, e.g., a pavement-road meeting, an edge line; a hazard, e.g., a tire, a box, a crack in the road surface; and/or the like.

In some demonstrative aspects, the one or more parameters, attributes and/or information with respect to the object may include a range of the objects from the vehicle 100, an angle of the object with respect to the vehicle 100, a location of the object with respect to the vehicle 100, a relative speed of the object with respect to vehicle 100, and/or the like.

In some demonstrative aspects, radar device 101 may include a Multiple Input Multiple Output (MIMO) radar device 101, e.g., as described below. In one example, the MIMO radar device may be configured to utilize "spatial filtering" processing, for example, beamforming and/or any other mechanism, for one or both of Transmit (Tx) signals and/or Receive (Rx) signals.

Some demonstrative aspects are described below with respect to a radar device, e.g., radar device 101, implemented as a MIMO radar. However, in other aspects, radar device 101 may be implemented as any other type of radar utilizing a plurality of antenna elements, e.g., a Single Input Multiple Output (SIMO) radar or a Multiple Input Single output (MISO) radar.

Some demonstrative aspects may be implemented with respect to a radar device, e.g., radar device 101, implemented as a MIMO radar, e.g., as described below. However, in other aspects, radar device 101 may be implemented as any other type of radar, for example, an Electronic Beam Steering radar, a Synthetic Aperture Radar (SAR), adaptive and/or cognitive radars that change their transmission according to the environment and/or ego state, a reflect array radar, or the like.

In some demonstrative aspects, radar device 101 may include an antenna arrangement 102, a radar frontend 103 configured to communicate radar signals via the antenna arrangement 102, and a radar processor 104 configured to generate radar information based on the radar signals, e.g., as described below.

In some demonstrative aspects, radar processor 104 may be configured to process radar information of radar device 101 and/or to control one or more operations of radar device 101, e.g., as described below.

In some demonstrative aspects, radar processor 104 may include, or may be implemented, partially or entirely, by circuitry and/or logic, e.g., one or more processors including circuitry and/or logic, memory circuitry and/or logic. Additionally or alternatively, one or more functionalities of radar processor 104 may be implemented by logic, which may be executed by a machine and/or one or more processors, e.g., as described below.

In one example, radar processor 104 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In other aspects, radar processor 104 may be implemented by one or more additional or alternative elements of vehicle 100.

In some demonstrative aspects, radar frontend 103 may include, for example, one or more (radar) transmitters, and a one or more (radar) receivers, e.g., as described below.

In some demonstrative aspects, antenna arrangement 102 may include a plurality of antennas to communicate the radar signals. For example, antenna arrangement 102 may include multiple transmit antennas in the form of a transmit antenna array, and multiple receive antennas in the form of a receive antenna array. In another example, antenna arrangement 102 may include one or more antennas used both as transmit and receive antennas. In the latter case, the radar frontend 103, for example, may include a duplexer or a circulator, e.g., a circuit to separate transmitted signals from received signals.

In some demonstrative aspects, as shown in FIG. 1, the radar frontend 103 and the antenna arrangement 102 may be controlled, e.g., by radar processor 104, to transmit a radio transmit signal 105.

In some demonstrative aspects, as shown in FIG. 1, the radio transmit signal 105 may be reflected by an object 106, resulting in an echo 107.

In some demonstrative aspects, the radar device 101 may receive the echo 107, e.g., via antenna arrangement 102 and radar frontend 103, and radar processor 104 may generate radar information, for example, by calculating information about position, radial velocity (Doppler), and/or direction of the object 106, e.g., with respect to vehicle 100.

In some demonstrative aspects, radar processor 104 may be configured to provide the radar information to a vehicle controller 108 of the vehicle 100, e.g., for autonomous driving of the vehicle 100.

In some demonstrative aspects, at least part of the functionality of radar processor 104 may be implemented as part of vehicle controller 108. In other aspects, the functionality of radar processor 104 may be implemented as part of any other element of radar device 101 and/or vehicle 100. In other aspects, radar processor 104 may be implemented, as a separate part of, or as part of any other element of radar device 101 and/or vehicle 100.

In some demonstrative aspects, vehicle controller 108 may be configured to control one or more functionalities, modes of operation, components, devices, systems and/or elements of vehicle 100.

In some demonstrative aspects, vehicle controller 108 may be configured to control one or more vehicular systems of vehicle 100, e.g., as described below.

In some demonstrative aspects, the vehicular systems may include, for example, a steering system, a braking system, a driving system, and/or any other system of the vehicle 100.

In some demonstrative aspects, vehicle controller 108 may configured to control radar device 101, and/or to process one or parameters, attributes and/or information from radar device 101.

In some demonstrative aspects, vehicle controller 108 may be configured, for example, to control the vehicular systems of the vehicle 100, for example, based on radar information from radar device 101 and/or one or more other sensors of the vehicle 100, e.g., Light Detection and Ranging (LIDAR) sensors, camera sensors, and/or the like.

In one example, vehicle controller 108 may control the steering system, the braking system, and/or any other vehicular systems of vehicle 100, for example, based on the information from radar device 101, e.g., based on one or more objects detected by radar device 101.

In other aspects, vehicle controller 108 may be configured to control any other additional or alternative functionalities of vehicle 100.

Some demonstrative aspects are described herein with respect to a radar device 101 implemented in a vehicle, e.g., vehicle 100. In other aspects a radar device, e.g., radar device 101, may be implemented as part of any other element of a traffic system or network, for example, as part of a road infrastructure, and/or any other element of a traffic network or system. Other aspects may be implemented with respect to any other system, environment and/or apparatus, which may be implemented in any other object, environment, location, or place. For example, radar device 101 may be part of a non-vehicular device, which may be implemented, for example, in an indoor location, a stationary infrastructure outdoors, or any other location.

In some demonstrative aspects, radar device 101 may be configured to support security usage. In one example, radar device 101 may be configured to determine a nature of an operation, e.g., a human entry, an animal entry, an environmental movement, and the like, to identity a threat level of a detected event, and/or any other additional or alternative operations.

Some demonstrative aspects may be implemented with respect to any other additional or alternative devices and/or systems, for example, for a robot, e.g., as described below.

In other aspects, radar device 101 may be configured to support any other usages and/or applications.

Figure 2:
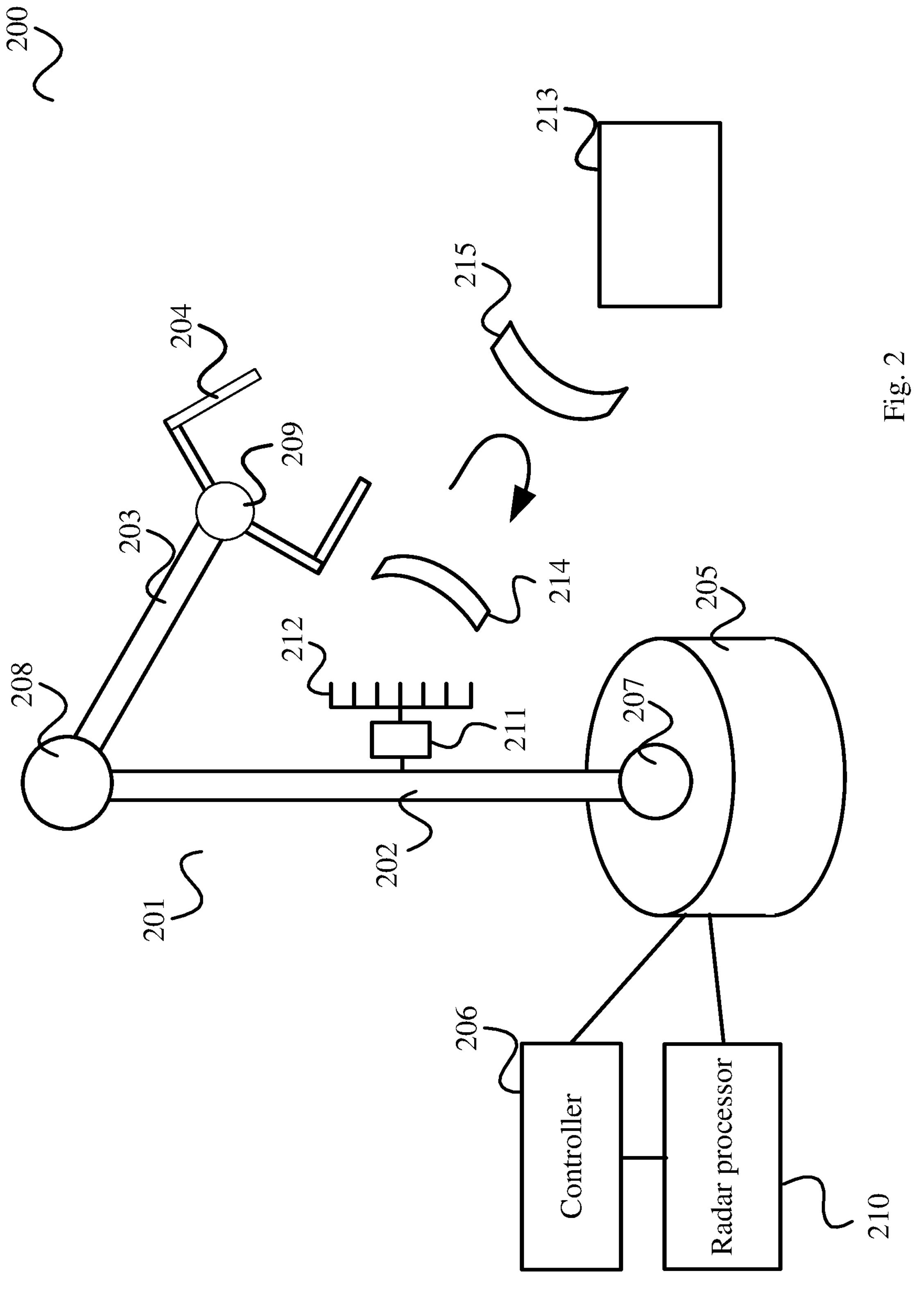
FIG. 2 is a schematic block diagram illustration of a robot implementing a radar, in accordance with some demonstrative aspects.

Reference is now made to FIG. 2, which schematically illustrates a block diagram of a robot 200 implementing a radar, in accordance with some demonstrative aspects.

In some demonstrative aspects, robot 200 may include a robot arm 201. The robot 200 may be implemented, for example, in a factory for handling an object 213, which may be, for example, a part that should be affixed to a product that is being manufactured. The robot arm 201 may include a plurality of movable members, for example, movable members 202, 203, 204, and a support 205. Moving the movable members 202, 203, and/or 204 of the robot arm 201, e.g., by actuation of associated motors, may allow physical interaction with the environment to carry out a task, e.g., handling the object 213.

In some demonstrative aspects, the robot arm 201 may include a plurality of joint elements, e.g., joint elements 207, 208, 209, which may connect, for example, the members 202, 203, and/or 204 with each other, and with the support 205. For example, a joint element 207, 208, 209 may have one or more joints, each of which may provide rotatable motion, e.g., rotational motion, and/or translatory motion, e.g., displacement, to associated members and/or motion of members relative to each other. The movement of the members 202, 203, 204 may be initiated by suitable actuators.

In some demonstrative aspects, the member furthest from the support 205, e.g., member 204, may also be referred to as the end-effector 204 and may include one or more tools, such as, a claw for gripping an object, a welding tool, or the like. Other members, e.g., members 202, 203, closer to the support 205, may be utilized to change the position of the end-effector 204, e.g., in three-dimensional space. For example, the robot arm 201 may be configured to function similarly to a human arm, e.g., possibly with a tool at its end.

In some demonstrative aspects, robot 200 may include a (robot) controller 206 configured to implement interaction with the environment, e.g., by controlling the robot arm's actuators, according to a control program, for example, in order to control the robot arm 201 according to the task to be performed.

In some demonstrative aspects, an actuator may include a component adapted to affect a mechanism or process in response to being driven. The actuator can respond to commands given by the controller 206 (the so-called activation) by performing mechanical movement. This means that an actuator, typically a motor (or electromechanical converter), may be configured to convert electrical energy into mechanical energy when it is activated (i.e. actuated).

In some demonstrative aspects, controller 206 may be in communication with a radar processor 210 of the robot 200.

In some demonstrative aspects, a radar fronted 211 and a radar antenna arrangement 212 may be coupled to the radar processor 210. In one example, radar fronted 211 and/or radar antenna arrangement 212 may be included, for example, as part of the robot arm 201.

In some demonstrative aspects, the radar frontend 211, the radar antenna arrangement 212 and the radar processor 210 may be operable as, and/or may be configured to form, a radar device. For example, antenna arrangement 212 may be configured to perform one or more functionalities of antenna arrangement 102 (FIG. 1), radar frontend 211 may be configured to perform one or more functionalities of radar frontend 103 (FIG. 1), and/or radar processor 210 may be configured to perform one or more functionalities of radar processor 104 (FIG. 1), e.g., as described above.

In some demonstrative aspects, for example, the radar frontend 211 and the antenna arrangement 212 may be controlled, e.g., by radar processor 210, to transmit a radio transmit signal 214.

In some demonstrative aspects, as shown in FIG. 2, the radio transmit signal 214 may be reflected by the object 213, resulting in an echo 215.

In some demonstrative aspects, the echo 215 may be received, e.g., via antenna arrangement 212 and radar frontend 211, and radar processor 210 may generate radar information, for example, by calculating information about position, speed (Doppler) and/or direction of the object 213, e.g., with respect to robot arm 201.

In some demonstrative aspects, radar processor 210 may be configured to provide the radar information to the robot controller 206 of the robot arm 201, e.g., to control robot arm 201. For example, robot controller 206 may be configured to control robot arm 201 based on the radar information, e.g., to grab the object 213 and/or to perform any other operation.

Figure 3:
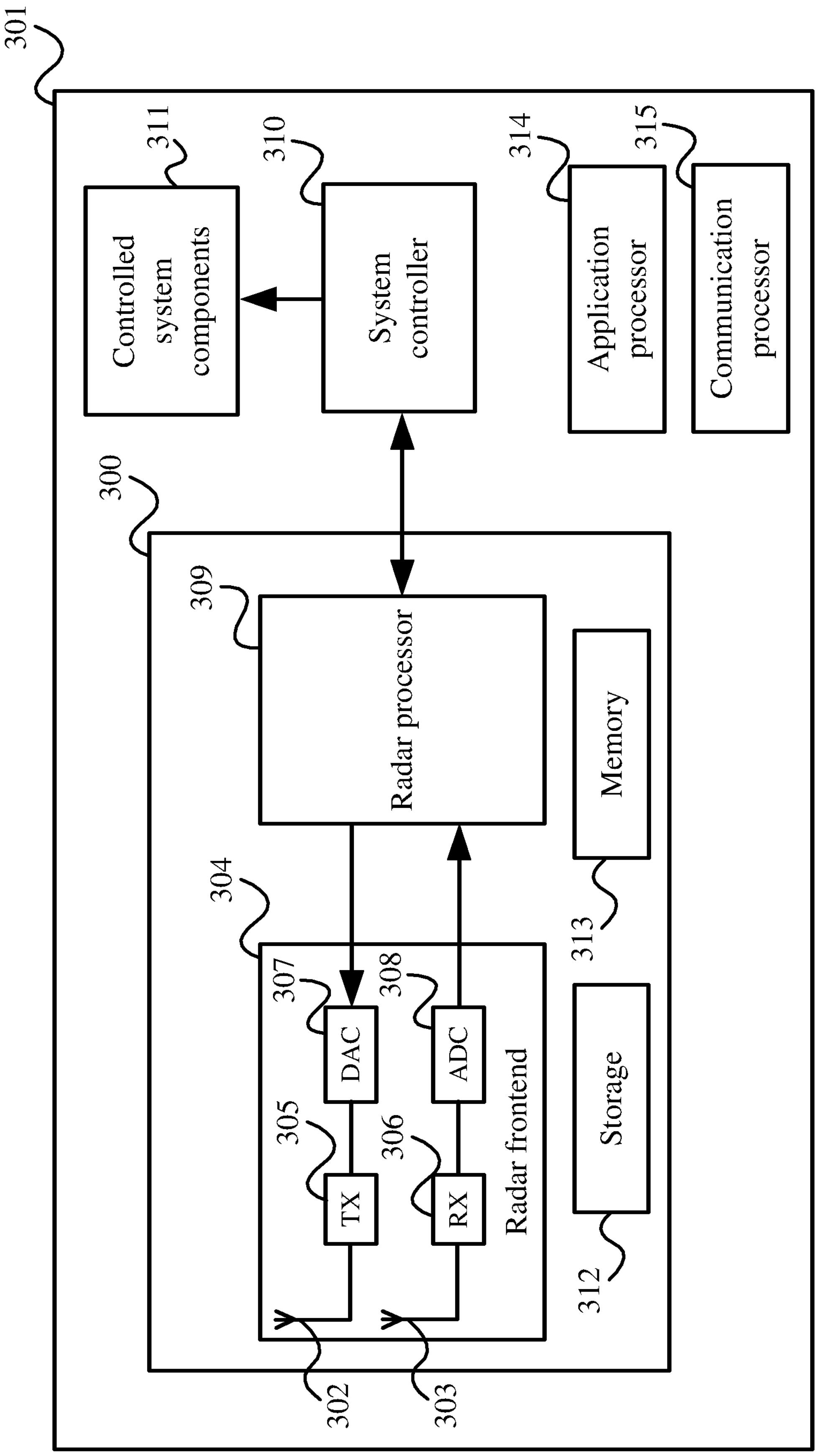
FIG. 3 is a schematic block diagram illustration of a radar apparatus, in accordance with some demonstrative aspects.

Reference is made to FIG. 3, which schematically illustrates a radar apparatus 300, in accordance with some demonstrative aspects.

In some demonstrative aspects, radar apparatus 300 may be implemented as part of a device or system 301, e.g., as described below.

For example, radar apparatus 300 may be implemented as part of, and/or may configured to perform one or more operations and/or functionalities of, the devices or systems described above with reference to FIG. 1 an/or FIG. 2. In other aspects, radar apparatus 300 may be implemented as part of any other device or system 301.

In some demonstrative aspects, radar device 300 may include an antenna arrangement, which may include one or more transmit antennas 302 and one or more receive antennas 303. In other aspects, any other antenna arrangement may be implemented.

In some demonstrative aspects, radar device 300 may include a radar frontend 304, and a radar processor 309.

In some demonstrative aspects, as shown in FIG. 3, the one or more transmit antennas 302 may be coupled with a transmitter (or transmitter arrangement) 305 of the radar frontend 304; and/or the one or more receive antennas 303 may be coupled with a receiver (or receiver arrangement) 306 of the radar frontend 304, e.g., as described below.

In some demonstrative aspects, transmitter 305 may include one or more elements, for example, an oscillator, a power amplifier and/or one or more other elements, configured to generate radio transmit signals to be transmitted by the one or more transmit antennas 302, e.g., as described below.

In some demonstrative aspects, for example, radar processor 309 may provide digital radar transmit data values to the radar frontend 304. For example, radar frontend 304 may include a Digital-to-Analog Converter (DAC) 307 to convert the digital radar transmit data values to an analog transmit signal. The transmitter 305 may convert the analog transmit signal to a radio transmit signal which is to be transmitted by transmit antennas 302.

In some demonstrative aspects, receiver 306 may include one or more elements, for example, one or more mixers, one or more filters and/or one or more other elements, configured to process, down-convert, radio signals received via the one or more receive antennas 303, e.g., as described below.

In some demonstrative aspects, for example, receiver 306 may convert a radio receive signal received via the one or more receive antennas 303 into an analog receive signal. The radar frontend 304 may include an Analog-to-Digital Converter (ADC) 308 to generate digital radar reception data values based on the analog receive signal. For example, radar frontend 304 may provide the digital radar reception data values to the radar processor 309.

In some demonstrative aspects, radar processor 309 may be configured to process the digital radar reception data values, for example, to detect one or more objects, e.g., in an environment of the device/system 301. This detection may include, for example, the determination of information including one or more of range, speed (Doppler), direction, and/or any other information, of one or more objects, e.g., with respect to the system 301.

In some demonstrative aspects, radar processor 309 may be configured to provide the determined radar information to a system controller 310 of device/system 301. For example, system controller 310 may include a vehicle controller, e.g., if device/system 301 includes a vehicular device/system, a robot controller, e.g., if device/system 301 includes a robot device/system, or any other type of controller for any other type of device/system 301.

In some demonstrative aspects, system controller 310 may be configured to control one or more controlled system components 311 of the system 301, e.g. a motor, a brake, steering, and the like, e.g. by one or more corresponding actuators.

In some demonstrative aspects, radar device 300 may include a storage 312 or a memory 313, e.g., to store information processed by radar 300, for example, digital radar reception data values being processed by the radar processor 309, radar information generated by radar processor 309, and/or any other data to be processed by radar processor 309.

In some demonstrative aspects, device/system 301 may include, for example, an application processor 314 and/or a communication processor 315, for example, to at least partially implement one or more functionalities of system controller 310 and/or to perform communication between system controller 310, radar device 300, the controlled system components 311, and/or one or more additional elements of device/system 301.

In some demonstrative aspects, radar device 300 may be configured to generate and transmit the radio transmit signal in a form, which may support determination of range, speed, and/or direction, e.g., as described below.

For example, a radio transmit signal of a radar may be configured to include a plurality of pulses. For example, a pulse transmission may include the transmission of short high-power bursts in combination with times during which the radar device listens for echoes.

For example, in order to more optimally support a highly dynamic situation, e.g., in an automotive scenario, a continuous wave (CW) may instead be used as the radio transmit signal. However, a continuous wave, e.g., with constant frequency, may support velocity determination, but may not allow range determination, e.g., due to the lack of a time mark that could allow distance calculation.

In some demonstrative aspects, radio transmit signal 105 (FIG. 1) may be transmitted according to technologies such as, for example, Frequency-Modulated continuous wave (FMCW) radar, Phase-Modulated Continuous Wave (PMCW) radar, Orthogonal Frequency Division Multiplexing (OFDM) radar, and/or any other type of radar technology, which may support determination of range, velocity, and/or direction, e.g., as described below.

Figure 4:
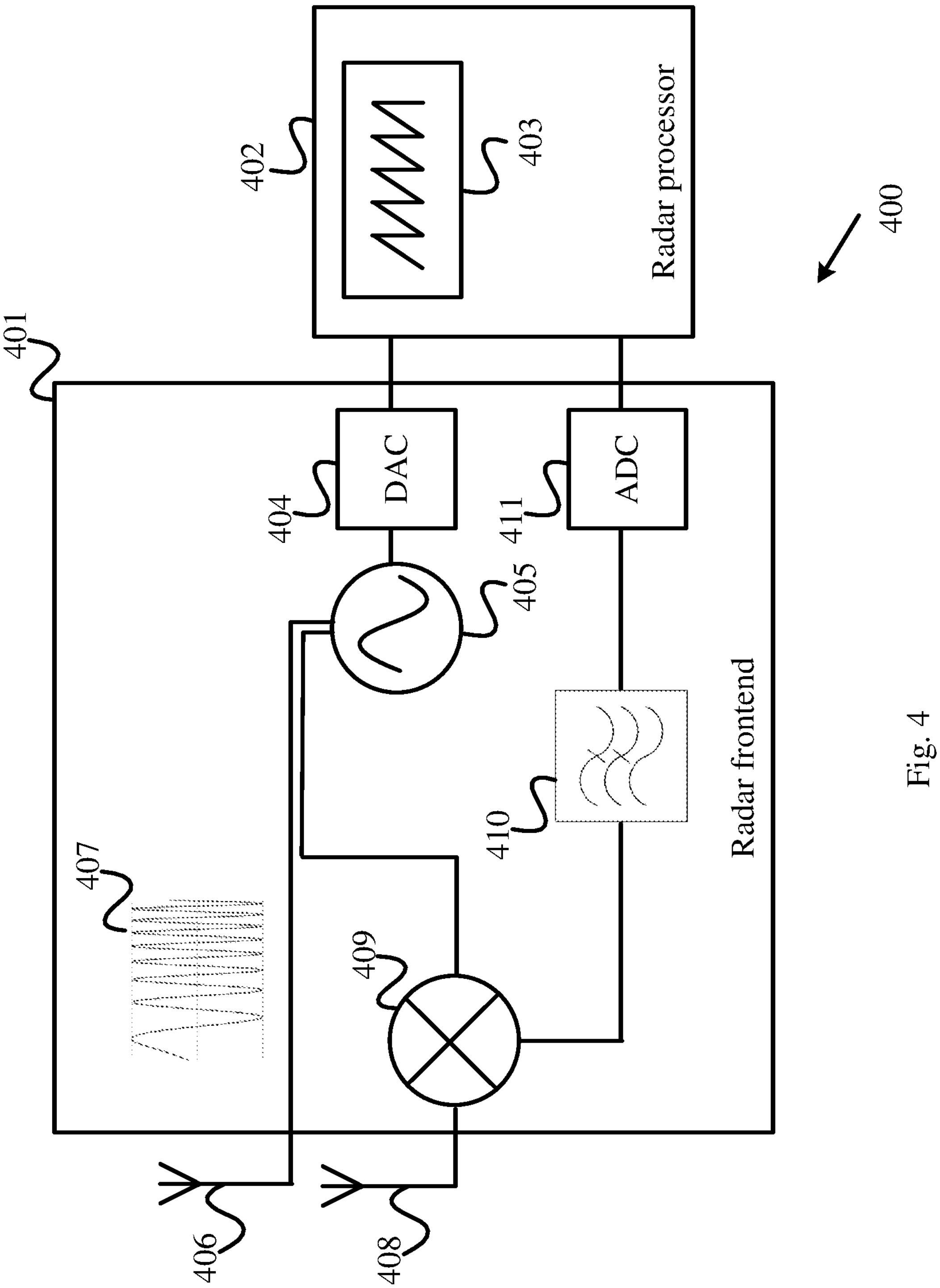
FIG. 4 is a schematic block diagram illustration of a Frequency-Modulated Continuous Wave (FMCW) radar apparatus, in accordance with some demonstrative aspects.

Reference is made to FIG. 4, which schematically illustrates a FMCW radar apparatus, in accordance with some demonstrative aspects.

In some demonstrative aspects, FMCW radar device 400 may include a radar frontend 401, and a radar processor 402. For example, radar frontend 304 (FIG. 3) may include one or more elements of, and/or may perform one or more operations and/or functionalities of, radar frontend 401; and/or radar processor 309 (FIG. 3) may include one or more elements of, and/or may perform one or more operations and/or functionalities of, radar processor 402.

In some demonstrative aspects, FMCW radar device 400 may be configured to communicate radio signals according to an FMCW radar technology, e.g., rather than sending a radio transmit signal with a constant frequency.

In some demonstrative aspects, radio frontend 401 may be configured to ramp up and reset the frequency of the transmit signal, e.g., periodically, for example, according to a saw tooth waveform 403. In other aspects, a triangle waveform, or any other suitable waveform may be used.

In some demonstrative aspects, for example, radar processor 402 may be configured to provide waveform 403 to frontend 401, for example, in digital form, e.g., as a sequence of digital values.

In some demonstrative aspects, radar frontend 401 may include a DAC 404 to convert waveform 403 into analog form, and to supply it to a voltage-controlled oscillator 405. For example, oscillator 405 may be configured to generate an output signal, which may be frequency-modulated in accordance with the waveform 403.

In some demonstrative aspects, oscillator 405 may be configured to generate the output signal including a radio transmit signal, which may be fed to and sent out by one or more transmit antennas 406.

In some demonstrative aspects, the radio transmit signal generated by the oscillator 405 may have the form of a sequence of chirps 407, which may be the result of the modulation of a sinusoid with the saw tooth waveform 403.

In one example, a chirp 407 may correspond to the sinusoid of the oscillator signal frequency-modulated by a "tooth" of the saw tooth waveform 403, e.g., from the minimum frequency to the maximum frequency.

In some demonstrative aspects, FMCW radar device 400 may include one or more receive antennas 408 to receive a radio receive signal. The radio receive signal may be based on the echo of the radio transmit signal, e.g., in addition to any noise, interference, or the like.

In some demonstrative aspects, radar frontend 401 may include a mixer 409 to mix the radio transmit signal with the radio receive signal into a mixed signal.

In some demonstrative aspects, radar frontend 401 may include a filter, e.g., a Low Pass Filter (LPF) 410, which may be configured to filter the mixed signal from the mixer 409 to provide a filtered signal. For example, radar frontend 401 may include an ADC 411 to convert the filtered signal into digital reception data values, which may be provided to radar processor 402. In another example, the filter 410 may be a digital filter, and the ADC 411 may be arranged between the mixer 409 and the filter 410.

In some demonstrative aspects, radar processor 402 may be configured to process the digital reception data values to provide radar information, for example, including range, speed (velocity/Doppler), and/or direction (AoA) information of one or more objects.

In some demonstrative aspects, radar processor 402 may be configured to perform a first Fast Fourier Transform (FFT) (also referred to as "range FFT") to extract a delay response, which may be used to extract range information, and/or a second FFT (also referred to as "Doppler FFT") to extract a Doppler shift response, which may be used to extract velocity information, from the digital reception data values.

In other aspects, any other additional or alternative methods may be utilized to extract range information. In one example, in a digital radar implementation, a correlation with the transmitted signal may be used, e.g., according to a matched filter implementation.

Figure 5:
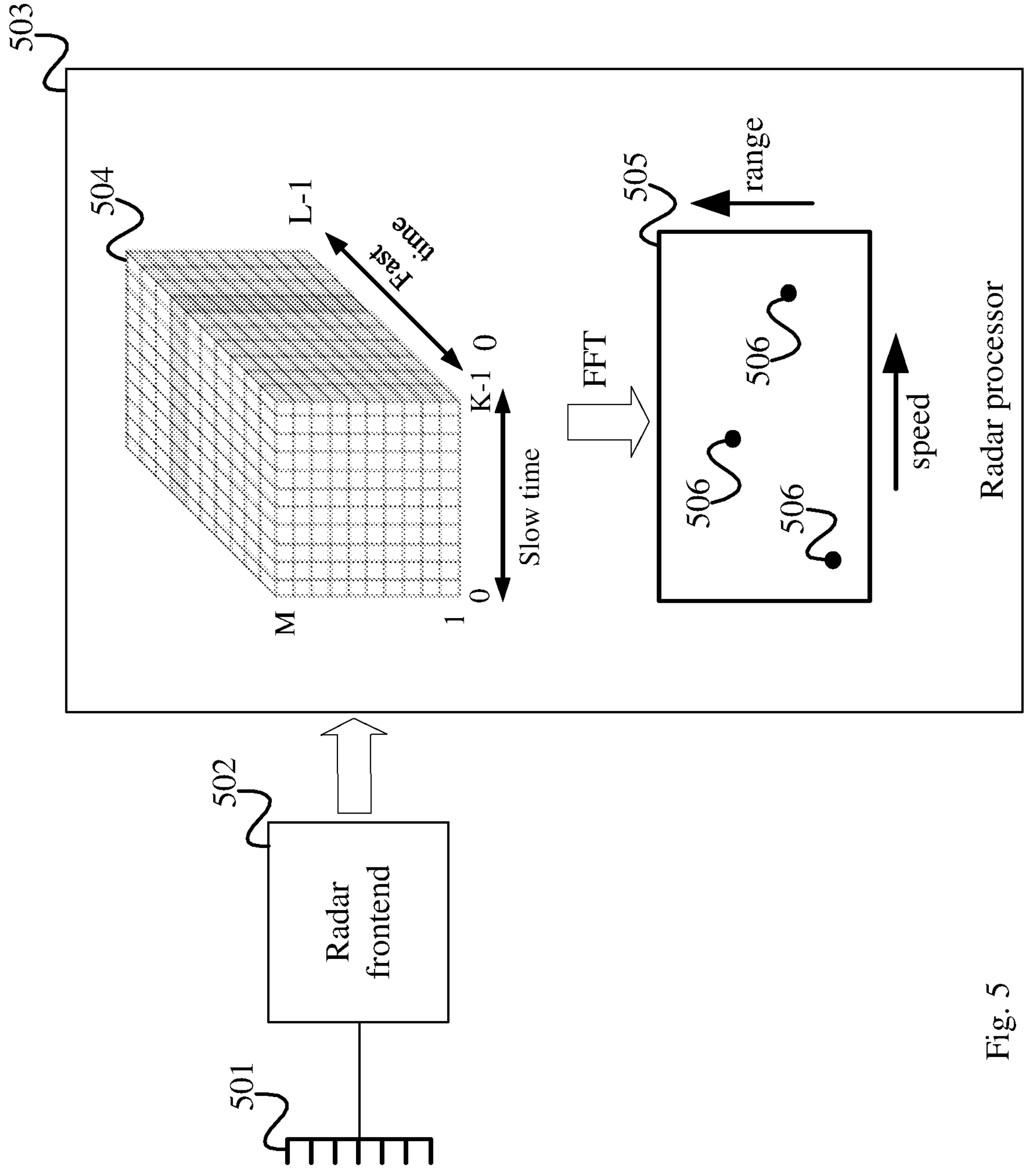
FIG. 5 is a schematic illustration of an extraction scheme, which may be implemented to extract range and speed (Doppler) estimations from digital reception radar data values, in accordance with some demonstrative aspects.

Reference is made to FIG. 5, which schematically illustrates an extraction scheme, which may be implemented to extract range and speed (Doppler) estimations from digital reception radar data values, in accordance with some demonstrative aspects. For example, radar processor 104 (FIG. 1), radar processor 210 (FIG. 2), radar processor 309 (FIG. 3), and/or radar processor 402 (FIG. 4), may be configured to extract range and/or speed (Doppler) estimations from digital reception radar data values according to one or more aspects of the extraction scheme of FIG. 5.

In some demonstrative aspects, as shown in FIG. 5, a radio receive signal, e.g., including echoes of a radio transmit signal, may be received by a receive antenna array 501. The radio receive signal may be processed by a radio radar frontend 502 to generate digital reception data values, e.g., as described above. The radio radar frontend 502 may provide the digital reception data values to a radar processor 503, which may process the digital reception data values to provide radar information, e.g., as described above.

In some demonstrative aspects, the digital reception data values may be represented in the form of a data cube 504. For example, the data cube 504 may include digitized samples of the radio receive signal, which is based on a radio signal transmitted from a transmit antenna and received by M receive antennas. In some demonstrative aspects, for example, with respect to a MIMO implementation, there may be multiple transmit antennas, and the number of samples may be multiplied accordingly.

In some demonstrative aspects, a layer of the data cube 504, for example, a horizontal layer of the data cube 504, may include samples of an antenna, e.g., a respective antenna of the M antennas.

In some demonstrative aspects, data cube 504 may include samples for K chirps. For example, as shown in FIG. 5, the samples of the chirps may be arranged in a so-called "slow time"-direction.

In some demonstrative aspects, the data cube 504 may include L samples, e.g., L=512 or any other number of samples, for a chirp, e.g., per each chirp. For example, as shown in FIG. 5, the samples per chirp may be arranged in a so-called "fast time"-direction of the data cube 504.

In some demonstrative aspects, radar processor 503 may be configured to process a plurality of samples, e.g., L samples collected for each chirp and for each antenna, by a first FFT. The first FFT may be performed, for example, for each chirp and each antenna, such that a result of the processing of the data cube 504 by the first FFT may again have three dimensions, and may have the size of the data cube 504 while including values for L range bins, e.g., instead of the values for the L sampling times.

In some demonstrative aspects, radar processor 503 may be configured to process the result of the processing of the data cube 504 by the first FFT, for example, by processing the result according to a second FFT along the chirps, e.g., for each antenna and for each range bin.

For example, the first FFT may be in the "fast time" direction, and the second FFT may be in the "slow time" direction.

In some demonstrative aspects, the result of the second FFT may provide, e.g., when aggregated over the antennas, a range/Doppler (R/D) map 505. The R/D map may have FFT peaks 506, for example, including peaks of FFT output values (in terms of absolute values) for certain range/speed combinations, e.g., for range/Doppler bins. For example, a range/Doppler bin may correspond to a range bin and a Doppler bin. For example, radar processor 503 may consider a peak as potentially corresponding to an object, e.g., of the range and speed corresponding to the peak's range bin and speed bin.

In some demonstrative aspects, the extraction scheme of FIG. 5 may be implemented for an FMCW radar, e.g., FMCW radar 400 (FIG. 4), as described above. In other aspects, the extraction scheme of FIG. 5 may be implemented for any other radar type. In one example, the radar processor 503 may be configured to determine a range/Doppler map 505 from digital reception data values of a PMCW radar, an OFDM radar, or any other radar technologies. For example, in adaptive or cognitive radar, the pulses in a frame, the waveform and/or modulation may be changed over time, e.g., according to the environment.

Referring back to FIG. 3, in some demonstrative aspects, receive antenna arrangement 303 may be implemented using a receive antenna array having a plurality of receive antennas (or receive antenna elements). For example, radar processor 309 may be configured to determine an angle of arrival of the received radio signal, e.g., echo 107 (FIG. 1) and/or echo 215 (FIG. 2). For example, radar processor 309 may be configured to determine a direction of a detected object, e.g., with respect to the device/system 301, for example, based on the angle of arrival of the received radio signal, e.g., as described below.

Figure 6:
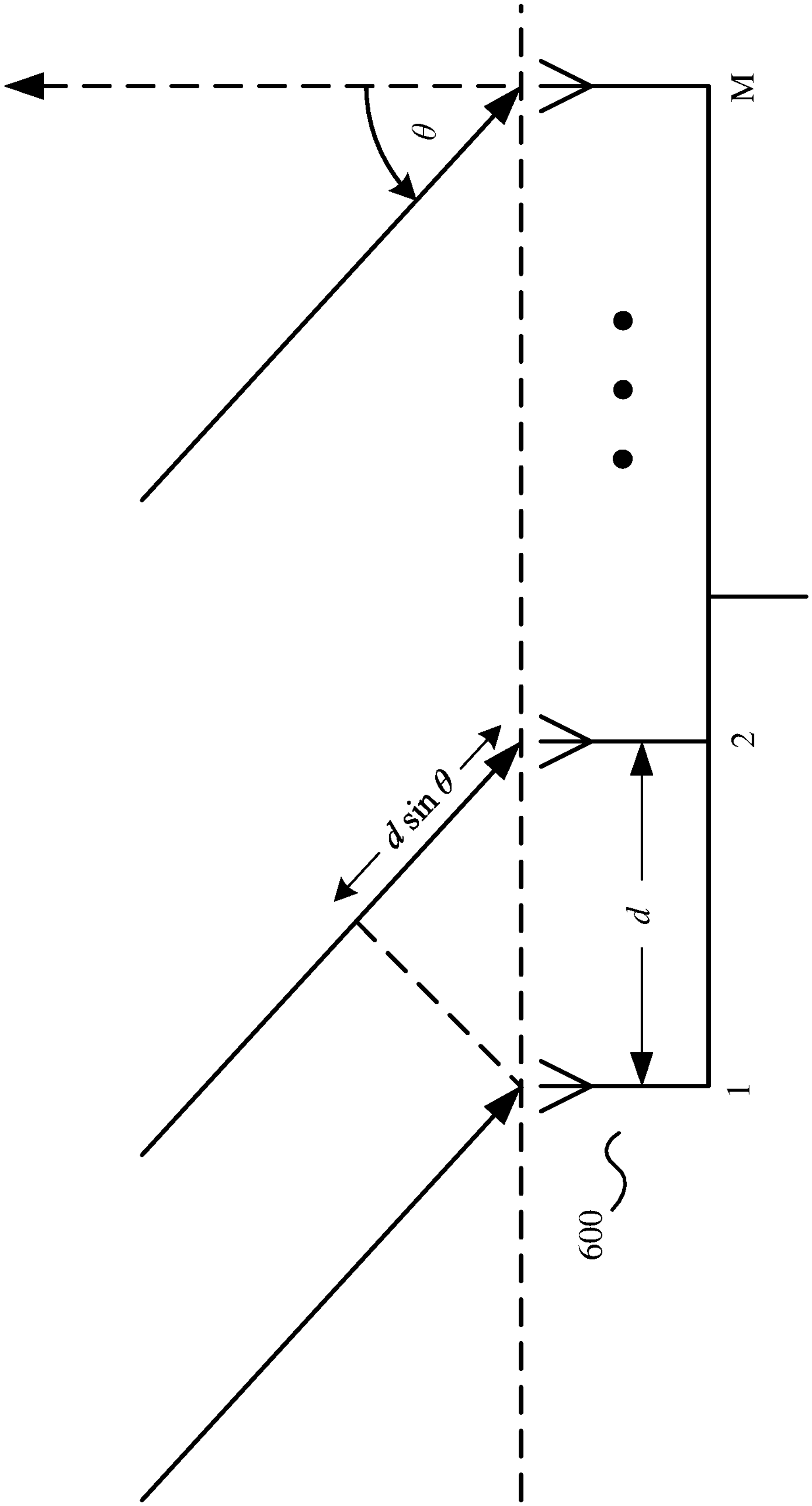
FIG. 6 is a schematic illustration of an angle-determination scheme, which may be implemented to determine Angle of Arrival (AoA) information based on an incoming radio signal received by a receive antenna array, in accordance with some demonstrative aspects.

Reference is made to FIG. 6, which schematically illustrates an angle-determination scheme, which may be implemented to determine Angle of Arrival (AoA) information based on an incoming radio signal received by a receive antenna array 600, in accordance with some demonstrative aspects.

FIG. 6 depicts an angle-determination scheme based on received signals at the receive antenna array. In some demonstrative aspects, for example, in a virtual MIMO array, the angle-determination may also be based on the signals transmitted by the array of Tx antennas.

FIG. 6 depicts a one-dimensional angle-determination scheme. Other multi-dimensional angle determination schemes, e.g., a two-dimensional scheme or a three-dimensional scheme, may be implemented.

In some demonstrative aspects, as shown in FIG. 6, the receive antenna array 600 may include M antennas (numbered, from left to right, 1 to M).

As shown by the arrows in FIG. 6, it is assumed that an echo is coming from an object located at the top left direction. Accordingly, the direction of the echo, e.g., the incoming radio signal, may be towards the bottom right. According to this example, the further to the left a receive antenna is located, the earlier it will receive a certain phase of the incoming radio signal.

For example, a phase difference, denoted $\Delta\varphi$, between two antennas of the receive antenna array 600 may be determined, e.g., as follows:

$$\Delta\varphi = \frac{2\pi}{\lambda} \cdot d \cdot \sin(\theta)$$

wherein $\lambda$ denotes a wavelength of the incoming radio signal, d denotes a distance between the two antennas, and 0 denotes an angle of arrival of the incoming radio signal, e.g., with respect to a normal direction of the array.

In some demonstrative aspects, radar processor 309 (FIG. 3) may be configured to utilize this relationship between phase and angle of the incoming radio signal, for example, to determine the angle of arrival of echoes, for example by performing an FFT, e.g., a third FFT ("angular FFT") over the antennas.

In some demonstrative aspects, multiple transmit antennas, e.g., in the form of an antenna array having multiple transmit antennas, may be used, for example, to increase the spatial resolution, e.g., to provide high-resolution radar information. For example, a MIMO radar device may utilize a virtual MIMO radar antenna, which may be formed as a convolution of a plurality of transmit antennas convolved with a plurality of receive antennas.

Figure 7:
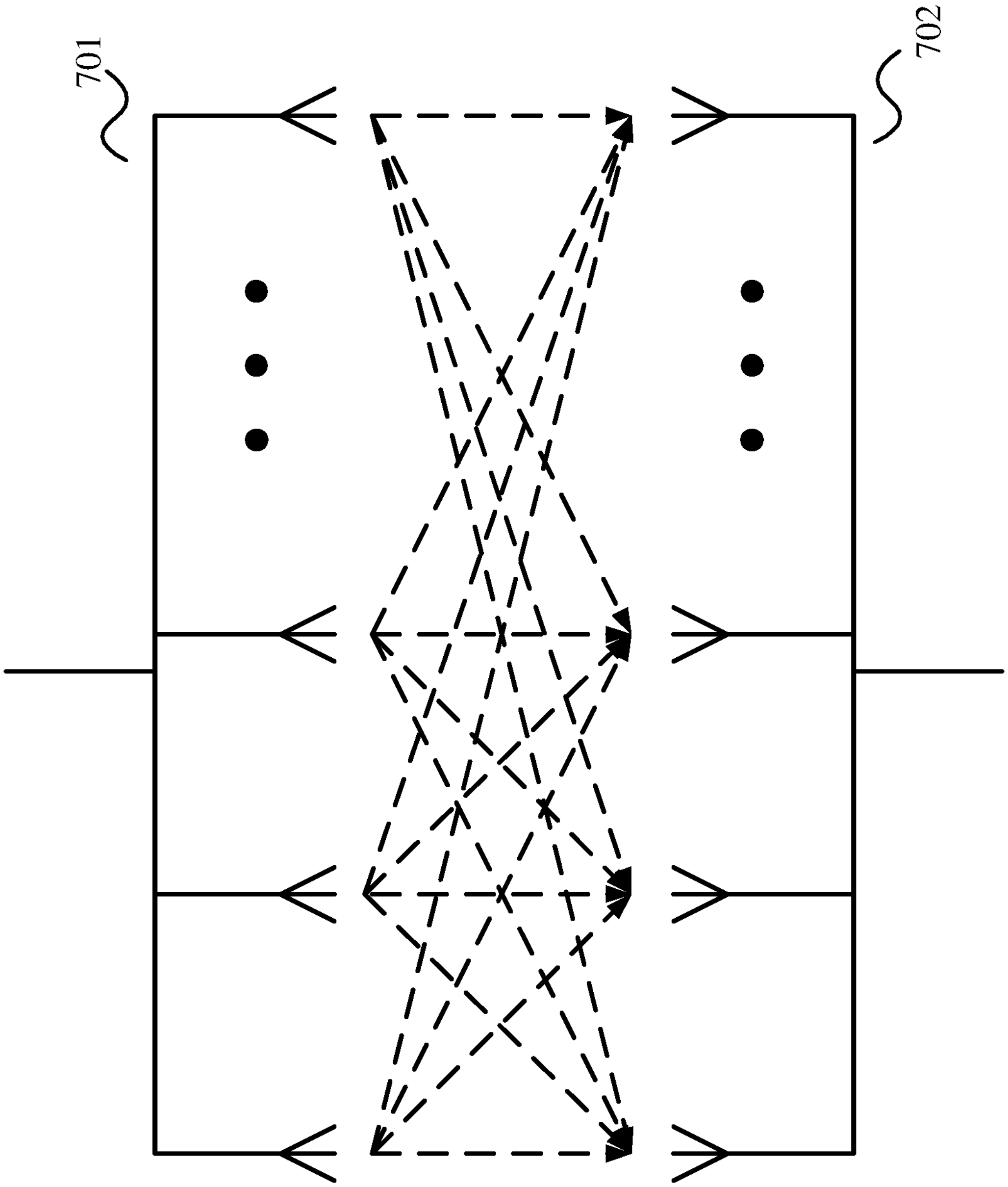
FIG. 7 is a schematic illustration of a Multiple-Input-Multiple-Output (MIMO) radar antenna scheme, which may be implemented based on a combination of Transmit (Tx) and Receive (Rx) antennas, in accordance with some demonstrative aspects.

Reference is made to FIG. 7, which schematically illustrates a MIMO radar antenna scheme, which may be implemented based on a combination of Transmit (Tx) and Receive (Rx) antennas, in accordance with some demonstrative aspects.

In some demonstrative aspects, as shown in FIG. 7, a radar MIMO arrangement may include a transmit antenna array 701 and a receive antenna array 702. For example, the one or more transmit antennas 302 (FIG. 3) may be implemented to include transmit antenna array 701, and/or the one or more receive antennas 303 (FIG. 3) may be implemented to include receive antenna array 702.

In some demonstrative aspects, antenna arrays including multiple antennas both for transmitting the radio transmit signals and for receiving echoes of the radio transmit signals, may be utilized to provide a plurality of virtual channels as illustrated by the dashed lines in FIG. 7. For example, a virtual channel may be formed as a convolution, for example, as a Kronecker product, between a transmit antenna and a receive antenna, e.g., representing a virtual steering vector of the MIMO radar.

In some demonstrative aspects, a transmit antenna, e.g., each transmit antenna, may be configured to send out an individual radio transmit signal, e.g., having a phase associated with the respective transmit antenna.

For example, an array of N transmit antennas and M receive antennas may be implemented to provide a virtual MIMO array of size N×M. For example, the virtual MIMO array may be formed according to the Kronecker product operation applied to the Tx and Rx steering vectors.

Figure 8:
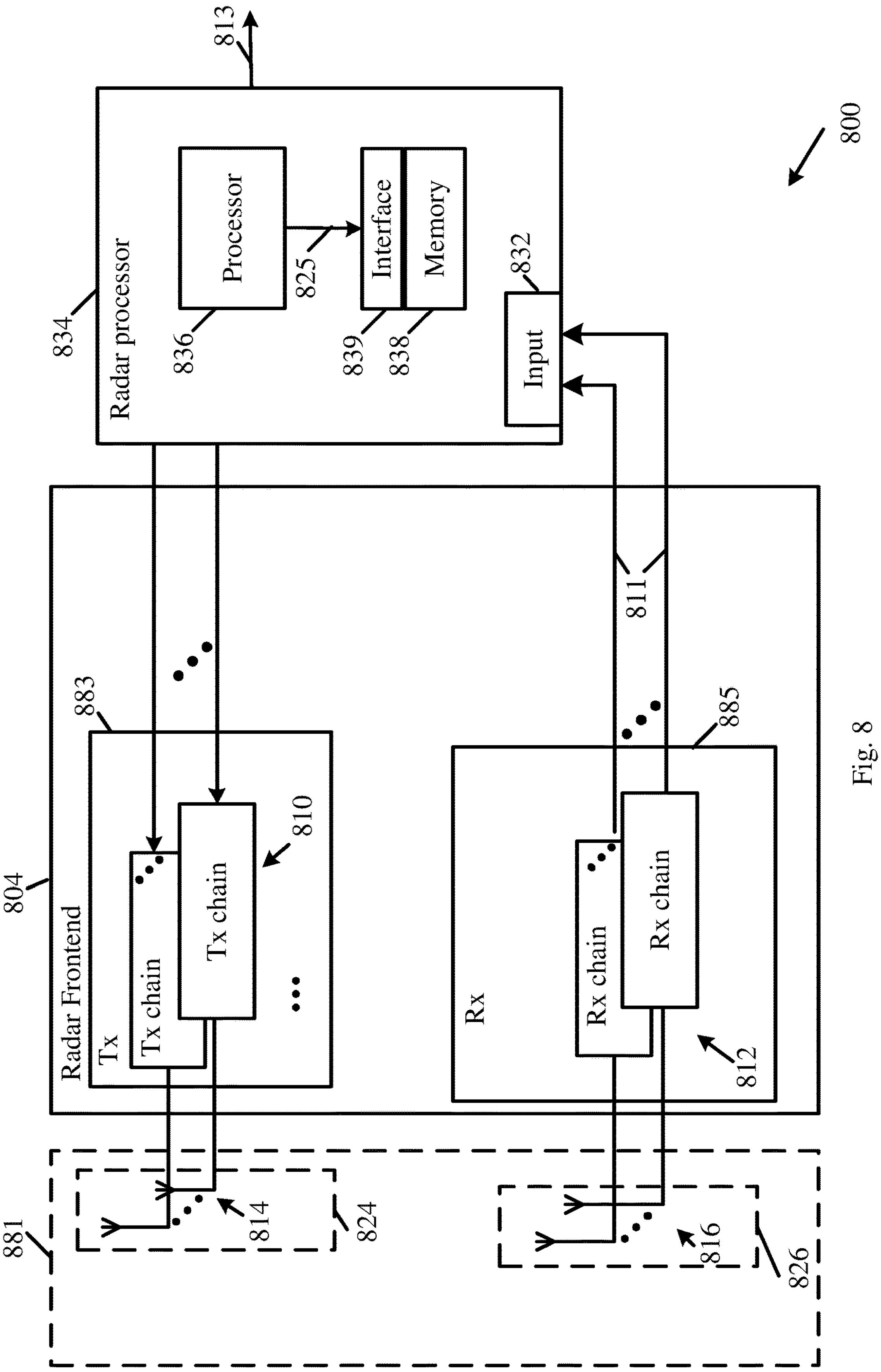
FIG. 8 is a schematic block diagram illustration of elements of a radar device including a radar frontend and a radar processor, in accordance with some demonstrative aspects.

FIG. 8 is a schematic block diagram illustration of elements of a radar device 800, in accordance with some demonstrative aspects. For example, radar device 101 (FIG. 1), radar device 300 (FIG. 3), and/or radar device 400 (FIG. 4), may include one or more elements of radar device 800, and/or may perform one or more operations and/or functionalities of radar device 800.

In some demonstrative aspects, as shown in FIG. 8, radar device 800 may include a radar frontend 804 and a radar processor 834. For example, radar frontend 103 (FIG. 1), radar frontend 211 (FIG. 1), radar frontend 304 (FIG. 3), radar frontend 401 (FIG. 4), and/or radar frontend 502 (FIG. 5), may include one or more elements of radar frontend 804, and/or may perform one or more operations and/or functionalities of radar frontend 804.

In some demonstrative aspects, radar frontend 804 may be implemented as part of a MIMO radar utilizing a MIMO radar antenna 881 including a plurality of Tx antennas 814 configured to transmit a plurality of Tx RF signals (also referred to as "Tx radar signals"); and a plurality of Rx antennas 816 configured to receive a plurality of Rx RF signals (also referred to as "Rx radar signals"), for example, based on the Tx radar signals, e.g., as described below.

In some demonstrative aspects, MIMO antenna array 881, antennas 814, and/or antennas 816 may include or may be part of any type of antennas suitable for transmitting and/or receiving radar signals. For example, MIMO antenna array 881, antennas 814, and/or antennas 816, may be implemented as part of any suitable configuration, structure, and/or arrangement of one or more antenna elements, components, units, assemblies, and/or arrays. For example, MIMO antenna array 881, antennas 814, and/or antennas 816, may be implemented as part of a phased array antenna, a multiple element antenna, a set of switched beam antennas, and/or the like. In some aspects, MIMO antenna array 881, antennas 814, and/or antennas 816, may be implemented to support transmit and receive functionalities using separate transmit and receive antenna elements. In some aspects, MIMO antenna array 881, antennas 814, and/or antennas 816, may be implemented to support transmit and receive functionalities using common and/or integrated transmit/receive elements.

In some demonstrative aspects, MIMO radar antenna 881 may include a rectangular MIMO antenna array, and/or curved array, e.g., shaped to fit a vehicle design. In other aspects, any other form, shape and/or arrangement of MIMO radar antenna 881 may be implemented.

In some demonstrative aspects, radar frontend 804 may include one or more radios configured to generate and transmit the Tx RF signals via Tx antennas 814; and/or to process the Rx RF signals received via Rx antennas 816, e.g., as described below.

In some demonstrative aspects, radar frontend 804 may include at least one transmitter (Tx) 883 including circuitry and/or logic configured to generate and/or transmit the Tx radar signals via Tx antennas 814.

In some demonstrative aspects, radar frontend 804 may include at least one receiver (Rx) 885 including circuitry and/or logic to receive and/or process the Rx radar signals received via Rx antennas 816, for example, based on the Tx radar signals.

In some demonstrative aspects, transmitter 883, and/or receiver 885 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, transmitter 883 may include a plurality of Tx chains 810 configured to generate and transmit the Tx RF signals via Tx antennas 814, e.g., respectively; and/or receiver 885 may include a plurality of Rx chains 812 configured to receive and process the Rx RF signals received via the Rx antennas 816, e.g., respectively.

In some demonstrative aspects, radar processor 834 may be configured to generate radar information 813, for example, based on the radar signals communicated by MIMO radar antenna 881, e.g., as described below. For example, radar processor 104 (FIG. 1), radar processor 210 (FIG. 2), radar processor 309 (FIG. 3), radar processor 402 (FIG. 4), and/or radar processor 503 (FIG. 5), may include one or more elements of radar processor 834, and/or may perform one or more operations and/or functionalities of radar processor 834.

In some demonstrative aspects, radar processor 834 may be configured to generate radar information 813, for example, based on radar Rx data 811 received from the plurality of Rx chains 812. For example, radar Rx data 811 may be based on the radar Rx signals received via the Rx antennas 816.

In some demonstrative aspects, radar processor 834 may include an input 832 to receive radar input data, e.g., including the radar Rx data 811 from the plurality of Rx chains 812.

In some demonstrative aspects, radar processor 834 may include, or may be implemented, partially or entirely, by circuitry and/or logic, e.g., one or more processors including circuitry and/or logic, memory circuitry and/or logic. Additionally or alternatively, one or more functionalities of radar processor 834 may be implemented by logic, which may be executed by a machine and/or one or more processors, e.g., as described below.

In some demonstrative aspects, radar processor 834 may include at least one processor 836, which may be configured, for example, to process the radar Rx data 811, and/or to perform one or more operations, methods, and/or algorithms.

In some demonstrative aspects, radar processor 834 may include at least one memory 838, e.g., coupled to the processor 836. For example, memory 838 may be configured to store data processed by radar processor 834. For example, memory 838 may store, e.g., at least temporarily, at least some of the information processed by the processor 836, and/or logic to be utilized by the processor 836.

In some demonstrative aspects, processor 836 may interface with memory 838, for example, via a memory interface 839.

In some demonstrative aspects, processor 836 may be configured to access memory 838, e.g., to write data to memory 838 and/or to read data from memory 838, for example, via memory interface 839.

In some demonstrative aspects, memory 838 may be configured to store at least part of the radar data, e.g., some of the radar Rx data or all of the radar Rx data, for example, for processing by processor 836, e.g., as described below.

In some demonstrative aspects, memory 838 may be configured to store processed data, which may be generated by processor 836, for example, during the process of generating the radar information 813, e.g., as described below.

In some demonstrative aspects, memory 838 may be configured to store range information and/or Doppler information, which may be generated by processor 836, for example, based on the radar Rx data. In one example, the range information and/or Doppler information may be determined based on a Cross-Correlation (XCORR) operation, which may be applied to the radar Rx data. Any other additional or alternative operation, algorithm and/or procedure may be utilized to generate the range information and/or Doppler information.

In some demonstrative aspects, memory 838 may be configured to store AoA information, which maybe generated by processor 836, for example, based on the radar Rx data, the range information and/or Doppler information. In one example, the AoA information may be determined based on an AoA estimation algorithm. Any other additional or alternative operation, algorithm and/or procedure may be utilized to generate the AoA information.

In some demonstrative aspects, radar processor 834 may be configured to generate the radar information 813 including one or more of range information, Doppler information, and/or AoA information.

In some demonstrative aspects, the radar information 813 may include Point Cloud 1 (PC1) information, for example, including raw point cloud estimations, e.g., Range, Radial Velocity, Azimuth and/or Elevation.

In some demonstrative aspects, the radar information 813 may include Point Cloud 2 (PC2) information, which may be generated, for example, based on the PC1 information. For example, the PC2 information may include clustering information, tracking information, e.g., tracking of probabilities and/or density functions, bounding box information, classification information, orientation information, and the like.

In some demonstrative aspects, the radar information 813 may include target tracking information corresponding to a plurality of targets in an environment of the radar device 800, e.g., as described below.

In some demonstrative aspects, radar processor 834 may be configured to generate the radar information 813 in the form of four Dimensional (4D) image information, e.g., a cube, which may represent 4D information corresponding to one or more detected targets.

In some demonstrative aspects, the 4D image information may include, for example, range values, e.g., based on the range information, velocity values, e.g., based on the Doppler information, azimuth values, e.g., based on azimuth AoA information, elevation values, e.g., based on elevation AoA information, and/or any other values.

In some demonstrative aspects, radar processor 834 may be configured to generate the radar information 813 in any other form, and/or including any other additional or alternative information.

In some demonstrative aspects, radar processor 834 may be configured to process the signals communicated via MIMO radar antenna 881 as signals of a virtual MIMO array formed by a convolution of the plurality of Rx antennas 816 and the plurality of Tx antennas 814.

In some demonstrative aspects, radar frontend 804 and/or radar processor 834 may be configured to utilize MIMO techniques, for example, to support a reduced physical array aperture, e.g., an array size, and/or utilizing a reduced number of antenna elements. For example, radar frontend 804 and/or radar processor 834 may be configured to transmit orthogonal signals via one or more Tx arrays 824 including a plurality of N elements, e.g., Tx antennas 814, and processing received signals via one or more Rx arrays 826 including a plurality of M elements, e.g., Rx antennas 816.

In some demonstrative aspects, utilizing the MIMO technique of transmission of the orthogonal signals from the Tx arrays 824 with N elements and processing the received signals in the Rx arrays 826 with M elements may be equivalent, e.g., under a far field approximation, to a radar utilizing transmission from one antenna and reception with N*M antennas. For example, radar frontend 804 and/or radar processor 834 may be configured to utilize MIMO antenna array 881 as a virtual array having an equivalent array size of N*M, which may define locations of virtual elements, for example, as a convolution of locations of physical elements, e.g., the antennas 814 and/or 816.

In some demonstrative aspects, a radar system may include a plurality of radar devices 800. For example, vehicle 100 (FIG. 1) may include a plurality of radar devices 800, e.g., as described below.

Figure 9:
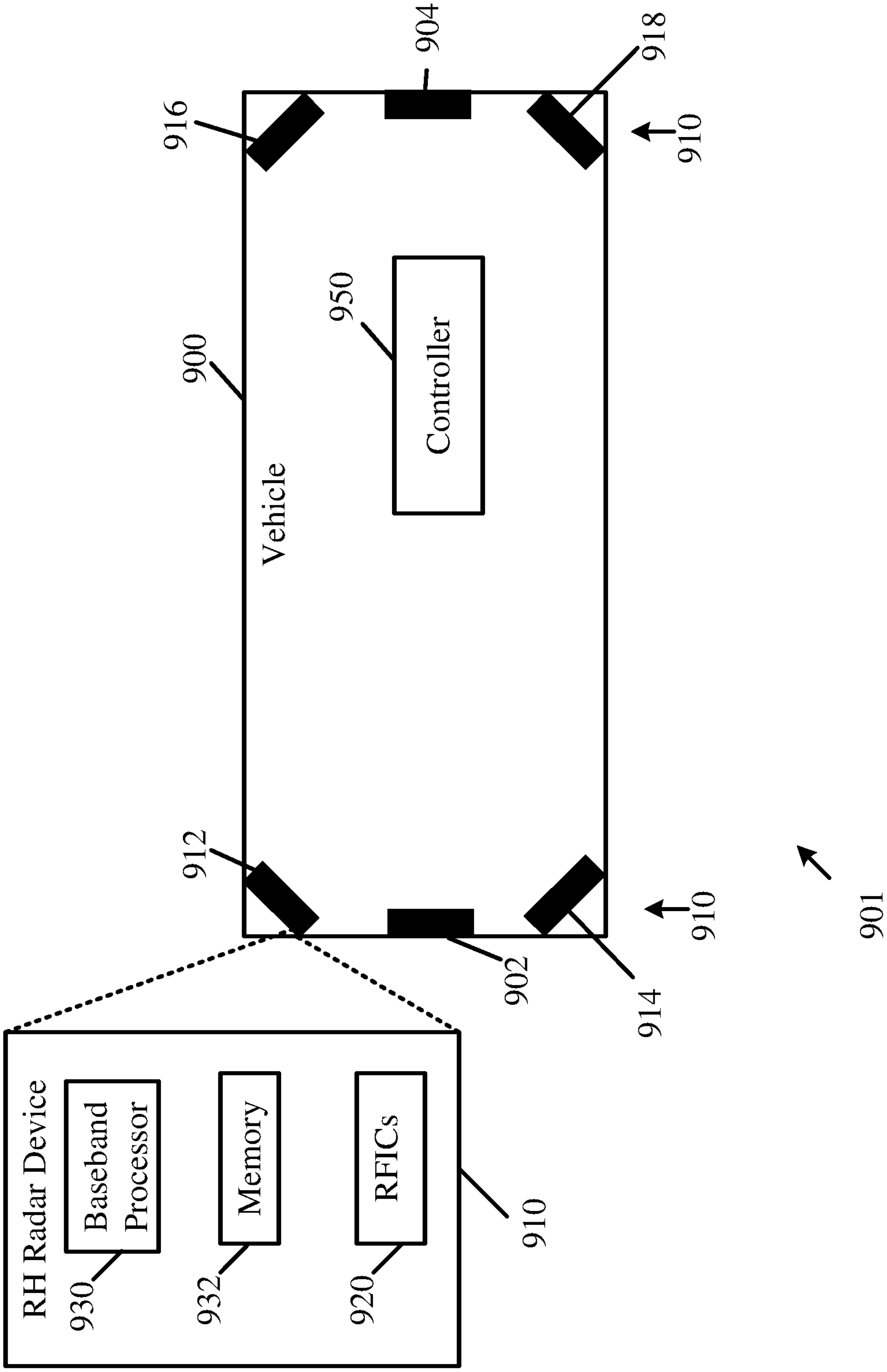
FIG. 9 is a schematic illustration of a radar system including a plurality of radar devices implemented in a vehicle, in accordance with some demonstrative aspects.

Reference is made to FIG. 9, which schematically illustrates a radar system 901 including a plurality of Radio Head (RH) radar devices (also referred to as RHs) 910 implemented in a vehicle 900, in accordance with some demonstrative aspects.

In some demonstrative aspects, as shown in FIG. 9, the plurality of RH radar devices 910 may be located, for example, at a plurality of positions around vehicle 900, for example, to provide radar sensing at a large field of view around vehicle 900, e.g., as described below.

In some demonstrative aspects, as shown in FIG. 9, the plurality of RH radar devices 910 may include, for example, six RH radar devices 910, e.g., as described below.

In some demonstrative aspects, the plurality of RH radar devices 910 may be located, for example, at a plurality of positions around vehicle 900, which may be configured to support 360-degrees radar sensing, e.g., a field of view of 360 degrees surrounding the vehicle 900, e.g., as described below.

In one example, the 360-degrees radar sensing may allow to provide a radar-based view of substantially all surroundings around vehicle 900, e.g., as described below.

In other aspects, the plurality of RH radar devices 910 may include any other number of RH radar devices 910, e.g., less than six radar devices or more than six radar devices.

In other aspects, the plurality of RH radar devices 910 may be positioned at any other locations and/or according to any other arrangement, which may support radar sensing at any other field of view around vehicle 900, e.g., 360-degrees radar sensing or radar sensing of any other field of view.

In some demonstrative aspects, as shown in FIG. 9, vehicle 900 may include a first RH radar device 902, e.g., a front RH, at a front-side of vehicle 900.

In some demonstrative aspects, as shown in FIG. 9, vehicle 900 may include a second RH radar device 904, e.g., a back RH, at a back-side of vehicle 900.

In some demonstrative aspects, as shown in FIG. 9, vehicle 900 may include one or more of RH radar devices at one or more respective corners of vehicle 900. For example, vehicle 900 may include a first corner RH radar device 912 at a first corner of vehicle 900, a second corner RH radar device 914 at a second corner of vehicle 900, a third corner RH radar device 916 at a third corner of vehicle 900, and/or a fourth corner RH radar device 918 at a fourth corner of vehicle 900.

In some demonstrative aspects, vehicle 900 may include one, some, or all, of the plurality of RH radar devices 910 shown in FIG. 9. For example, vehicle 900 may include the front RH radar device 902 and/or back RH radar device 904.

In other aspects, vehicle 900 may include any other additional or alternative radar devices, for example, at any other additional or alternative positions around vehicle 900. In one example, vehicle 900 may include a side radar, e.g., on a side of vehicle 900.

In some demonstrative aspects, as shown in FIG. 9, vehicle 900 may include a radar system controller 950 configured to control one or more, e.g., some or all, of the RH radar devices 910.

In some demonstrative aspects, at least part of the functionality of radar system controller 950 may be implemented by a dedicated controller, e.g., a dedicated system controller or central controller, which may be separate from the RH radar devices 910, and may be configured to control some or all of the RH radar devices 910.

In some demonstrative aspects, at least part of the functionality of radar system controller 950 may be implemented as part of at least one RH radar device 910.

In some demonstrative aspects, at least part of the functionality of radar system controller 950 may be implemented by a radar processor of an RH radar device 910. For example, radar processor 834 (FIG. 8) may include one or more elements of radar system controller 950, and/or may perform one or more operations and/or functionalities of radar system controller 950.

In some demonstrative aspects, at least part of the functionality of radar system controller 950 may be implemented by a system controller of vehicle 900. For example, vehicle controller 108 (FIG. 1) may include one or more elements of radar system controller 950, and/or may perform one or more operations and/or functionalities of radar system controller 950.

In other aspects, one or more functionalities of system controller 950 may be implemented as part of any other element of vehicle 900.

In some demonstrative aspects, as shown in FIG. 9, an RH radar device 910 of the plurality of RH radar devices 910, may include a baseband processor 930 (also referred to as a "Baseband Processing Unit (BPU)"), which may be configured to control communication of radar signals by the RH radar device 910, and/or to process radar signals communicated by the RH radar device 910. For example, baseband processor 930 may include one or more elements of radar processor 834 (FIG. 8), and/or may perform one or more operations and/or functionalities of radar processor 834 (FIG. 8).

In other aspects, an RH radar device 910 of the plurality of RH radar devices 910 may exclude one or more, e.g., some or all, functionalities of baseband processor 930. For example, controller 950 may be configured to perform one or more, e.g., some or all, functionalities of the baseband processor 930 for the RH.

In one example, controller 950 may be configured to perform baseband processing for all RH radar devices 910, and all RH radio devices 910 may be implemented without baseband processors 930.

In another example, controller 950 may be configured to perform baseband processing for one or more first RH radar devices 910, and the one or more first RH radio devices 910 may be implemented without baseband processors 930; and/or one or more second RH radar devices 910 may be implemented with one or more functionalities, e.g., some or all functionalities, of baseband processors 930.

In another example, one or more, e.g., some or all, RH radar devices 910 may be implemented with one or more functionalities, e.g., partial functionalities or full functionalities, of baseband processors 930.

In some demonstrative aspects, baseband processor 930 may include one or more components and/or elements configured for digital processing of radar signals communicated by the RH radar device 910, e.g., as described below.

In some demonstrative aspects, baseband processor 930 may include one or more FFT engines, matrix multiplication engines, DSP processors, and/or any other additional or alternative baseband, e.g., digital, processing components.

In some demonstrative aspects, as shown in FIG. 9, RH radar device 910 may include a memory 932, which may be configured to store data processed by, and/or to be processed by, baseband processor 930. For example, memory 932 may include one or more elements of memory 838 (FIG. 8), and/or may perform one or more operations and/or functionalities of memory 838 (FIG. 8).

In some demonstrative aspects, memory 932 may include an internal memory, and/or an interface to one or more external memories, e.g., an external Double Data Rate (DDR) memory, and/or any other type of memory.

In other aspects, an RH radar device 910 of the plurality of RH radar devices 910 may exclude memory 932. For example, the RH radar device 910 may be configured to provide radar data to controller 950, e.g., in the form of raw radar data.

In some demonstrative aspects, as shown in FIG. 9, RH radar device 910 may include one or more RF units, e.g., in the form of one or more RF Integrated Chips (RFICs) 920, which may be configured to communicate radar signals, e.g., as described below.

For example, an RFIC 920 may include one or more elements of front-end 804 (FIG. 8), and/or may perform one or more operations and/or functionalities of front-end 804 (FIG. 8).

In some demonstrative aspects, the plurality of RFICs 920 may be operable to form a radar antenna array including one or more Tx antenna arrays and one or more Rx antenna arrays.

For example, the plurality of RFICs 920 may be operable to form MIMO radar antenna 881 (FIG. 8) including Tx arrays 824 (FIG. 8), and/or Rx arrays 826 (FIG. 8).

In some demonstrative aspects, the plurality of RH radar devices 910 may be installed, for example, as integrated units around vehicle 900, for example, in the front, the rear, and/or corners of vehicle 900. For example, the plurality of RH radar devices 910 may be installed at a low position, e.g., at a bumper level of a bumper of vehicle 900, and/or or at a high position, e.g., on top of the vehicle 900, for example, on a roof of the vehicle.

In one example, radar devices may be positioned at dedicated high positions on vehicle 900, for example, to allow long-range detection and/or a clear Field of View (FoV).

In some demonstrative aspects, for example, in some use cases, scenarios, and/or implementations, there may be a need to address one or more technical issues of techniques implementing radar systems using radar devices, e.g., possibly of different types, each performing an entire radar functionality, e.g., from antenna processing to point cloud information or a detection list, e.g., as described below.

In one example, using different types of radar devices that perform the entire radar functionality may result in a complicated radar system.

In some demonstrative aspects, for example, in some use cases, scenarios, and/or implementations, there may be a need to address one or more technical issues of techniques implementing radar systems using joint processing of multiple radar devices, e.g., as described below.

For example, higher layer processing or joint processing of the radar devices may be performed on a single radar device or as a fusion of point cloud information or detection lists from the radar devices.

For example, joint processing may be performed based on point cloud fusion of point cloud information from multiple radar devices. The joint processing may be based on raw point cloud information from the plurality of radar devices as an input to a fusion function.

In one example, the joint processing may be limited and/or bound by a tradeoff between hard performance versus implementation efficiency, e.g., power consumption, form factors, weight, cost, or the like. For example, the larger the aperture, the better the performance. However, the better performance may be at a cost of a high complexity and/or a bulky implementation.

In some demonstrative aspects, there may be a need to address one or more technical issues of a Multi Static (MS) radar configuration, which may be implemented, for example, to enable improved radar resolution. For example, radar transmit and receive antennas of a MS radar configuration may be located at different places and/or at different RHs. For example, coherent MS radar configuration may provide improved resolution compared to a non-coherent MS radar configuration. For example, syncing different RHs to a level of picoseconds may not be a trivial task.

In some demonstrative aspects, there may be a need to provide a technical solution for joint processing of radar devices, In some demonstrative aspects, radar system 901 may be configured to provide a technical solution to implement a radar system according to a distributed radar system architecture, which may support high performance, for example, with a light weight, low power, a compact form-factor and/or a low cost radar system, e.g., as described below.

In some demonstrative aspects, the distributed radar system architecture may be configured to support a digital de-chirp radar architecture, e.g., as described below.

In some demonstrative aspects, the distributed radar system architecture may be configured to provide a technical solution according, for example, to a view point of an entire vehicle, for example, to provide a sensing suit for autonomous vehicles, which may have high performance and/or a low implementation penalty. For example, the distributed radar system architecture may be configured to provide a technical solution to "break" the tradeoff between performance and implementation of an integrated radar system.

Figure 10:
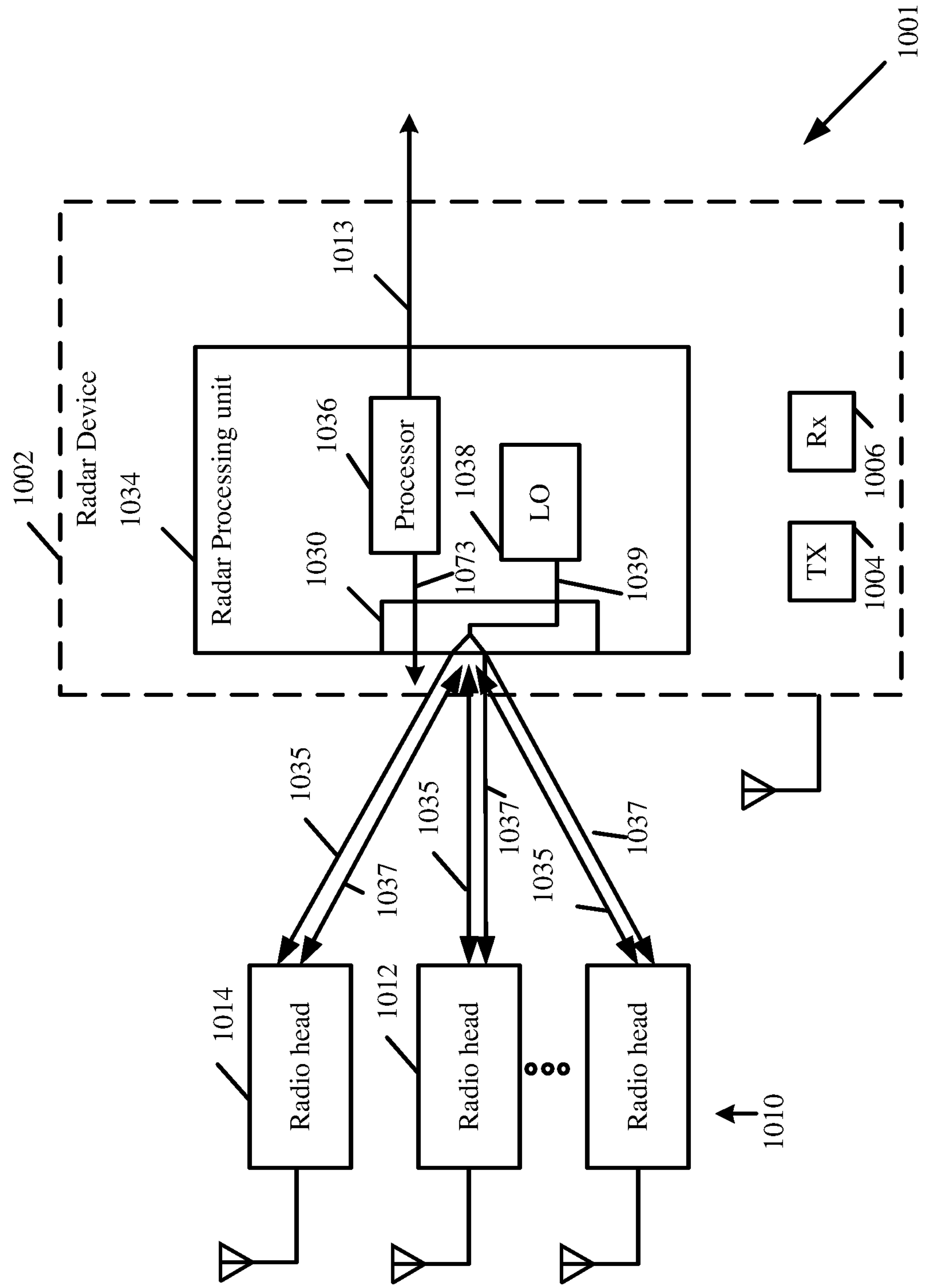
FIG. 10 is a schematic illustration of a radar system, in accordance with some demonstrative aspects.

Reference is made to FIG. 10, which schematically illustrates a radar system 1001, in accordance with some demonstrative aspects. For example, radar system 901 (FIG. 9) may include one or more elements of radar system 1001, and/or may perform one or more operations and/or functionalities of radar system 1001.

In some demonstrative aspects, as shown in FIG. 10, radar system 1001 may include a plurality of RHs 1010. For example, one or more, e.g., some or all, radio devices the plurality of RH radar devices 910 (FIG. 9) may include one or more elements of one or more RHs 1010, and/or may perform one or more operations and/or functionalities of one or more RHs 1010. For example, an RH radar device 910 (FIG. 9) may include one or more elements of an RH 1010, and/or may perform one or more operations and/or functionalities of an RH 1010.

In some demonstrative aspects, the plurality of RHs 1010 may include a first RH 1012, and/or a second RH 1014, e.g., as described below.

In some demonstrative aspects, as shown in FIG. 10, radar system 1001 may include a radar processing unit (also referred to as "main unit", "main processor, "central processor", "radar processor" or "radar controller") 1034, which may be configured, for example, to generate radar information 1013, for example, based on radar communications by the plurality of RHs 1010, e.g., as described below.

In some demonstrative aspects, as shown in FIG. 10, radar processing unit 1034 may include a communication interface 1030 configured to communicate with the plurality of RHs 1010, e.g., as described below.

In some demonstrative aspects, the communication interface 1030 may be configured with a redundancy factor greater than 1, e.g., as described below.

In other aspects, communication interface 1030 may be configured without redundancy.

In some demonstrative aspects, radar processing unit 1034 may include a processor 1036 configured to coordinate radar communications by the plurality of RHs 1010 and to generate radar information 1013, for example, based on the radar communications by the plurality of RHs 1010, e.g., as described below.

In some demonstrative aspects, processor 1036 may include, or may be implemented, partially or entirely, by circuitry and/or logic, e.g., one or more processors including circuitry and/or logic, memory circuitry and/or logic. Additionally or alternatively, one or more functionalities of processor 1036 may be implemented by logic, which may be executed by a machine and/or one or more processors, e.g., as described below.

In some demonstrative aspects, processor 1036 may be configured to transmit synchronization information 1035 to the plurality of RHs 1010, for example, via the communication interface 1030, e.g., as described below.

In some demonstrative aspects, the synchronization information 1035 may be configured to synchronize the radar communications by the plurality of RHs 1010, e.g., as described below.

In some demonstrative aspects, processor 1036 may be configured to communicate radar information 1037 with the plurality of RHs 1010, for example, via the communication interface 1030, e.g., as described below.

In some demonstrative aspects, radar information 1037 may include, for example, radar Tx information and/or radar Rx information, which may be communicated with the plurality of RHs 1010, e.g., as described below.

In some demonstrative aspects, processor 1036 may be configured to communicate the radar Tx information and/or the radar Rx information with the plurality of RHs 1010, for example, via the communication interface 1030, e.g., as described below.

In some demonstrative aspects, the radar Tx information may be configured to configure radar Tx signals to be transmitted by one or more Tx chains of the plurality of RHs 1010, e.g., as described below.

In some demonstrative aspects, the radar Rx information may be based on radar Rx signals received by one or more Rx chains of the plurality of RHs 1010, e.g., as described below.

In some demonstrative aspects, the communication interface 1030 may include a dielectric waveguide communication interface, for example, to communicate the synchronization information, and/or the radar information 1037, e.g., the radar Tx information and/or the radar Rx information, with the plurality of RHs 1010 via a dielectric waveguide interconnect, e.g., as described below.

In some demonstrative aspects, the communication interface 1030 may include an Active Optical Cable (AOC) communication interface, for example, to communicate the synchronization information, and/or the radar information 1037, e.g., the radar Tx information and/or the radar Rx information, with the plurality of RHs 1010 via an AOC interconnect, e.g., as described below.

In some demonstrative aspects, the communication interface 1030 may include a fiber optic communication interface, for example, to communicate the synchronization information, and/or the radar information 1037, e.g., the radar Tx information and/or the radar Rx information, with the plurality of RHs 1010 via a fiber optic interconnect, e.g., as described below.

In other aspects, the communication interface 1030 may include any other additional or alternative communication interface, for example, to communicate the synchronization information, and/or the radar information 1037, e.g., the radar Tx information and/or the radar Rx information, with the plurality of RHs 1010 via any other interconnect.

In some demonstrative aspects, the synchronization information 1035 may be configured to synchronize the radar communications by the plurality of RHs 1010, for example, in phase and/or in time, e.g., as described below.

In some demonstrative aspects, the synchronization information 1035 may include a common Local Oscillator (LO) signal 1039, for example, from an LO 1038, which may be distributed to the plurality of RHs 1010, for example, via the communication interface 1030, e.g., as described below.

In some demonstrative aspects, the communication interface 1030 may be configured to transmit the common LO signal 1039 to the plurality of RHs 1010, for example, in the form of an analog LO signal, e.g., as described below.

In other aspects, the communication interface 1030 may be configured to transmit the common LO signal 1039 to the plurality of RHs 1010 in any other form.

In other aspects, the synchronization information 1035 may include any other additional or alternative information to synchronize the radar communications by the plurality of RHs 1010, for example, in phase and/or in time.

In some demonstrative aspects, processor 1036 may be configured to transmit the radar Tx information to one or more of the RHs 1010, for example, via the communication interface 1030, e.g., as described below.

In some demonstrative aspects, processor 1036 may be configured to generate the radar Tx information, for example, to configure a MIMO radar transmission via a MIMO array formed by antennas of two or more, e.g., some or all, of the plurality of RHs 1010, e.g., as described below.

In some demonstrative aspects, processor 1036 may be configured to generate the radar Tx information to configure a simultaneous radar transmission by at least a first Rh and second RH, for example, RH 1012 and/or RH 1014, e.g., as described below.

In some demonstrative aspects, the simultaneous radar transmission may include transmission of first radar Tx signals by the first RH, e.g., RH 1012, and transmission of second radar Tx signals by the second RH, e.g., RH 1014, e.g., as described below.

In some demonstrative aspects, the communication interface 1030 may be configured to transmit to an RH 1010, e.g., RH 1012 and/or RH 1014, one or more analog Tx signals for the RH, e.g., including analog Tx signals to be transmitted by one or more respective Tx chains of the RH, e.g., as described below.

In some demonstrative aspects, the communication interface 1030 may be configured to transmit to an RH 1010, e.g., RH 1012 and/or RH 1014, one or more digital Tx signals for the RH, e.g., as described below.

In some demonstrative aspects, the one or more digital Tx signals for the RH may include information to configure one or more Tx signals for one or more respective Tx chains of the RH, e.g., as described below.

In some demonstrative aspects, the Tx signals for the RH may include one or more digital Base-Band (BB) Tx signals for one or more respective Tx chains of the RH, e.g., as described below.

In some demonstrative aspects, the Tx signals for the RH may include one or more digital Intermediate Frequency (IF) Tx signals for one or more respective Tx chains of the RH, e.g., as described below.

In some demonstrative aspects, the one or more digital Tx signals for the RH may include information to configure one or more RF Tx signals for one or more respective Tx chains of the RH, e.g., as described below.

In some demonstrative aspects, information to configure one or more Tx signals for one or more respective Tx chains of the RH may include a waveform signal for a Tx chain and/or information to define the waveform for the Tx chain, for example, one or more Tx chirp signal parameters, and/or the like.

In some demonstrative aspects, processor 1036 may be configured to process the radar Rx information received via the communication interface 1030, and to generate the radar information 1013, for example, based on the radar Rx information, e.g., as described below.

In some demonstrative aspects, processor 1036 may be configured to receive via communication interface 1030 one or more analog Rx signals from an RH 1010, for example, RH 1012 and/or RH 1014, e.g., as described below.

In some demonstrative aspects, the one or more analog Rx signals from the RH 1012 may be based on signals received by one or more respective Rx chains of the RH 1012; and/or the one or more analog Rx signals from the RH 1014 may be based on signals received by one or more respective Rx chains of the RH 1014, e.g., as described below.

In some demonstrative aspects, processor 1036 may be configured to receive via communication interface 1030 or more digital Rx signals from an RH 1010, for example, RH 1012 and/or RH 1014, e.g., as described below.

In some demonstrative aspects, the one or more digital Rx signals from the RH 1012 may be based on signals received by one or more respective Rx chains of the RH 1012; and/or the one or more digital Rx signals from the RH 1014 may be based on signals received by one or more respective Rx chains of the RH 1014, e.g., as described below.

In some demonstrative aspects, the one or more digital Rx signals from an RH 1010, e.g., RH 1012 and/or RH 1014, may include compressed Rx information representing Rx radar samples corresponding to the signals received by the one or more Rx chains of the RH 1010, e.g., as described below. For example, RH 1010, e.g., RH 1012 and/or RH 1014, may be configured to generate the compressed Rx information according to a predefined compression scheme, for example, to reduce the amount of data communicated over the communication interface 1030.

In some demonstrative aspects, processor 1036 may be configured to decompress the compressed Rx information, for example, from the RH 1010, e.g., as described below.

In some demonstrative aspects, processor 1036 may be configured to transmit radar Tx parameter information to the RH 1010, e.g., RH 1012 and/or RH 1014, for example, via the communication interface 1030, e.g., as described below.

In some demonstrative aspects, the radar Tx parameter information may correspond to a radar transmission to be received by the one or more Rx chains of the RH 1010, e.g., RH 1012 and/or RH 1014, e.g., as described below.

In some demonstrative aspects, processor 1036 may be configured to decompress the compressed Rx information from the RH 1010, e.g., RH 1012 and/or RH 1014, for example, based on the radar Tx parameter information provided to the RH 1010, e.g., RH 1012 and/or RH 1014, e.g., as described below.

In some demonstrative aspects, processor 1036 and/or the RH 1010 may be configured to utilize one or more compression methods, which may be based, for example, on a specific radar processing stage, e.g., a range processing stage, a pulse-compression stage, a Doppler processing stage, and/or any other additional or alternative processing stage. In one example, the radar processing stage may be based on a Matched Filter, a Miss-Matched Filter, and/or any other mechanism. In this case, information about a relevant Tx transmission may be communicated to the Rx part of the RH 1010. For example, the radar Tx parameter information may be related to a plurality of Tx channels and/or heads.

In some demonstrative aspects, processor 1036 may be configured to receive via communication interface 1030 the radar Rx information, which may include first radar Rx information from a first RH, e.g., RH 1012, and second radar Rx information from a second RH, e.g., RH 1014, e.g., as described below.

In some demonstrative aspects, processor 1036 may be configured to generate the radar information 1013, for example, based on joint processing of the first radar Rx information from the first RH 1012 and the second radar Rx information from the second RH 1014, e.g., as described below.

In some demonstrative aspects, processor 1036 may be configured to generate the radar Tx information to configure a radar transmission from a particular RH, for example, RH 1012, e.g., as described below.

In some demonstrative aspects, processor 1036 may be configured to generate the radar information 1013, for example, by processing radar Rx information from the particular RH, e.g., from RH 1012, for example, based on the radar Tx information provided to the particular RH, e.g., as described below.

In some demonstrative aspects, processor 1036 may be configured to generate the radar Tx information to configure a radar transmission from a first RH, for example, RH 1012, e.g., as described below.

In some demonstrative aspects, processor 1036 may be configured to generate the radar information 1013 based on radar Rx information from a second RH, for example, RH 1014, e.g., as described below.

In some demonstrative aspects, the radar Rx information from the second RH 1014 may be based on the radar transmission from the first RH 1012, e.g., as described below.

In some demonstrative aspects, processor 1036 may be configured to generate the radar Tx information to configure a first radar transmission from a first RH, e.g., RH 1012, and a second radar transmission from a second RH, e.g., RH 1014.

In some demonstrative aspects, processor 1036 may be configured to generate the radar information 1013 based on radar Rx information from one or more RHs 1010, which may be configured to receive and process the first radar transmission and/or the second radar transmission.

For example, processor 1036 may be configured to generate the radar information 1013 based on radar Rx information from the first RH, from the second RH, from both the first RH and the second RH, from a third RH 1010, from the third RH and a fourth RH 1010, and/or based on any other combination of RHs 1010, which may be configured to receive and process the first radar transmission and/or the second radar transmission.

In some demonstrative aspects, processor 1036 may be configured to communicate radar control information 1073 with one or more RHs of the plurality of RHs 1010, for example, via the communication interface 1030, e.g., as described below.

In some demonstrative aspects, the radar control information 1073 for an RH 1010 may include control information to control one or more functionalities of the RH 1010, e.g., as described below.

In some demonstrative aspects, the radar control information 1073 for an RH 1010 may include Tx control information to control one or more Tx functionalities of the RH 1010.

For example, the Tx control information may include Tx parameter information to configure one or more Tx parameters to be utilized by the RH for transmission of radar Tx signals.

For example, the Tx parameter information may include waveform information to configure a Tx waveform to be utilized by the RH for transmission of radar Tx signals. For example, the Tx parameter information may include information to configure a center frequency, a bandwidth, a start time, a state machine state, and/or any other Tx parameter.

For example, the Tx control information may include Tx calibration information to configure a calibration scheme to be utilized by the RH for transmission of radar Tx signals, e.g., to account of LO delay variance, manufacturing tolerance, changes in position, and/or any other calibration purpose. For example, the Tx calibration information may include information to configure a Direct Current (DC) offset, a self-calibration, and/or any other calibration information.

In some demonstrative aspects, the radar control information 1073 for an RH 1010 may include Rx control information to control one or more Rx functionalities of the RH 1010.

For example, the Rx control information may include Rx parameter information to configure one or more Rx parameters to be utilized by the RH for processing radar Rx signals.

For example, the Rx parameter information may include waveform information to configure an Rx waveform to be received by the RH. For example, the Rx parameter information may include information to configure a center frequency, a bandwidth, a start time, a state machine state, and/or any other Rx parameter.

For example, the Rx control information may include Rx calibration information to configure a calibration scheme to be utilized by the RH for reception of radar Rx signals, e.g., to account of LO delay variance, manufacturing tolerance, changes in position, and/or any other calibration purpose. For example, the Rx calibration information may include information to configure a DC offset, a delay, a self-calibration, and/or any other calibration information.

In some demonstrative aspects, processor 1036 may be configured to communicate radar control information 1073 together with the radar information 1037, e.g., on a same channel via the communication interface 1030. For example, the processor 1036 may be configured to communicate radar control information 1073 together with the radar information 1037 over a digital link via communication interface 1030. In one example, processor 1036 may be configured to digitally interleave radar control information 1073 with the radar information 1037.

In some demonstrative aspects, processor 1036 may be configured to communicate radar control information 1073 on a control channel via the communication interface 1030, e.g., separate from a channel for the radar information 1037. In one example, the radar information 1037 may be communicated in analog form, e.g., over an analog channel; and/or the radar control information 1073 may be communicated over a digital channel, e.g., a low-rate digital channel which may be dedicated to communicate the radar control information 1073.

In some demonstrative aspects, processor 1036 may be configured to generate the radar information 1013, for example, based on installation information corresponding to an installation configuration of one or more of the plurality of RHs 1010, e.g., as described below.

In some demonstrative aspects, the installation information may include position information corresponding to positions of one or more of the plurality of RHs 1010, e.g., as described below.

For example, the position information corresponding to an RH may include location information corresponding to a location of the RH, e.g., location coordinates of the RH; orientation information corresponding to an orientation of the RH, e.g., a direction and/or angle of the RH, and/or any other type of information corresponding to a positioning, placement, directionality, and/or arrangement of the RH.

In some demonstrative aspects, the installation information may include FoV information corresponding to FoVs of one or more of the plurality of RHs 1010, e.g., as described below.

In one example, the FoV information for an RH may include FoV-blockage information to indicate a blocking of the FoV of the RH, for example, by the vehicle, e.g., as described below.

In some demonstrative aspects, the installation information may include configuration information corresponding to installed configurations of one or more of the plurality of RHs 1010.

For example, the installation information corresponding to an RH may include information of a type of the RH; information of a version of the RH, e.g., a hardware version, a software version, and/or a firmware version; and/or information of capabilities of the RH, e.g., RF capabilities, processing capabilities, hardware capabilities, and/or software capabilities.

In other aspects, the installation information may include any other additional or alternative information corresponding to an installation, position, setting, and/or configuration of one or more of the plurality of RHs 1010

In some demonstrative aspects, the radar processing unit 1034 may be implemented, for example, as part of a radar device 1002 of radar system 1000, e.g., as described below.

In other aspects, radar processing unit 1034 may be implemented, for example, as a separate element of radar system 1000.

In other aspects, radar processing unit 1034 may be implemented, for example, as part of any other element and/or component of radar system 1000.

In some demonstrative aspects, radar device 1002 may include a transmitter 1004 and/or a receiver 1006, e.g., as described below. For example, radar device 1002 may include one or more elements of an radio device 800 (FIG. 8), and/or may perform one or more operations and/or functionalities of radio device 800 (FIG. 8).

In some demonstrative aspects, processor 1036 may be configured to control the transmitter 1004 to transmit radar Tx signals of the radar device 1002, e.g., as described below.

In some demonstrative aspects, processor 1036 may be configured to generate the radar information 1013 based on radar Rx signals received by the receiver 1006, e.g., as described below.

In some demonstrative aspects, processor 1036 may be configured to synchronize the radar communications by the plurality of RHs 1010, for example, to radar communications of the radar device 1002, e.g., as described below. For example, processor 1036 may be configured to generate the synchronization information 1035 to synchronize the radar communications by the plurality of RHs 1010, for example, to radar communications of the radar device 1002.

In some demonstrative aspects, as shown in FIG. 10, radar processing unit 1034 may be shared between a plurality of N RHs 1010.

In some demonstrative aspects, an RH 1010, e.g., each RH 1010, may be capable of up and/or down conversion of signals, e.g., BB and/or IF signals, from/to an automotive radar RF band.

In some demonstrative aspects, radar processing unit 1034 may be configured to perform signal processing of the radar communications performed by RHs 1010 and/or to control and/or synchronize the radar communications performed by RHs 1010.

In some demonstrative aspects, for example, radar processing unit 1034 may be configured to perform range processing, Doppler processing, AoA processing, Interframe processing, e.g., Synthetic Aperture Radar (SAR) processing, detection, reporting, interference management, and/or any other additional or alternative functionalities.

In some demonstrative aspects, radar processing unit 1034 may be configured to communicate with the plurality of RHs 1010, e.g., via interface 1030, Tx information, e.g., in the form of a signal waveform and/or any other Tx information, for an RH 1010 with Tx capabilities and/or for an RH which may have a capability to process Rx signals based on the Tx information, e.g., as described below.

In some demonstrative aspects, radar processing unit 1034 may be configured to communicate with the plurality of RHs 1010, e.g., via interface 1030,Rx information, e.g., received signals and/or any other Rx information, which may be received from an RH having Rx capabilities, e.g., as described below. For example, the Rx information from an RH may include information based on received echoes, received interference, and/or any other signals received by the RH.

In some demonstrative aspects, radar processing unit 1034 may be configured to communicate calibration information with one or more RHs of the plurality of RHs 1010, e.g., via interface 1030. In one example, the calibration information may be generated and/or communicated between radar processing unit 1034 and the RHs 1010, per RH and/or per RH RF chain.

In some demonstrative aspects, radar processing unit 1034 may be configured to transmit to the plurality of RHs 1010 the synchronization information 1035 including coherent phase and/or time synchronization (sync) signals. For example, the coherent phase and/or time synchronization (sync) signals may be provided by a centralized sync-generator module(/s), e.g., LO 1038, which may be implemented by radar processing unit 1034.

In one example, radar processing unit 1034 may be configured to transmit the synchronization information 1035 including two sync signals from two different generation modules, for example, to support different time and phase synchronization signals.

In some demonstrative aspects, the synchronization information 1035 may include a phase sync signal. For example, the phase sync signal may include an LO signal, e.g. LO signal 1039, which may be distributed from radar processing unit 1034 to the plurality of RHs 1010.

In some demonstrative aspects, radar system 1001 may be implemented to provide a technical solution to support coherent operation, e.g., phase level coherency, of the plurality of RHs 1010.

In some demonstrative aspects, radar system 1001 may be implemented to provide a technical solution to support central processing of radar information of the plurality of RHs 1010, for example, by radar processing unit 1034. Accordingly, radar system 1001 may be implemented to provide a technical solution to support joint processing, e.g., coherent or incoherent joint processing, and/or data based or model based joint processing, of radar information of the plurality of RHs 1010.

In some demonstrative aspects, radar system 1001 may be implemented to provide a technical solution to support a "local" coherent MS implementation, e.g., with a relatively wide effective aperture.

In some demonstrative aspects, radar system 1001 may be implemented to provide a technical solution to support a distributed MIMO array providing a very wide aperture, for example, with reduced complexity.

In some demonstrative aspects, radar system 1001 may be implemented to provide a technical solution based on distribution of an LO signal, e.g., LO signal 1039, to the plurality of RHs 1010. Accordingly, radar system 1001 may be implemented to provide a technical solution, which does not require a dedicated LO-sync loop function, which may be costly and/or may generate estimation errors.

In some demonstrative aspects, radar system 1001 may be implemented to provide a technical solution based on distribution of an LO signal, e.g., LO signal 1039, to the plurality of RHs 1010, for example, to achieve substantially absolute synchronization, which may enable sophisticated time and/or frequency based co-existence between the plurality of RHs 1010.

In some demonstrative aspects, radar system 1001 may be implemented to provide a technical solution to support ease of installation. For example, a form factor of an RH 1010, e.g., including an antenna, may be as small as O(1 cm). Accordingly, the plurality of RHs 1010 may be installed almost anywhere in a vehicle, e.g., even at an edge of a windshield of the vehicle. For example, the plurality of RHs 1010 may be located to provide an improved FoV and/or point of view for system 1001.

In some demonstrative aspects, radar system 1001 may be implemented to provide a technical solution to support using of small, compact, low power and/or light weight RHs 1010 . . . . For example, some or all processing capabilities, which may be major heat generators and power-hungry elements of a radar system may be implemented at a central/main processor, e.g., radar processing unit 1034. Accordingly, radar system 1001 may be implemented to provide a technical solution to support reduced power consumption and/or heat dissipation real states.

In some demonstrative aspects, radar system 1001 may be implemented to provide a technical solution using the same LO signal distributed for all RHs 1010. Accordingly, radar system 1001 may be implemented to provide a technical solution, which may not require an adaptive calibration function, for example, to sync independent LOs.

In some demonstrative aspects, radar system 1001 may be implemented to provide a technical solution to support a MS radar system configuration and/or a distributed antenna scheme, which may provide superior performance.

In some demonstrative aspects, radar system 1001 may be implemented to provide a technical solution to leverage scale to yield an economic design, e.g., as described below.

In one example, an installation position of radar processing unit 1034 may be arbitrary and, accordingly, the installation position may enable vehicle and/or equipment manufacturers, e.g., Original Equipment Manufacturers (OEMs), to optimize radar system installation, for example, for power distribution, weight balancing, heat dissipation, and/or the like.

In some demonstrative aspects, radar system 1001 may be implemented to provide a technical solution to support a single-power and/or single heat dissipation system, e.g., which may be applied only for radar processing unit 1034.

In some demonstrative aspects, radar system 1001 may be implemented to provide a technical solution to support a single data connection to a vehicle system, e.g., from radar processing unit 1034.

In some demonstrative aspects, radar system 1001 may be implemented to provide a technical solution to support a software implementation of radar processing (partial or full) in a vehicular processor and/or controller, for example, a vehicle Domain Control Unit (DCU), a Zone Control Unit (ZCU), an Electronic Control Unit (ECU), a High Power Computer (HPC) of the vehicle, and/or the like.

In some demonstrative aspects, radar system 1001 may be implemented to provide a technical solution to support a single Baseband Processing Unit (BPU), e.g., a single radar processor or radar MicroProcessor Unit (MPU). For example, processor 1036 may be configured to process signals from the plurality of RHs 1010. Accordingly, a number of different BPU chips may be reduced. Therefore, better and/or more efficient stock and/or product line management may be achieved.

In some demonstrative aspects, radar system 1001 may be implemented to provide a technical solution to support improved diversity and/or efficiency, for example, by decoupling between a radar processing unit and the RHs, for example, as long as they adhere to a same interconnect.

In one example, some vehicles, e.g., higher end vehicles, may be installed with higher end RHs, radar processing units and/or both, while other vehicles, e.g., lower end vehicles, may be installed with lower end RHs, radar processing units and/or both. For example, the higher end radar processing units may be utilized to provide additional features and/or access computation capacity.

In some demonstrative aspects, radar system 1001 may be implemented to provide a technical solution to support product de-coupling, e.g., of next generation products.

In one example, one or more of the RHs 1010 may be upgraded to a next generation, while the radar processing unit 1034 may remain at a configuration of a current generation, e.g., while having a SW update.

In another example, the radar processing unit 1034 may be upgraded, while, one or more of the RHs 1010 may remain at the same configuration.

In some demonstrative aspects, radar system 1001 may be implemented to provide a technical solution to support implementation of various types of RHs 1010, for example, RHs having large arrays versus RHs having small arrays, RHs having conformal arrays versus RHs having non-conformal arrays, and/or the like.

Figure 11:
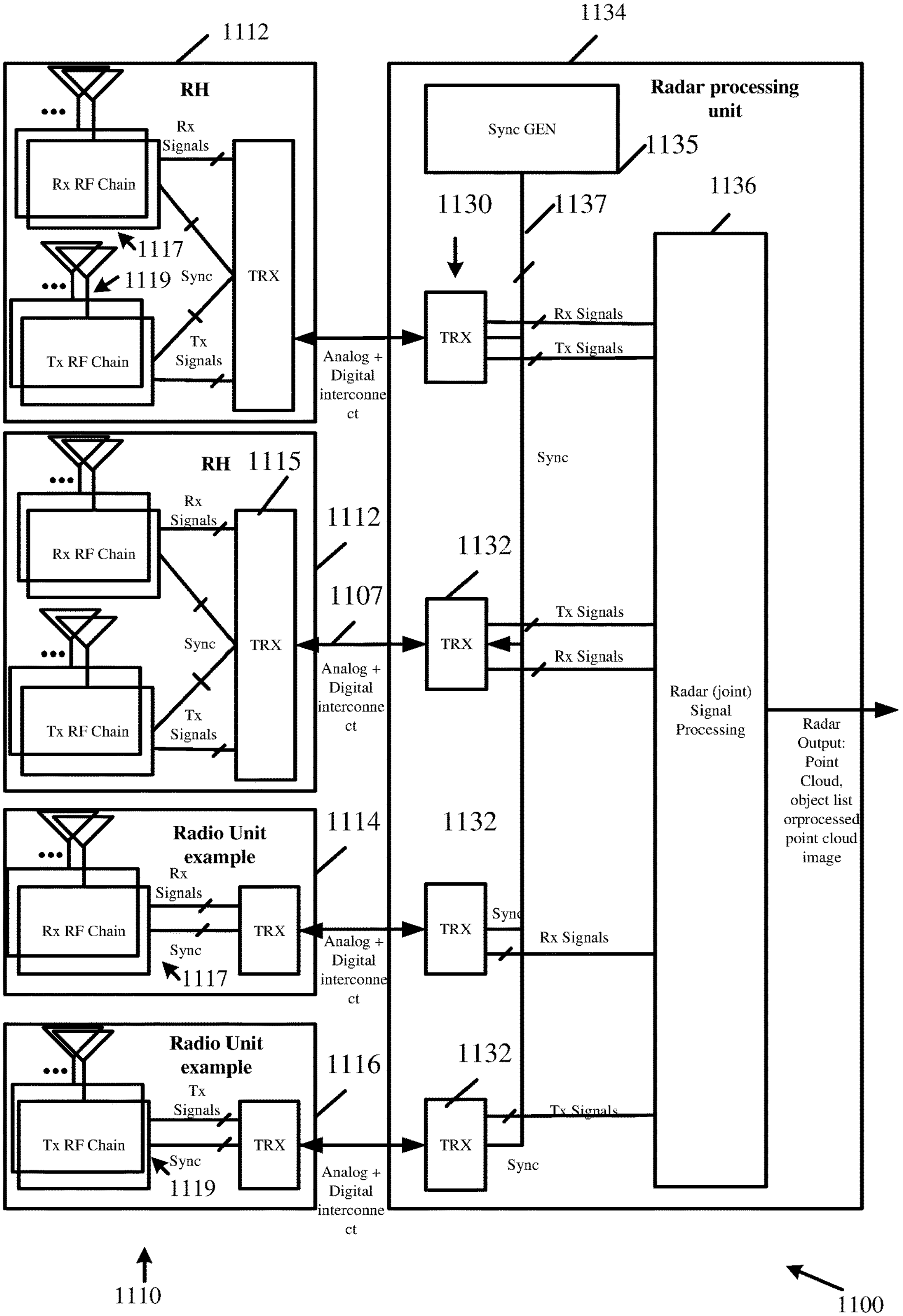
FIG. 11 is a schematic illustration of a radar system, in accordance with some demonstrative aspects.

Reference is made to FIG. 11, which schematically illustrates a radar system 1101, in accordance with some demonstrative aspects. For example, radar system 1001 (FIG. 10) may include one or more elements of radar system 1101, and/or may perform one or more operations and/or functionalities of radar system 1101.

In some demonstrative aspects, as shown in FIG. 11, radar system 1101 may include a radar processing unit 1134, which may be configured to coordinate radar communications by a plurality of RHs 1110. For example, radar processing unit 1034 (FIG. 10) may include one or more elements of radar processing unit 1134, and/or may perform one or more operations and/or functionalities of radar processing unit 1134; and/or the plurality of RHs 1010 (FIG. 10) may include one or more elements of the plurality of the RHs 1110, and/or may perform one or more operations and/or functionalities of plurality of RHs 1110.

In some demonstrative aspects, as shown in FIG. 11, radar processing unit 1134 may include a communication interface 1130 configured to communicate with the plurality of RHs 1110. For example, communication interface 1030 (FIG. 10) may include one or more elements of communication interface 1130, and/or may perform one or more operations and/or functionalities of communication interface 1130.

In some demonstrative aspects, as shown in FIG. 11, communication interface 1130 may include a plurality of transceivers (TRX) 1132 to communicate with a respective plurality of transceivers (TRX) 1115 of the plurality of RHs 1110.

In some demonstrative aspects, as shown in FIG. 11, radar system 1101 may include a plurality of interconnects 1107, which may be configured to connect between the plurality of TRX 1132 to TRX 1115.

In some demonstrative aspects, an interconnect 1107 between TRX 1132 and TRX 1115 may include a Fiber and/or Dielectric-Waveguide interconnect.

In some demonstrative aspects, an interconnect 1107 may include a copper interconnect, e.g., including Ethernet for data and coax for sync. In one example, a copper interconnect may have some limitation, e.g., in terms of Electromagnetic interference (EMI) and/or data rates.

In some demonstrative aspects, a TRX, e.g., a TRX 1132, may be configured to aggregate a multiplicity of Rx and Tx channels, for example, to transfer signals and/or samples between radar processing unit 1134 and an RH 1110.

In some demonstrative aspects, as shown in FIG. 11, the plurality of the RHs 1110 may include a plurality of different types of RHs.

In some demonstrative aspects, as shown in FIG. 11, the plurality of the RHs 1110 may include one or more RHs 1112 having both Tx capabilities and Rx capabilities. For example, the one or more RHs 1112 may include one or more Rx chains 1117, and one or more Tx chains 1119.

In one example, Rx chains 1117 may include a downconverter, an optional ADC, and/or any other Rx elements; and/or Tx chains 1119 may include an up-converter or a Tx signal generator, and/or any other Tx elements.

In some demonstrative aspects, as shown in FIG. 11, the plurality of the RHs 1110 may include one or more RHs 1114 having only Rx capabilities. For example, the one or more RHs 1114 may include one or more Rx chains 1117.

In some demonstrative aspects, as shown in FIG. 11, the plurality of the RHs 1110 may include one or more RHs 1116 having only Tx capabilities. For example, the one or more RHs 1116 may include one or more Tx chains 1119.

In some demonstrative aspects, as shown in FIG. 11, radar system 1101 may incorporate different types of RHs 1110. For example, radar system 1101 may include Tx/Rx RHs, e.g., RHs 112, including Tx and Rx chains and antennas; a Tx-only RHs, e.g., RHs 1116, and/or Rx-only RHs, e.g., RHs 1114.

In some demonstrative aspects, an interconnect between radar processor 1143 and an RH 1110, e.g., interconnect 1107, may include an aggregation of a plurality of channels, e.g., as described below.

In some demonstrative aspects, the plurality of channels may be in a form of BB signals, analog signals, e.g., IF signals, partially processed signals, for example, Rx signals after de-chirp (fast-time), and/or any other slow time and/or fast time radar processing signals.

In some demonstrative aspects, radar system 1101 may be configured to provide a technical solution to support performing both Slow-time and Fast-time processing at a main unit, e.g., radar processing unit 1134, for example, instead of within the RHs 1110.

In some demonstrative aspects, radar system 1101 may be configured to provide a technical solution to support distribution of common sync signal/s for time and/or frequency, which may be distributed and shared, e.g., via communication interface 1130, to the RH 1110 across radar system 1101.

In some demonstrative aspects, radar processing unit 1134 may include a synchronization generator 1135, e.g., an LO, to generate an analog LO signal 1137, which may be distributed, e.g., via communication interface 1130, to the RHs 1110 across radar system 1101.

In some demonstrative aspects, the TRX 1132 may be configured to distribute sync signals from the synchronization generator 1135 to the RHS 1110, for example, with a high degree of accuracy.

In some demonstrative aspects, radar processing unit 1134 may be configured to support calibration, e.g., to account for different delay uncertainty and/or placement uncertainty of the RHs 1110.

In some demonstrative aspects, radar system 1101 may be implemented to provide a technical solution to support centralized processing, e.g., and optional joint radar processing, by a central radar processing unit, e.g., radar processing unit 1134, which may generate sync signals, radar Tx signals, digital data, control signals, host reporting, and/or I/F signals, for the RHs 1110.

In some demonstrative aspects, communication interface 1130 may be configured to support a TRX module function, for example, to distribute Sync signals, e.g., sync signal 1137, and/or Tx and Rx signals between radar processing unit 1134 and the RHs 1110 of radar system 1101.

In some demonstrative aspects, radar system 1101 may be configured according a topology, for example, where some Tx channels and/or Rx channels may not be on a same board or unit. According to this topology, these Tx channels and/or Rx channels may have one or more delays, e.g., unknown temperature dependent delay-differences, which may be caused by interconnectors 1107 and/or different routing of sync signals 1137.

In some demonstrative aspects, radar processing unit 1134 may be configured to calibrate the delays, for example, by comparison to a measurement through an RH, which may include both Rx and Tx chains, e.g., RH 1112

In some demonstrative aspects, radar processing unit 1134 may be configured to communicate analog signals digital signals, and/or a mix of analog and digital signals, via an interconnect 1107.

In some demonstrative aspects, the analog signals may include BB signals and/or IF signals.

In some demonstrative aspects, the analog signals may include signals after an analog de-chirp, e.g., a beat signal and/or a stretch signal.

In some demonstrative aspects, radar processing unit 1134 may be configured to communicate Rx digital signals via an interconnect 1107.

In some demonstrative aspects, the Rx digital signals may include signals after sampling, e.g., at an RH 1110.

In some demonstrative aspects, the Rx digital signals may be after partial radar processing and/or compression, which may be utilized in a digital de-chirp implementation, for example, to reduce a bit rate over the interconnect 1107.

In some demonstrative aspects, radar processing unit 1134 may be configured to communicate Tx digital signals via an interconnect 1107.

In some demonstrative aspects, the Tx digital signals may be in a form of a stream of samples; a Tx waveform template, which may be downloaded to a local memory in an RH 1110; and/or a list of parameters to be used by a generator module, e.g., within the RH 1110.

In some demonstrative aspects, radar system 1101 may implement a mixed interconnect 1107, for example, to communicate, e.g., for a Tx side, the Tx digital signals, e.g., as the digital sample stream, the waveform template, and/or the list of parameters; and, for the Rx side, to communicate aggregated analog Rx channels. For example, this mixed interconnect may provide a technical solution to address a bit rate difference between the Tx and uplink direction versus the Rx and downlink direction, which may cause differences in latency requirements between the Tx and Rx parts.

In some demonstrative aspects, the Tx digital signals may be implemented to provide a technical solution to support agility of radar system 1101. For example, the agility in the Tx side may be utilized to support interference avoidance and/or adaptive and cognitive radar implementations, e.g., in which the Tx signal may be dynamically modified and/or changed, for example, throughout a ride of the vehicle, for example, based on an environmental status of an environment of the vehicle.

In some demonstrative aspects, radar system 1101 may be configured according to a Multi-Static (MS) radar configuration, for example, implementing a main unit, e.g., radar processing unit 1134, to receive all samples from some or all of the plurality of RHs 1110, and to jointly process them, e.g., as described below.

In some demonstrative aspects, the MS radar configuration may be partially applied, e.g., for partial functionality of radar system 1101 at a time. For example, radar processing unit 1134 may be configured to control RHs 1110 such that one or more RHs 1110, e.g., some or all RHs 1110, transmit radar signals, while one or more RHs 1110, e.g., some or all RHs 1110, receive the radar signals. In one example, radar processing unit 1134 may be configured to control RHs 1110 such that one RH 1110 transmits radar signals, while all RHs 1110 receive the radar signals. In another example, radar processing unit 1134 may be configured to control RHs 1110 such that all RHs 1110 transmit radar signals, while one RH 1110 receives the radar signals. In other aspects, radar processing unit 1134 may be configured to control RHs 1110 according to any other temporal any other combination of Tx and Rx elements, e.g., from a super set of the entire antenna elements available from the plurality of RHs 1110.

In some demonstrative aspects, radar system 1101 may be configured according to an architecture (satellite architecture), in which a main processing unit, e.g., radar processing unit 1134, and a radio unit, e.g., an RH 1110, are integrated. For example, radar processing unit 1134 may be implemented together with an RH 1112. For example, the radar system 1101 may include a main unit, e.g., including an RH and a radar processor, and a plurality of RH satellites, e.g., having only an RH functionality.

In some demonstrative aspects, the main unit may be augmented with the satellite units, for example, to enhance performance for joint processing over a larger aperture size. For example, radar system 1101 may be configured to utilize a virtual radar array formed by antenna arrays of the main unit and antenna arrays of the satellites.

In some demonstrative aspects, the RHs 1110 may be implemented to provide a distributed antenna including antenna elements, e.g., which do not reside in a same module.

In some demonstrative aspects, the distributed antenna may be implemented as a uniform antenna array, e.g., a Uniform Linear Array (ULA), or as a non-uniform antenna array, e.g., a non-ULA; as a 2D or 3D antenna, e.g., when elements are not on a same 2D plane; and/or as a conformal or non-conformal array.

In some demonstrative aspects, Tx and Rx arrays of the distributed antenna may be interchangeable.

Figure 12:
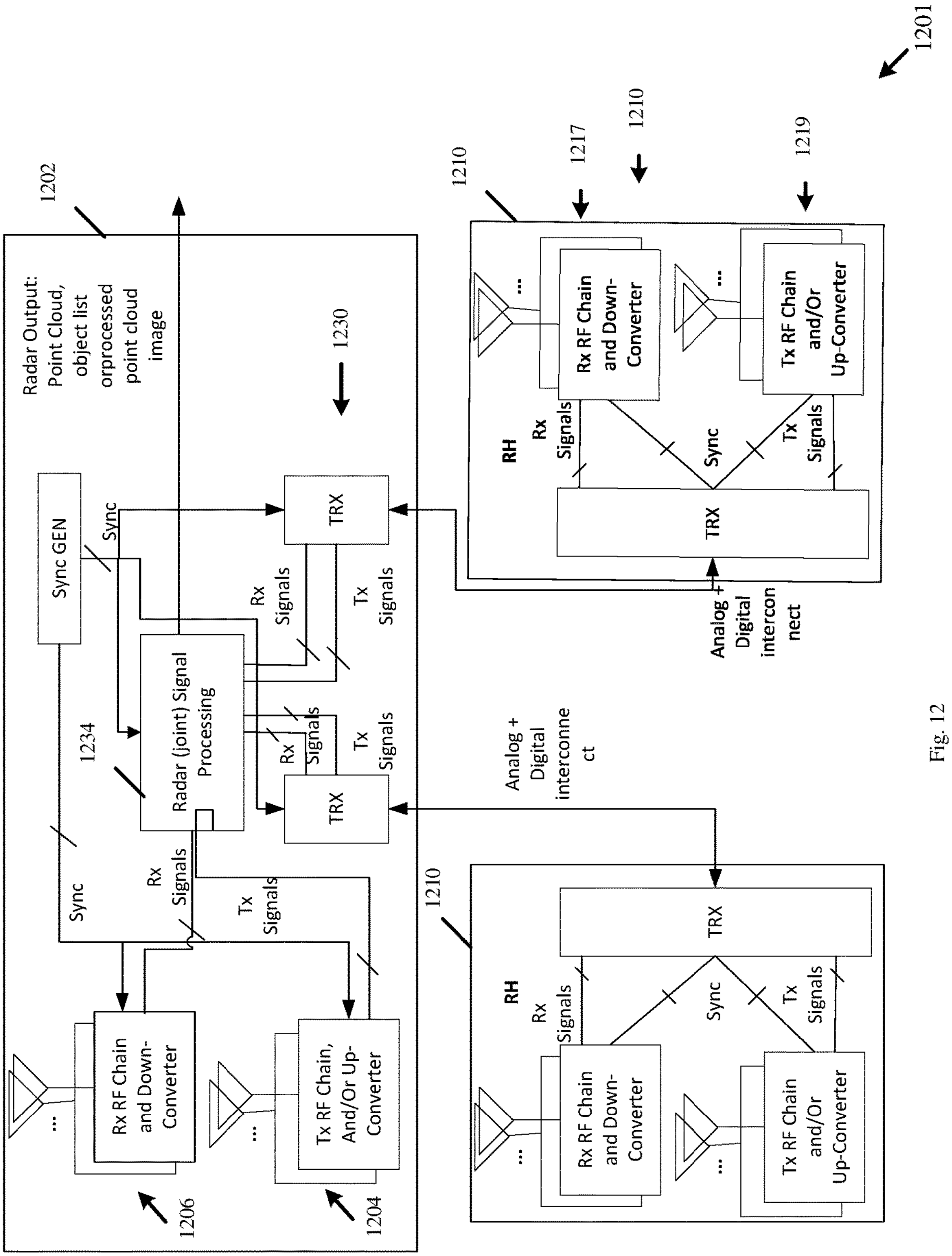
FIG. 12 is a schematic illustration of a radar system, in accordance with some demonstrative aspects.

Reference is made to FIG. 12, which schematically illustrates a radar system 1201, in accordance with some demonstrative aspects. For example, radar system 1001 (FIG. 10) may include one or more elements of radar system 1201, and/or may perform one or more operations and/or functionalities of radar system 1201.

In some demonstrative aspects, as shown in FIG. 12, radar system 1201 may include a radar device 1202. For example, radar device 1002 (FIG. 10) may include one or more elements of radar device 1202, and/or may perform one or more operations and/or functionalities of radar device 1202.

In some demonstrative aspects, as shown in FIG. 12, radar device 1202 may include a transmitter 1204, and a receiver 1206.

In some demonstrative aspects, as shown in FIG. 12, radar system 1201 may include a plurality of RHs 1210, e.g., as satellites. For example, the plurality of RHs 1010 (FIG. 10) may include one or more elements of the plurality of the RHs 1210, and/or may perform one or more operations and/or functionalities of plurality of RHs the 1210.

In some demonstrative aspects, as shown in FIG. 12, radar device 1202 may include a radar processing unit 1234 configured to coordinate radar communications by the plurality of RHs 1210, the transmitter 1204, and/or the receiver 1206. For example, radar processing unit 1034 (FIG. 10) may include one or more elements of radar processing unit 1234, and/or may perform one or more operations and/or functionalities of radar processing unit 1234.

In some demonstrative aspects, as shown in FIG. 12, radar processing unit 1234 may be implemented, for example, as part of radar device 1202.

In some demonstrative aspects, as shown in FIG. 12, radar device 1202 may include a communication interface 1230 configured to communicate with the plurality of RHs 1210. For example, communication interface 1030 (FIG. 10) may include one or more elements of communication interface 1230, and/or may perform one or more operations and/or functionalities of communication interface 1230.

In some demonstrative aspects, as shown in FIG. 12, the plurality of the RHs 1210 may include RHs including both Tx capabilities and Rx capabilities. For example, an RH 1210 may include one or more Rx chains 1217, and/or one or more Tx chains 1219.

In some demonstrative aspects, a radar system may be configured to include one or more Tx-only satellite RHs including only Tx capabilities, for example, to provide an efficient mode of a Multi Static radar system, e.g., as described below.

For example, in some implementations and/or use cases, a radar system may be configured with Tx-only RH satellites, for example, to reduce cost and/or complexity compared to a satellite implementation with both Tx and Rx parts.

In some demonstrative aspects, implementation of a radar system with Tx-only RH satellites may provide a major advantage in system complexity, cost and/or flexibility, for example, at a cost of performance. In example, an integrated radar unit may be provided as a standalone integrated radar unit, or as a premium version, for example, with satellites.

Figure 13:
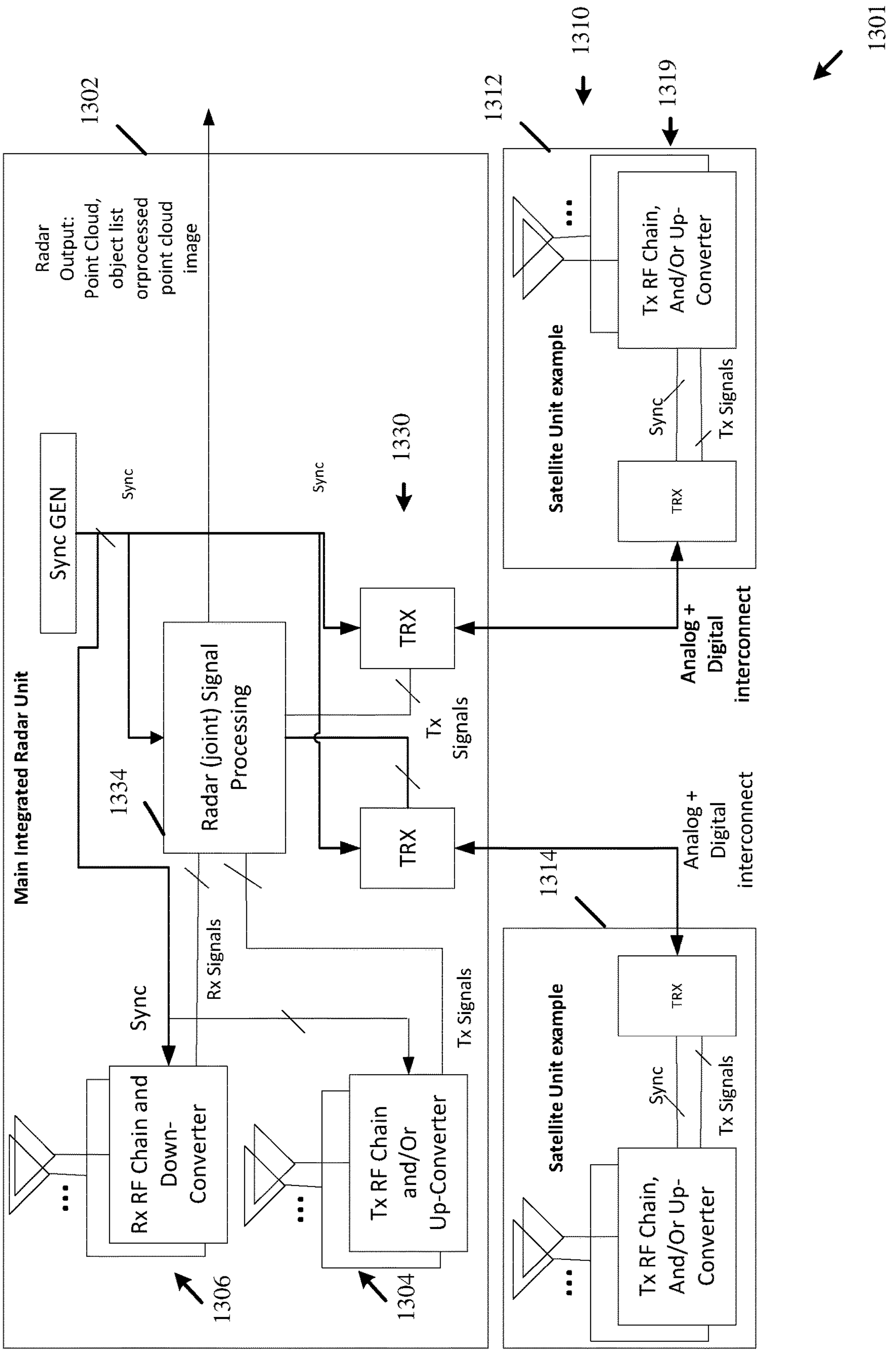
FIG. 13 is a schematic illustration of a radar system, in accordance with some demonstrative aspects.

Reference is made to FIG. 13, which schematically illustrates a radar system 1301, in accordance with some demonstrative aspects. For example, radar system 1001 (FIG. 10) may include one or more elements of radar system 1301, and/or may perform one or more operations and/or functionalities of radar system 1301.

In some demonstrative aspects, as shown in FIG. 13, radar system 1301 may include a radar device 1302. For example, radar device 1002 (FIG. 10) may include one or more elements of radar device 1302, and/or may perform one or more operations and/or functionalities of radar device 1302.

In some demonstrative aspects, as shown in FIG. 13, radar device 1302 may include a transmitter 1304 and a receiver 1306.

In some demonstrative aspects, as shown in FIG. 13, radar system 1301 may include a plurality of RHs 1310, e.g., as satellites. For example, the plurality of RHs 1010 (FIG. 10) may include one or more elements of the plurality of the RHs 1310, and/or may perform one or more operations and/or functionalities of plurality of RHs the 1310.

In some demonstrative aspects, as shown in FIG. 13, radar device 1302 may include a radar processing unit 1334 configured to coordinate radar communications by the plurality of RHs 1310, the transmitter 1304, and/or the receiver 1306. For example, radar processing unit 1034 (FIG. 10) may include one or more elements of radar processing unit 1334, and/or may perform one or more operations and/or functionalities of radar processing unit 1334.

In some demonstrative aspects, as shown in FIG. 13, radar processing unit 1334 may be implemented, for example, as part of radar device 1302.

In some demonstrative aspects, as shown in FIG. 13, radar device 1302 may include a communication interface 1330 configured to communicate with the plurality of RHs 1310. For example, communication interface 1030 (FIG. 10) may include one or more elements of communication interface 1330, and/or may perform one or more operations and/or functionalities of communication interface 1330.

In some demonstrative aspects, as shown in FIG. 13, the plurality of the RHs 1310 may include Tx-only RHs including only Tx capabilities. For example, an RH 1310 may include one or more Tx chains 1319.

In some demonstrative aspects, a satellite architecture, e.g., as described above, may be utilized, for example, to provide a technical solution to support an efficient mode of a Multi Static radar system.

In some demonstrative aspects, performance of a Multi Static radar system may be improved, for example, when using a coherent processing over multiple frames, e.g., according to a Synthetic Aperture Radar (SAR) scheme.

In some demonstrative aspects, the satellite architecture may be implemented to improve radar performance, for example, with respect to side scenery and/or height measurements, e.g., as described below.

In some demonstrative aspects, the satellite architecture may be implemented to increase an aperture of a virtual array (VA), for example, by using additional RHs, e.g., as described below.

Figure 14:
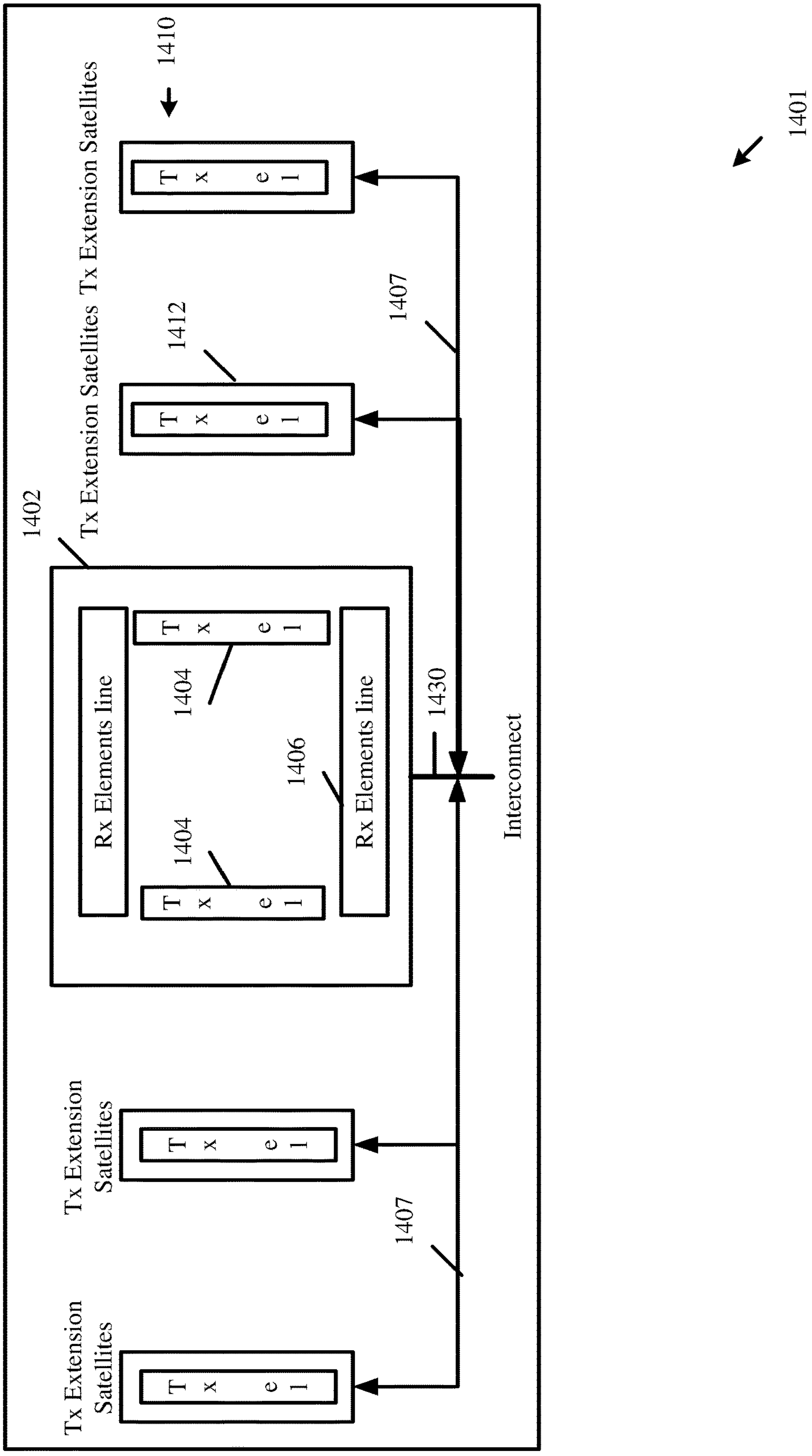
FIG. 14 is a schematic illustration of a radar system, in accordance with some demonstrative aspects.

Reference is made to FIG. 14, which schematically illustrates a radar system 1401, in accordance with some demonstrative aspects. For example, radar system 1001 (FIG. 10) may include one or more elements of radar system 1401, and/or may perform one or more operations and/or functionalities of radar system 1401.

In some demonstrative aspects, as shown in FIG. 14, radar system 1401 may include a radar device 1402. For example, radar device 1002 (FIG. 10) may include one or more elements of radar device 1402, and/or may perform one or more operations and/or functionalities of radar device 1402.

In some demonstrative aspects, as shown in FIG. 14, radar device 1402 may include a transmitter including Tx arrays 1404, and a receiver including an Rx array 1406.

In some demonstrative aspects, as shown in FIG. 14, radar system 1401 may include a plurality of Tx-only RHs 1410, e.g., as satellites. For example, an RH 1410 may include one or more Tx chains including one or more Tx antenna arrays 1412.

In some demonstrative aspects, as shown in FIG. 14, radar device 1402 may include a communication interface 1430 configured to communicate with the plurality of RHs 1410, for example, via a plurality of interconnectors 1407. For example, communication interface 1030 (FIG. 10) may include one or more elements of communication interface 1430, and/or may perform one or more operations and/or functionalities of communication interface 1430.

In some demonstrative aspects, radar system 1401 may be implemented to provide a technical solution to increase an aperture of a VA, e.g., a VA of radar device 1402, for example, by adding additional Tx arrays, e.g., Tx arrays 1412.

In some demonstrative aspects, the Tx arrays of RHs 1410 may be utilized as a MIMO radar including a ULA, which may span a length of the ULA between a Tx array 1412, which is most right, to a Tx array 1412, which is most left, e.g., in addition to the size of the Rx elements of Rx array 1406.

In some demonstrative aspects, a same effect of ULA may be achieved by interchanging roles of the Tx arrays and the Rx arrays.

In some demonstrative aspects, radar system 1401 may implement a more complex structure, for example, by deploying distributed antenna elements at different places of a vehicle. For example, the distributed antenna elements may be placed at windshield boundaries, on top of the vehicle, along the frontal hood of the vehicle, and/or at any other locations.

Figure 15:
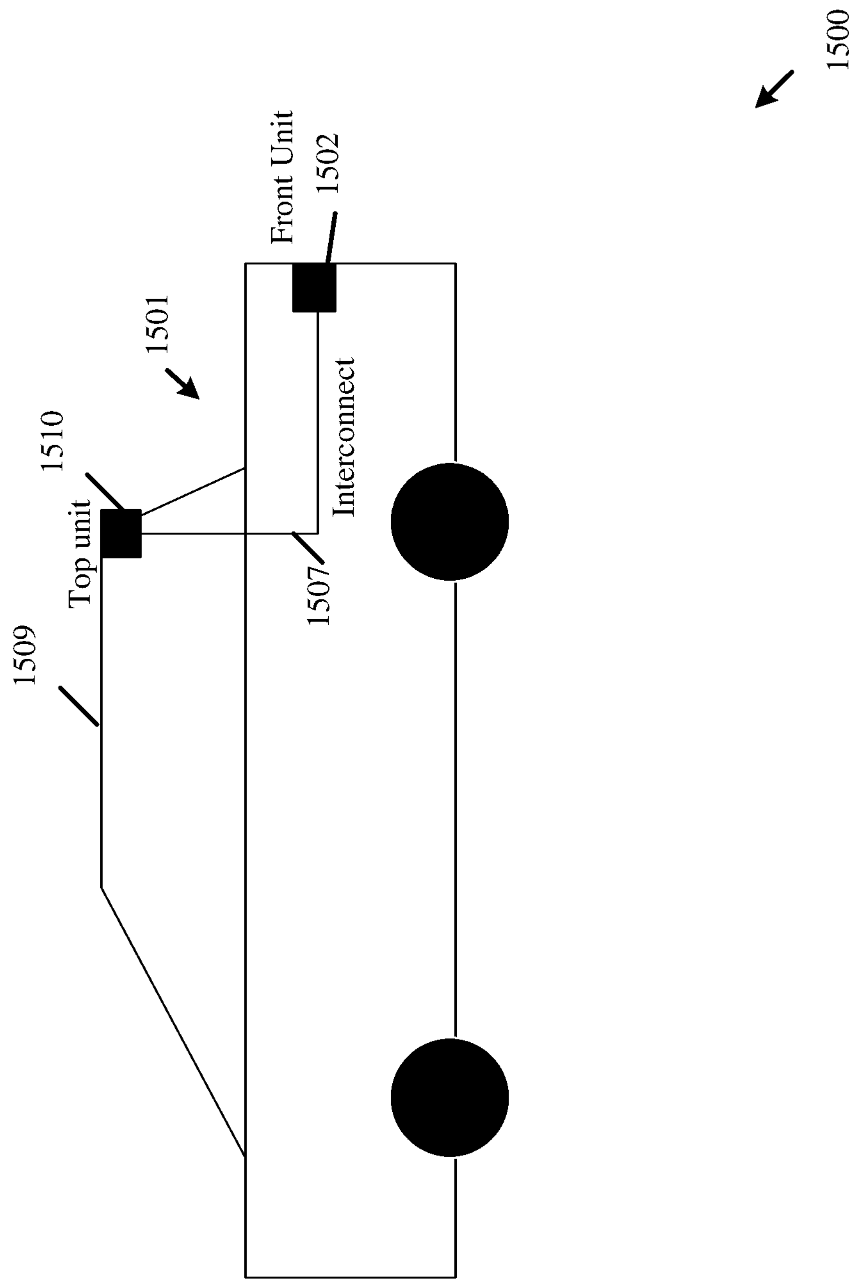
FIG. 15 is a schematic illustration of an implementation of a radar system in a vehicle, in accordance with some demonstrative aspects.

Reference is made to FIG. 15, which schematically illustrates an implementation 1500 of a radar system 1501 in a vehicle 1509, in accordance with some demonstrative aspects. For example, radar system 1001 (FIG. 10) may include one or more elements of radar system 1501, and/or may perform one or more operations and/or functionalities of radar system 1501.

In some demonstrative aspects, as shown in FIG. 15, radar system 1501 may include a radar device 1502. For example, radar device 1002 (FIG. 10) may include one or more elements of radar device 1502, and/or may perform one or more operations and/or functionalities of radar device 1502.

In some demonstrative aspects, radar device 1502 may include an integrated radar device, for example, including a transmitter, a receiver, a communication interface to communicate with one or more RHs 1510, and a radar processor configured to coordinate radar communications by the RHs 1510, e.g., as described above.

In some demonstrative aspects, as shown in FIG. 15, radar device 1502 may be mounted on a front of the vehicle 1509, e.g., on a bumper, and RH 1510 may be mounted on a rooftop of the vehicle 1509.

In some demonstrative aspects, as shown in FIG. 15, the communication interface of radar device 1502 may communicate with the RH 1510, for example, via an interconnect 1507.

In some demonstrative aspects, as shown in FIG. 15, radar system 1501 may include a front unit, e.g., radar device 1502, with an additional radio unit as a satellite unit, e.g., RH 1510, for example, to provide improved and/or high performance height estimation.

In some demonstrative aspects, the one or more satellite unit 1510 may be mounted at different places in the vehicle, for example, on a front "grill" of the vehicle, e.g., below or above the main front unit 1502.

In some demonstrative aspects, the satellite unit 1510 may be placed on the same X-Z plane as the main unit 1502, or at a different Y coordinate, e.g., if Y denotes an ahead direction.

In some demonstrative aspects, as shown in FIG. 15, the satellite, e.g., RH 1510, may be displaced relative to the main unit 1502, e.g., in all coordinates, and may be mounted on the rooftop of the vehicle 1509, or at a windshield edge.

In some demonstrative aspects, the satellite unit 1510 may be for MS processing, Forward-Looking SAR processing, and/or joint MS and SAR processing.

In other aspects, roles and/or locations of the main unit 1502 and the satellite unit 1510 may be switched. For example, the main unit 1502 may be on the rooftop of vehicle 1509.

In some demonstrative aspects, a radar system may include a main integrated unit, e.g., radar device 1502, and a relatively large number of satellites, for example, a large number of RHs 1510, e.g., as described below.

Figure 16:
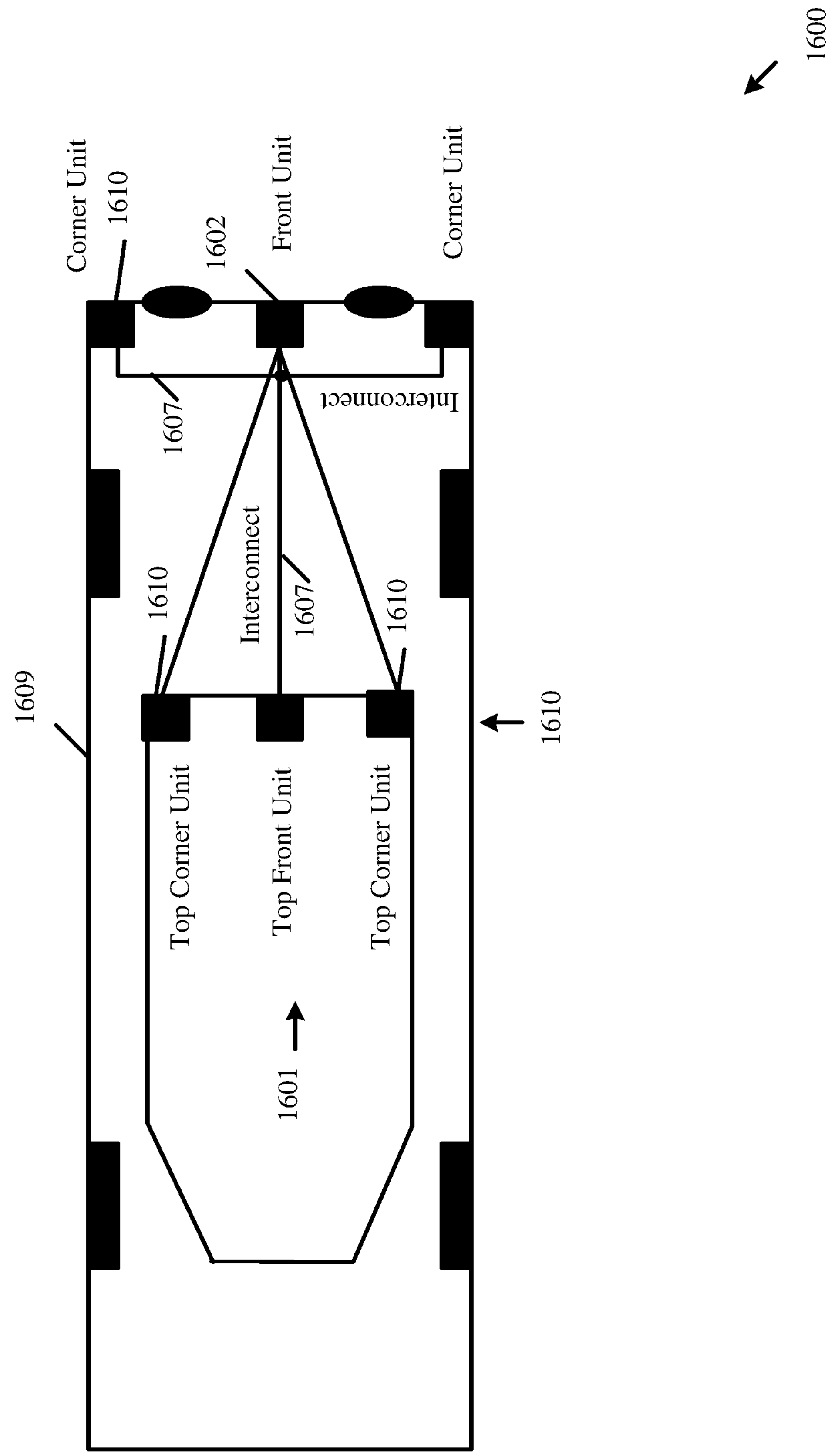
FIG. 16 is a schematic illustration of an implementation of a radar system in a vehicle, in accordance with some demonstrative aspects.

Reference is made to FIG. 16, which schematically illustrates an implementation 1600 of a radar system 1601 in a vehicle 1609, in accordance with some demonstrative aspects. For example, radar system 1001 (FIG. 10) may include one or more elements of radar system 1601, and/or may perform one or more operations and/or functionalities of radar system 1601.

In some demonstrative aspects, as shown in FIG. 16, radar system 1601 may include a radar device 1602. For example, radar device 1002 (FIG. 10) may include one or more elements of radar device 1602, and/or may perform one or more operations and/or functionalities of radar device 1602.

In some demonstrative aspects, radar device 1602 may include an integrated radar device, for example, including a transmitter, a receiver, a communication interface to communicate with a plurality of RHs 1610, and a radar processor configured to coordinate radar communications by the RHs 1610.

In some demonstrative aspects, as shown in FIG. 16, radar device 1602 may be mounted on a front of the vehicle, and RH 1610*s* may be mounted at different locations on the front of the vehicle, e.g., on the rooftop, rooftop corners, and/or front corners.

In some demonstrative aspects, as shown in FIG. 16, the communication interface of radar device 1602 may communicate with the RHs 1610, for example, via a plurality of interconnectors 1607.

In some demonstrative aspects, as shown in FIG. 16, radar system 1601 may include a front unit, e.g., radar device 1602, with a large number of additional radio unit as satellites, e.g., RHs 1610, which may be configured to span a VA, e.g., in an Azimuth dimension and/or an elevation dimension.

In some demonstrative aspects, one or more satellite units 1610 may be on a same X-Z plane of the main unit 1502, while one or more other satellite units 1610 may be located at a Y coordinate different from the main unit 1502.

In some demonstrative aspects, a radar system may include a plurality of RHs, which may be mounted on different locations on a rear side of a vehicle, for example, in addition to, or instead of, RHs on the front side of the vehicle, for example, to improve a FOV of the radar system, e.g., as described below.

Figure 17:
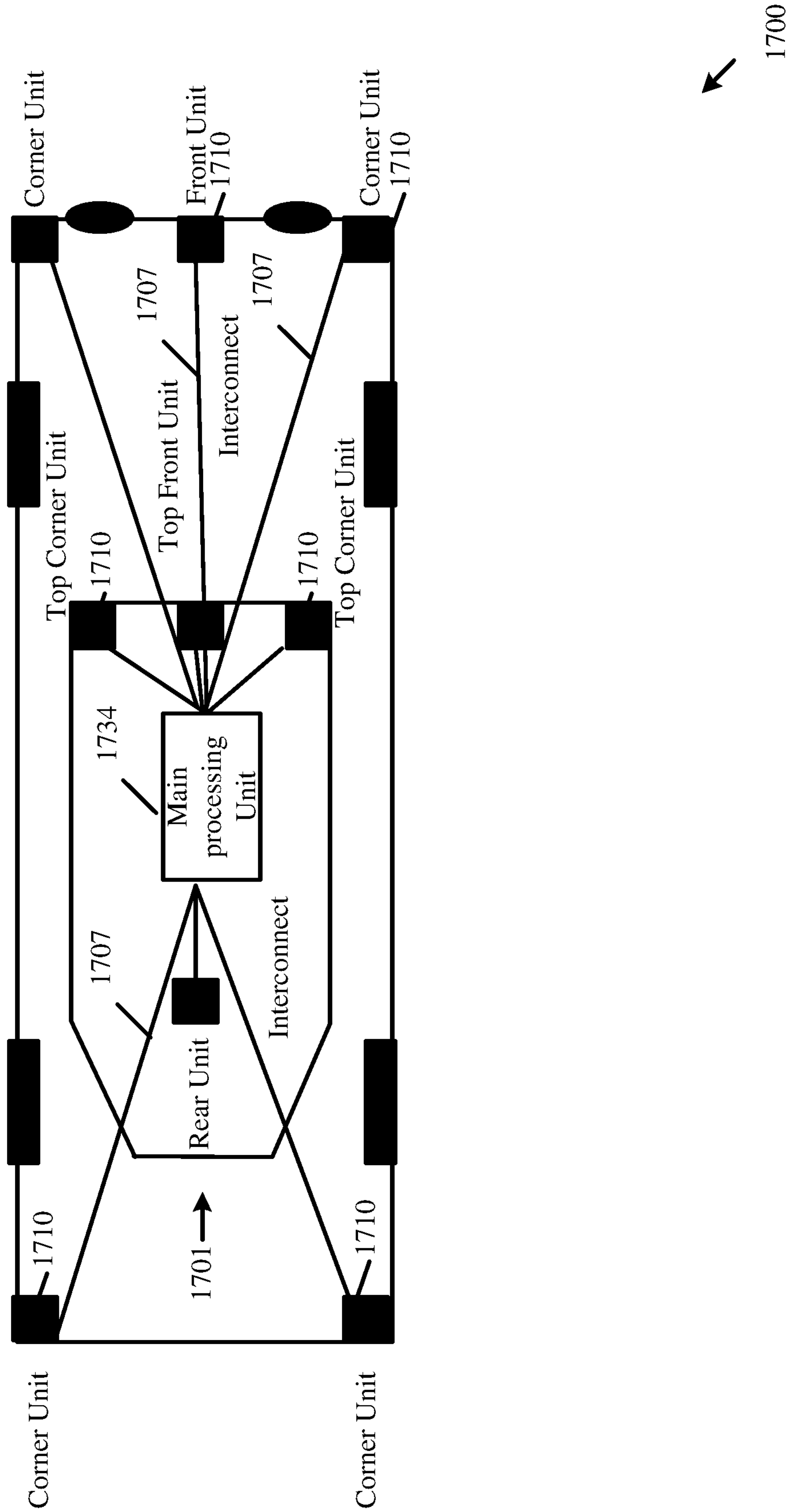
FIG. 17 is a schematic illustration of an implementation of a radar system in a vehicle, in accordance with some demonstrative aspects.

Reference is made to FIG. 17, which schematically illustrates an implementation 1700 of a radar system 1701 in a vehicle 1709, in accordance with some demonstrative aspects. For example, radar system 1001 (FIG. 10) may include one or more elements of radar system 1701, and/or may perform one or more operations and/or functionalities of radar system 1701.

In some demonstrative aspects, as shown in FIG. 17, radar system 1701 may include a radar processing unit 1734, configured to coordinate radar communications by a plurality of RHs 1710. For example, radar processing unit 1034 (FIG. 10) may include one or more elements of radar processing unit 1734, and/or may perform one or more operations and/or functionalities of radar processing unit 1734; and/or the plurality of RHs 1010 (FIG. 10) may include one or more elements of the plurality of the RHs 1710, and/or may perform one or more operations and/or functionalities of plurality of RHs 1710.

In some demonstrative aspects, radar processing unit 1734 may include a communication interface to communicate with the plurality of RHs 1710, for example, via a plurality of interconnectors 1707.

In some demonstrative aspects, as shown in FIG. 17, radar processing unit 1734 may be mounted on a rooftop, e.g., at a center of the rooftop, of the vehicle 1709. For example, RHs 1710 may be mounted at different locations on the front of the vehicle 1709, e.g., rooftop, rooftop corners, and/or front corners, and/or on the rear of the vehicle 1709, e.g., rooftop, and/or rear corners.

In some demonstrative aspects, as shown in FIG. 17, radar system 1701 may include a main processing unit, e.g., radar processing unit 1734, with a relatively large number of additional RHs as satellites, e.g., RHs 1710, which may be configured to provide an improved FoV, for example, for a rear side and/or a front side of vehicle 1709.

In some demonstrative aspects, one or more satellite units 1710 may be on a same X-Z plane of the main unit 1734, while one or more other satellite units 1710 may be located at a Y coordinate different from the main unit 1734, for example, if some FoV of RHs on rooftop is blocked by a body of vehicle 1709.

Figure 18:
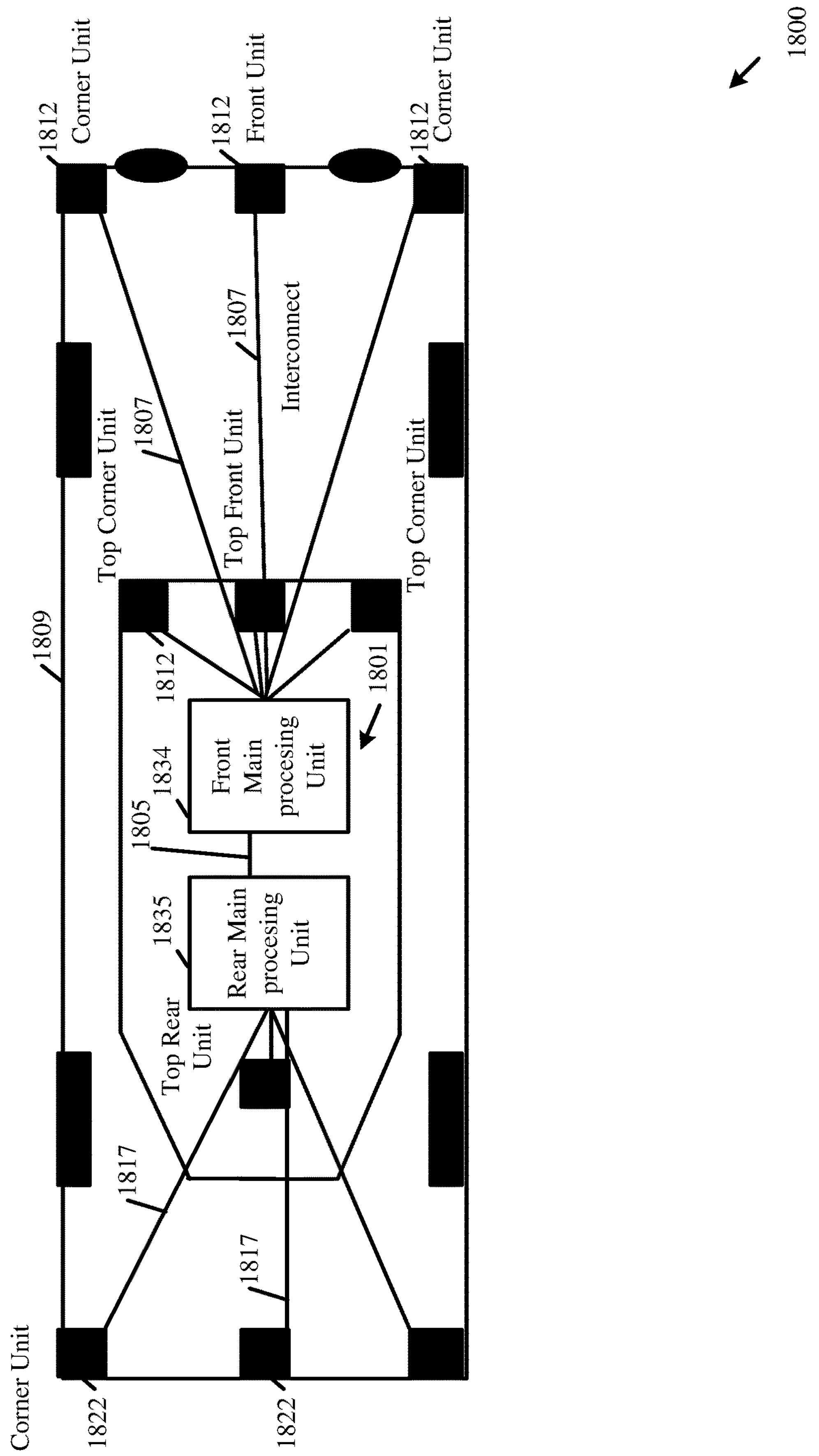
FIG. 18 is a schematic illustration of an implementation of a radar system in a vehicle, in accordance with some demonstrative aspects.

Reference is made to FIG. 18, which schematically illustrates an implementation 1800 of a radar system 1801 in a vehicle 1809, in accordance with some demonstrative aspects. For example, radar system 1001 (FIG. 10) may include one or more elements of radar system 1801, and/or may perform one or more operations and/or functionalities of radar system 1801.

In some demonstrative aspects, as shown in FIG. 18, radar system 1801 may include a first radar processing unit 1834 configured to coordinate radar communications by a first plurality of RHs 1812, e.g., which may be mounted on a front side of vehicle 1809.

In some demonstrative aspects, as shown in FIG. 18, radar system 1801 may include a second radar processing unit 1835 configured to coordinate radar communications by a plurality of RHs 1822, e.g., which may be mounted on a rear side of vehicle 1809.

For example, radar processing unit 1835 and/or radar processing unit 1834 may include one or more elements of radar processing unit 1034 (FIG. 10), and/or may perform one or more operations and/or functionalities of radar processing unit 1034 (FIG. 10); and/or the plurality of RHs 1812 and/or the plurality of RHs 1822 may include one or more elements of the plurality of the RHs 1010 (FIG. 10), and/or may perform one or more operations and/or functionalities of plurality of RHs 1010 (FIG. 10).

In some demonstrative aspects, radar processing unit 1834 may include a communication interface to communicate with the plurality of RHs 1812, for example, via a plurality of interconnectors 1807.

In some demonstrative aspects, radar processing unit 1835 may include a communication interface to communicate with the plurality of RHs 1822, for example, via a plurality of interconnectors 1817.

In some demonstrative aspects, as shown in FIG. 18, radar processing unit 1834 may be mounted on a rooftop, e.g., in a front portion of the rooftop, of the vehicle 1809, and/or RHs 1812 may be mounted at different locations on a front side of the vehicle 1809, e.g., rooftop, rooftop corners and/or front corners.

In some demonstrative aspects, as shown in FIG. 18, radar processing unit 1835 may be mounted on the rooftop of vehicle 1809, e.g., in a rear portion of the rooftop, and/or RHs 1822 may be mounted at different locations on a rear side of the vehicle 1809, e.g., rooftop, rear bumper, and/or rear corners.

In some demonstrative aspects, as shown in FIG. 18, radar processing unit 1834 and radar processing unit 1835 may communicate via a communication link 1805, for example, to support temporal post processing, redundancy, sensor fusion, load balancing, and/or any other collaborative functionality.

In some demonstrative aspects, a radar system may include a larger number of RHs, for example, compared to radar system 1801, for example, to further improve a FoV, accuracy, and/or performance of radar system 1801, e.g., as described below.

Figure 19:
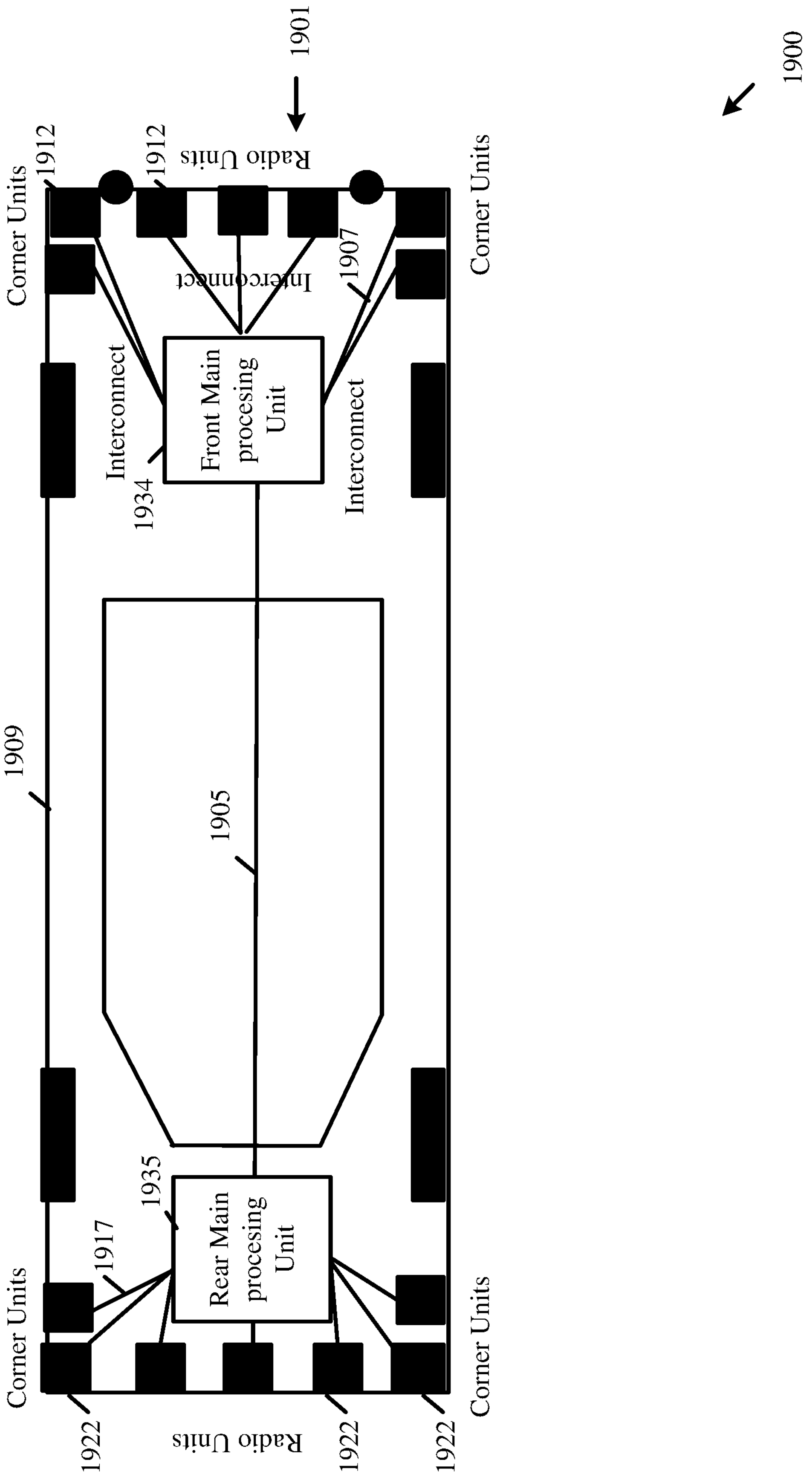
FIG. 19 is a schematic illustration of an implementation of a radar system in a vehicle, in accordance with some demonstrative aspects.

Reference is made to FIG. 19, which schematically illustrates an implementation 1900 of a radar system 1901 in a vehicle 1909, in accordance with some demonstrative aspects. For example, radar system 1001 (FIG. 10) may include one or more elements of radar system 1901, and/or may perform one or more operations and/or functionalities of radar system 1901.

In some demonstrative aspects, as shown in FIG. 19, radar system 1901 may include a first radar processing unit 1934 configured to coordinate radar communications by a first plurality of RHs 1912, e.g., which may be mounted on a front side of vehicle 1909.

In some demonstrative aspects, as shown in FIG. 19, radar system 1901 may include a second radar processing unit 1935 configured to coordinate radar communications by a plurality of RHs 1922, e.g., which may be mounted on a rear side of vehicle 1909.

For example, radar processing unit 1935 and/or radar processing unit 1934 may include one or more elements of radar processing unit 1034 (FIG. 10), and/or may perform one or more operations and/or functionalities of radar processing unit 1034 (FIG. 10); and/or the plurality of RHs 1912 and/or the plurality of RHs 1922 may include one or more elements of the plurality of the RHs 1010 (FIG. 10), and/or may perform one or more operations and/or functionalities of plurality of RHs 1010 (FIG. 10).

In some demonstrative aspects, radar processing unit 1934 may include a communication interface to communicate with the plurality of RHs 1912, for example, via a plurality of interconnectors 1907.

In some demonstrative aspects, radar processing unit 1935 may include a communication interface to communicate with the plurality of RHs 1922, for example, via a plurality of interconnectors 1917.

In some demonstrative aspects, as shown in FIG. 19, radar processing unit 1934 may be mounted on the front side of vehicle 1909, and/or RHs 1912 may be mounted at different locations on the front side of the vehicle 1909, e.g., rooftop, rooftop corners, and/or front corners.

In some demonstrative aspects, as shown in FIG. 19, radar processing unit 1935 may be mounted on the rear side of vehicle 1909, and/or RHs 1922 may be mounted at different locations on the rear side of the vehicle 1909, e.g., rooftop, rear bumper, and/or rear corners.

In some demonstrative aspects, as shown in FIG. 19, radar processing unit 1934 and radar processing unit 1935 may communicate via a communication link 1905, for example, to support temporal post processing, redundancy, sensor fusion, load balancing, and/or any other collaborative functionality.

In some demonstrative aspects, radar system 1901 may include a relatively large number of RHs, for example, compared to radar system 1801 (FIG. 18), for example, to support an improved FoV, accuracy, and/or performance.

In one example, a FoV of some RHs 1912 may be blocked in some areas by a body of vehicle 1909. Accordingly, one or more RHs 1912 may be augmented on a lower part of the body of vehicle 1909, e.g., at headlight height and/or behind the bumper, for example, to cover the blocked FoV areas.

Figure 20:
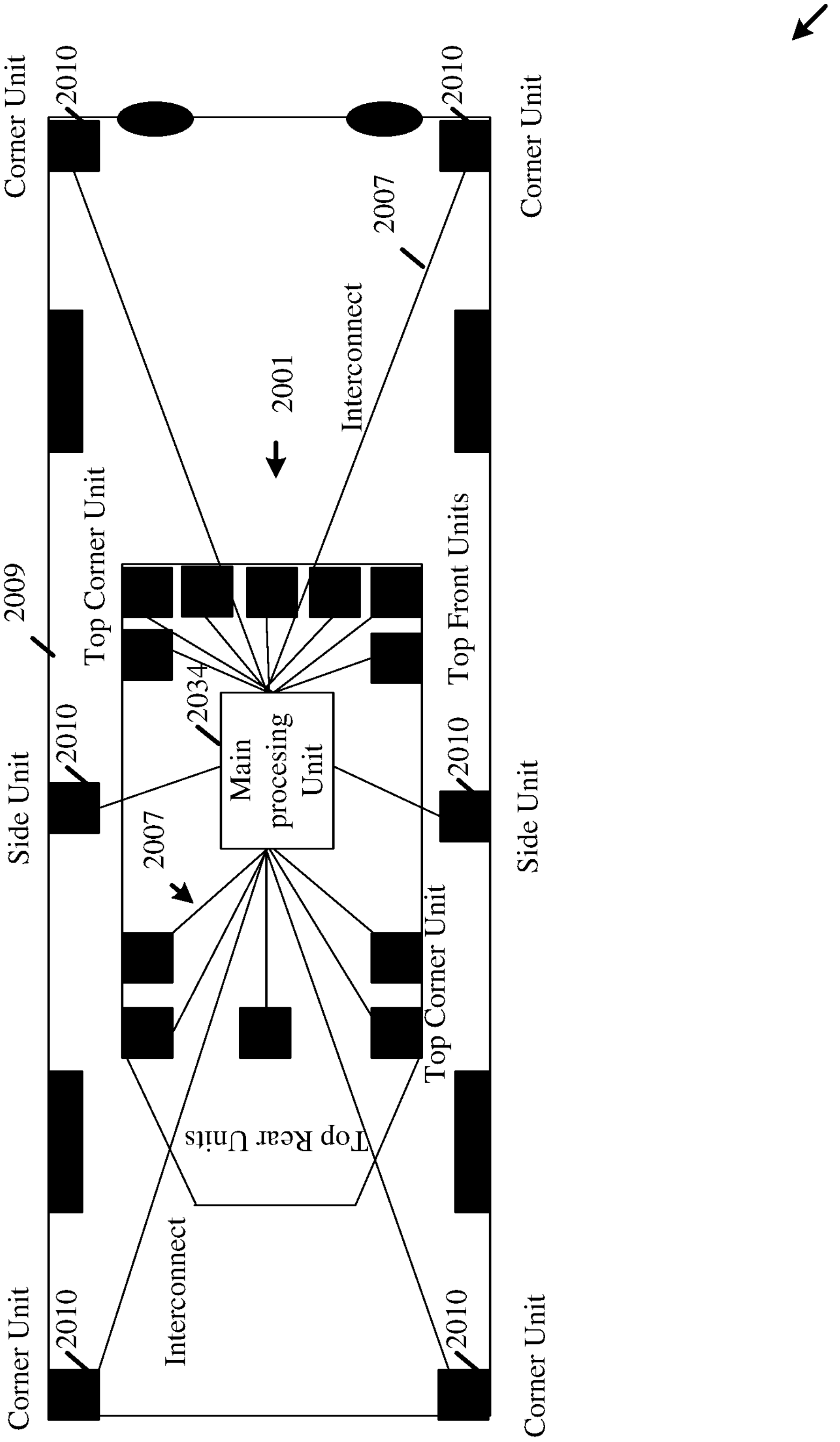
FIG. 20 is a schematic illustration of an implementation of a radar system in a vehicle, in accordance with some demonstrative aspects.

Reference is made to FIG. 20, which schematically illustrates an implementation 2000 of a radar system 2001 in a vehicle 2009, in accordance with some demonstrative aspects. For example, radar system 1001 (FIG. 10) may include one or more elements of radar system 2001, and/or may perform one or more operations and/or functionalities of radar system 2001.

In some demonstrative aspects, as shown in FIG. 20, radar system 2001 may include a radar processing unit 2034, configured to coordinate radar communications by a plurality of RHs 2010. For example, radar processing unit 1034 (FIG. 10) may include one or more elements of radar processing unit 2034, and/or may perform one or more operations and/or functionalities of radar processing unit 2034; and/or the plurality of RHs 1010 (FIG. 10) may include one or more elements of the plurality of the RHs 2010, and/or may perform one or more operations and/or functionalities of plurality of RHs 2010.

In some demonstrative aspects, radar processing unit 2034 may include a communication interface to communicate with the plurality of RHs 2010, for example, via a plurality of interconnectors 2007.

In some demonstrative aspects, the plurality of RHs 2010 may be positioned, for example, to support a large, e.g., optimized, FoV coverage.

For example, the plurality of RHs 2010 may be deployed to include a plurality of vehicle top-position RHs, for example, to provide a FoV coverage to support increased, e.g., maximal visibility for relatively long distances.

For example, the plurality of RHs 2010 may be deployed to include a plurality of low-position RHs, for example, to provide a FoV coverage to support vehicle proximity sensing, e.g., at relatively close distances, for example, without, or with reduced, blocked FoV areas, which may be blocked the body of vehicle 2009.

For example, the plurality of RHs 2010 may be deployed to include a plurality of small RHs, e.g., a relatively large number of small RHs, which may be positioned at various different locations and/or orientations, for example, to provide a FoV coverage, e.g., to cover substantially a complete 360 surround sensing FoV.

In some demonstrative aspects, as shown in FIG. 20, radar processing unit 2034 may be mounted in a center of a rooftop the vehicle 2009, and RHs 2010 may be mounted on different locations on the front of the vehicle 2009, e.g., rooftop, rooftop corners and front corners, and/or on the rear of the vehicle 2009, e.g., rooftop, and/or rear corners.

In some demonstrative aspects, as shown in FIG. 20, radar system 2001 may include a main processing unit, e.g., radar processing unit 2034, to control a relatively large number of additional radio units as satellites, e.g., RHs 2010, for example, compared to radar system 1701 (FIG. 17). For example, the large number of RHs 2010 may be utilized to provide an improved FoV, accuracy, and/or performance.

In some demonstrative aspects, one or more satellite units 2010 may be on a same X-Z plane of the main unit 2034, while one or more other satellite units 2010 may be located at a Y coordinate different from the main unit 2034, for example, if some FoV of RHs on rooftop is blocked by a body of vehicle 2009.

Figure 21:
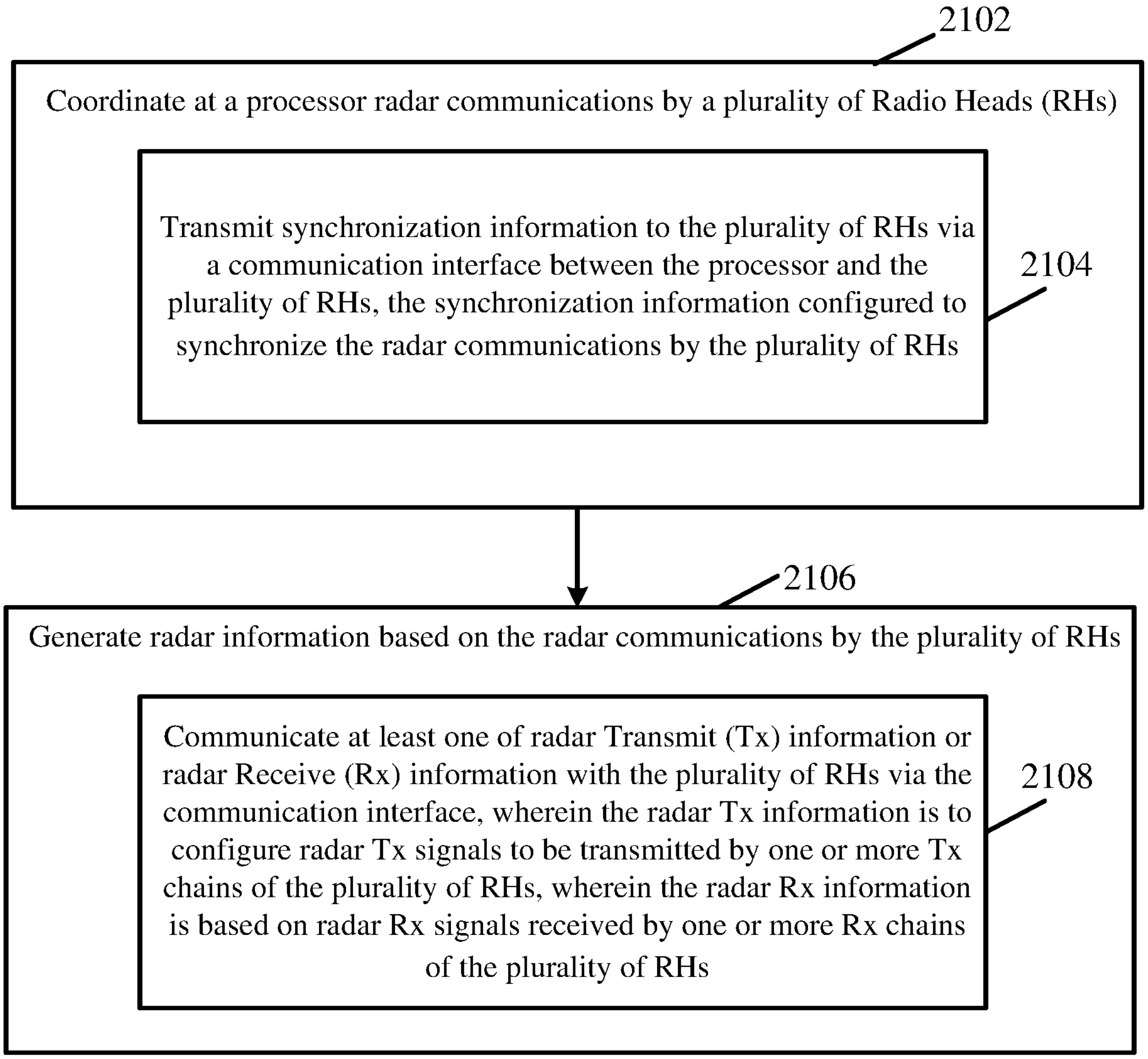
FIG. 21 is a schematic flow chart illustration of a method of radar communication, in accordance with some demonstrative aspects.

Reference is made to FIG. 21, which schematically illustrates a method of radar communication, in accordance with some demonstrative aspects. For example, one or more of the operations of the method of FIG. 21 may be performed by a radar system, e.g., radar system 900 (FIG. 9), and/or radar system 1001 (FIG. 10); a radar device, e.g., radar device 1002 (FIG. 10), a radar processing unit, e.g., radar processing unit 1034 (FIG. 10); and/or a processor, e.g., processor 1036 (FIG. 10).

As indicated at block 2102, the method may include coordinating, at a processor, radar communications by a plurality of RHs. For example, processor 1036 (FIG. 10) may be configured to coordinate the radar communications by the plurality of RHs 1010 (FIG. 10), e.g., as described above.

As indicated at block 2104, coordinating the radar communications by the plurality of RHs may include transmitting synchronization information to the plurality of RHs via a communication interface between the processor and the plurality of RHs, the synchronization information configured to synchronize the radar communications by the plurality of RHs. For example, processor 1036 (FIG. 10) may be configured to transmit the synchronization information 1015 (FIG. 10) to the plurality of RHs 1010 (FIG. 10) via the communication interface 1030 (FIG. 10), e.g., as described above.

As indicated at block 2106, the method may include generating radar information based on the radar communications by the plurality of RHs. For example, processor 1036 (FIG. 10) may be configured to generate the radar information 1013 (FIG. 10) based on the radar communications by the plurality of RHs 1010 (FIG. 10), e.g., as described above.

As indicated at block 2108, the method may include communicating at least one of radar Tx information or radar Rx information with the plurality of RHs via the communication interface, wherein the radar Tx information is to configure radar Tx signals to be transmitted by one or more Tx chains of the plurality of RHs, wherein the radar Rx information is based on radar Rx signals received by one or more Rx chains of the plurality of RHs. For example, processor 1036 (FIG. 10) may be configured to communicating the radar Tx information and/or the radar Rx information with the plurality of RHs 1010 (FIG. 10) via the communication interface 1030 (FIG. 10), e.g., as described above.

Figure 22:
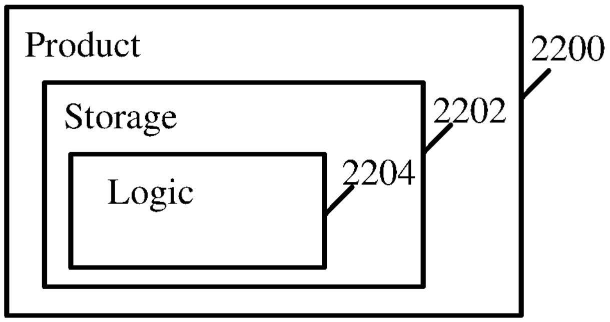
FIG. 22 is a schematic illustration of a product of manufacture, in accordance with some demonstrative aspects.

Reference is made to FIG. 22, which schematically illustrates a product of manufacture 2200, in accordance with some demonstrative aspects. Product 2200 may include one or more tangible computer-readable ("machine-readable") non-transitory storage media 2202, which may include computer-executable instructions, e.g., implemented by logic 2204, operable to, when executed by at least one computer processor, enable the at least one computer processor to implement one or more operations and/or functionalities described with reference to any of the FIGS. 1-21, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 2200 and/or machine-readable storage media 2202 may include one or more types of computer-readable storage media capable of storing data, including volatile memory, non-volatile memory, removable or non-removable memory, erasable or non-erasable memory, writeable or re-writeable memory, and the like. For example, machine-readable storage media 2202 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a disk, a hard drive, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 2204 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 2204 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and the like.

EXAMPLES

The following examples pertain to further aspects.

Example 1 includes an apparatus comprising a communication interface configured to communicate with a plurality of Radio Heads (RHs); and a processor configured to coordinate radar communications by the plurality of RHs and to generate radar information based on the radar communications by the plurality of RHs, the processor configured to transmit synchronization information to the plurality of RHs via the communication interface, the synchronization information configured to synchronize the radar communications by the plurality of RHs; and communicate at least one of radar Transmit (Tx) information or radar Receive (Rx) information with the plurality of RHs via the communication interface, wherein the radar Tx information is to configure radar Tx signals to be transmitted by one or more Tx chains of the plurality of RHs, wherein the radar Rx information is based on radar Rx signals received by one or more Rx chains of the plurality of RHs.

Example 2 includes the subject matter of Example 1, and optionally, wherein the synchronization information is configured to synchronize the radar communications by the plurality of RHs in phase and in time.

Example 3 includes the subject matter of Example 1 or 2, and optionally, wherein the synchronization information comprises a common Local Oscillator (LO) signal to be distributed to the plurality of RHs.

Example 4 includes the subject matter of Example 3, and optionally, wherein the communication interface is configured to transmit the common LO signal to the plurality of RHs in the form of an analog LO signal.

Example 5 includes the subject matter of any one of Examples 1-4, and optionally, wherein the processor is configured to transmit the radar Tx information via the communication interface.

Example 6 includes the subject matter of Example 5, and optionally, wherein the communication interface is configured to transmit to an RH one or more analog Tx signals for the RH to be transmitted by one or more respective Tx chains of the RH.

Example 7 includes the subject matter of Example 5 or 6, and optionally, wherein the communication interface is configured to transmit to an RH one or more digital Tx signals for the RH, wherein the one or more digital Tx signals for the RH comprise information to configure one or more digital Tx signals for one or more respective Tx chains of the RH.

Example 8 includes the subject matter of any one of Examples 5-7, and optionally, wherein the processor is configured to generate the radar Tx information to configure a simultaneous radar transmission by at least a first RH and a second RH, the simultaneous radar transmission synchronized in time and frequency, the simultaneous radar transmission comprising transmission of first radar Tx signals by the first RH and transmission of second radar Tx signals by the second RH.

Example 9 includes the subject matter of any one of Examples 5-8, and optionally, wherein the processor is configured to generate the radar Tx information to configure a Multiple-Input-Multiple-Output (MIMO) radar transmission via a MIMO array formed by antennas of the plurality of RHs.

Example 10 includes the subject matter of any one of Examples 1-9, and optionally, wherein the processor is configured to process the radar Rx information received via the communication interface, and to generate the radar information based on the radar Rx information.

Example 11 includes the subject matter of Example 10, and optionally, wherein the communication interface is configured to receive one or more analog Rx signals from an RH, wherein the one or more analog Rx signals from the RH are based on signals received by one or more respective Rx chains of the RH.

Example 12 includes the subject matter of Example 10 or 11, and optionally, wherein the communication interface is configured to receive one or more digital Rx signals from a RH, wherein the one or more digital Rx signals from the RH are based on signals received by one or more respective Rx chains of the RH.

Example 13 includes the subject matter of Example 12, and optionally, wherein the one or more digital Rx signals from the RH comprise compressed Rx information representing Rx radar samples corresponding to the signals received by the one or more Rx chains of the RH, wherein the processor is configured to decompress the compressed Rx information.

Example 14 includes the subject matter of Example 13, and optionally, wherein the processor is configured to transmit radar Tx parameter information to the RH via the communication interface, the radar Tx parameter information corresponding to a radar transmission to be received by the one or more Rx chains of the RH, wherein the processor is configured to decompress the compressed Rx information based on the radar Tx parameter information.

Example 15 includes the subject matter of any one of Examples 10-14, and optionally, wherein the radar Rx information comprises first radar Rx information from a first RH, and second radar Rx information from a second RH.

Example 16 includes the subject matter of Example 15, and optionally, wherein the processor is configured to generate the radar information based on joint processing of the first radar Rx information from the first RH and the second radar Rx information from the second RH.

Example 17 includes the subject matter of any one of Examples 1-16, and optionally, wherein the processor is configured to communicate radar control information with one or more RHs of the plurality of RHs via the communication interface, wherein the radar control information for an RH comprises control information to control one or more functionalities of the RH.

Example 18 includes the subject matter of any one of Examples 1-17, and optionally, wherein the processor is configured to generate the radar Tx information to configure a radar transmission from a first RH, wherein the processor is configured to generate the radar information based on radar Rx information from a second RH, wherein the radar Rx information from the second RH is based on the radar transmission from the first RH.

Example 19 includes the subject matter of any one of Examples 1-18, and optionally, wherein the processor is configured to generate the radar Tx information to configure a radar transmission from a particular RH, wherein the processor is configured to generate the radar information by processing radar Rx information from the particular RH based on the radar Tx information.

Example 20 includes the subject matter of any one of Examples 1-19, and optionally, wherein the processor is configured to generate the radar information based on installation information corresponding to an installation configuration of one or more of the plurality of RHs.

Example 21 includes the subject matter of Example 20, and optionally, wherein the installation information comprises position information corresponding to positions of one or more of the plurality of RHs.

Example 22 includes the subject matter of Example 21, and optionally, wherein the installation information comprises Field of View (FoV) information corresponding to FoVs of one or more of the plurality of RHs.

Example 23 includes the subject matter of any one of Examples 1-22, and optionally, comprising a radar device comprising a transmitter and a receiver, wherein the processor is configured to control the transmitter to transmit radar Tx signals of the radar device, wherein the processor is configured to generate the radar information based on radar Rx signals received by the receiver.

Example 24 includes the subject matter of Example 23, and optionally, wherein the processor is configured to synchronize the radar communications by the plurality of RHs to radar communications of the radar device.

Example 25 includes the subject matter of any one of Examples 1-24, and optionally, wherein the communication interface comprises a fiber optic communication interface to communicate the synchronization information, and the at least one of the radar Tx information or the radar Rx information with the plurality of RHs via a fiber optic interconnect.

Example 26 includes the subject matter of any one of Examples 1-24, and optionally, wherein the communication interface comprises an Active Optical Cable (AOC) communication interface to communicate the synchronization information, and the at least one of the radar Tx information or the radar Rx information with the plurality of RHs via an AOC interconnect.

Example 27 includes the subject matter of any one of Examples 1-24, and optionally, wherein the communication interface comprises a dielectric waveguide communication interface to communicate the synchronization information, and the at least one of the radar Tx information or the radar Rx information with the plurality of RHs via a dielectric waveguide interconnect.

Example 28 includes the subject matter of any one of Examples 1-27, and optionally, wherein the communication interface is configured with a redundancy factor greater than 1.

Example 29 includes a vehicle comprising the apparatus of any of Examples 1-28.

Example 30 includes an apparatus comprising means for executing any of the described operations of any of Examples 1-28.

Example 31 includes a machine-readable medium that stores instructions for execution by a processor to perform any of the described operations of any of Examples 1-28.

Example 32 comprises a product comprising one or more tangible computer-readable non-transitory storage media comprising computer-executable instructions operable to, when executed by at least one processor, enable the at least one processor to cause a device to perform any of the described operations of any of Examples 1-28.

Example 33 includes an apparatus comprising a memory; and processing circuitry configured to perform any of the described operations of any of Examples 1-28.

Example 34 includes a method including any of the described operations of any of Examples 1-28.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:

a communication interface configured to communicate with a plurality of Radio Heads (RHs); and a processor configured to coordinate radar communications by the plurality of RHs and to generate radar information based on the radar communications by the plurality of RHs, the processor configured to:

transmit synchronization information to the plurality of RHs via the communication interface, the synchronization information configured to synchronize the radar communications by the plurality of RHs; and communicate at least one of radar Transmit (Tx) information or radar Receive (Rx) information with the plurality of RHs via the communication interface, wherein the radar Tx information is to configure radar Tx signals to be transmitted by one or more Tx chains of the plurality of RHs, wherein the radar Rx information is based on radar Rx signals received by one or more Rx chains of the plurality of RHs.

2. The apparatus of claim 1, wherein the synchronization information is configured to synchronize the radar communications by the plurality of RHs in phase and in time.

3. The apparatus of claim 1, wherein the synchronization information comprises a common Local Oscillator (LO) signal to be distributed to the plurality of RHs.

4. The apparatus of claim 3, wherein the communication interface is configured to transmit the common LO signal to the plurality of RHs as an analog LO signal.

5. The apparatus of claim 1, wherein the processor is configured to transmit the radar Tx information via the communication interface.

6. The apparatus of claim 5, wherein the communication interface is configured to transmit to an RH one or more analog Tx signals to be transmitted by one or more respective Tx chains of the RH.

7. The apparatus of claim 5, wherein the communication interface is configured to transmit to an RH one or more digital Tx signals, wherein the one or more digital Tx signals comprise information to configure one or more digital Tx signals for one or more respective Tx chains of the RH.

8. The apparatus of claim 5, wherein the processor is configured to generate the radar Tx information to configure a simultaneous radar transmission by at least a first RH and a second RH, the simultaneous radar transmission comprising transmission of first radar Tx signals by the first RH and transmission of second radar Tx signals by the second RH.

9. The apparatus of claim 5, wherein the processor is configured to generate the radar Tx information to configure a Multiple-Input-Multiple-Output (MIMO) radar transmission via a MIMO array formed by antennas of the plurality of RHs.

10. The apparatus of claim 1, wherein the processor is configured to process the radar Rx information received via the communication interface, and to generate the radar information based on the radar Rx information.

11. The apparatus of claim 10, wherein the communication interface is configured to receive one or more analog Rx signals from an RH, wherein the one or more analog Rx signals from the RH are based on signals received by one or more respective Rx chains of the RH.

12. The apparatus of claim 10, wherein the communication interface is configured to receive one or more digital Rx signals from a RH, wherein the one or more digital Rx signals from the RH are based on signals received by one or more respective Rx chains of the RH.

13. The apparatus of claim 12, wherein the one or more digital Rx signals from the RH comprise compressed Rx information representing Rx radar samples corresponding to the signals received by the one or more Rx chains of the RH, wherein the processor is configured to decompress the compressed Rx information.

14. The apparatus of claim 10, wherein the radar Rx information comprises first radar Rx information from a first RH, and second radar Rx information from a second RH.

15. The apparatus of claim 1, wherein the processor is configured to communicate radar control information with one or more RHs of the plurality of RHs via the communication interface, wherein the radar control information for an RH comprises control information to control one or more functionalities of the RH.

16. The apparatus of claim 1, wherein the processor is configured to generate the radar Tx information to configure a radar transmission from a first RH, wherein the processor is configured to generate the radar information based on radar Rx information from a second RH, wherein the radar Rx information from the second RH is based on the radar transmission from the first RH.

17. The apparatus of claim 1, wherein the processor is configured to generate the radar information based on installation information corresponding to an installation configuration of one or more RHs of the plurality of RHs.

18. The apparatus of claim 1 comprising a radar device comprising a transmitter and a receiver, wherein the processor is configured to control the transmitter to transmit radar Tx signals of the radar device, wherein the processor is configured to generate the radar information based on radar Rx signals received by the receiver.

19. A vehicle comprising:

a system controller configured to control one or more vehicular systems of the vehicle based on radar information; and a radar system configured to generate the radar information, the radar system comprising:

a plurality of Radio Heads (RHs); and a radar controller, the radar controller comprising:

a communication interface configured to communicate with the plurality of RHs; and a processor configured to coordinate radar communications by the plurality of RHs and to generate the radar information based on the radar communications by the plurality of RHs, the processor configured to:

transmit synchronization information to the plurality of RHs via the communication interface, the synchronization information configured to synchronize the radar communications by the plurality of RHs; and communicate at least one of radar Transmit (Tx) information or radar Receive (Rx) information with the plurality of RHs via the communication interface, wherein the radar Tx information is to configure radar Tx signals to be transmitted by one or more Tx chains of the plurality of RHs, wherein the radar Rx information is based on radar Rx signals received by one or more Rx chains of the plurality of RHs.

20. The vehicle of claim 19, wherein the synchronization information is configured to synchronize the radar communications by the plurality of RHs in phase and in time.

* * * * *